United States Patent
Kashiwagura et al.

(10) Patent No.: US 9,212,403 B2
(45) Date of Patent: Dec. 15, 2015

(54) TOPCOAT

(75) Inventors: Shinji Kashiwagura, Yamagata (JP); Masahiko Ogawa, Yamagata (JP); Takashi Ono, Yamagata (JP); Miwa Tada, Yamagata (JP); Yoshiyuki Ito, Wako (JP); Masato Ishibashi, Wako (JP); Takashi Yamaguchi, Wako (JP)

(73) Assignees: Midori Hokuyo Co., Ltd., Yamagata-shi (JP); Honda Motor Co., Ltd., Minato-ku (JP)

( * ) Notice: Subject to any disclaimer, the term of this patent is extended or adjusted under 35 U.S.C. 154(b) by 1113 days.

(21) Appl. No.: 12/992,895

(22) PCT Filed: May 15, 2009

(86) PCT No.: PCT/JP2009/002167
§ 371 (c)(1), (2), (4) Date: Nov. 15, 2010

(87) PCT Pub. No.: WO2009/139194
PCT Pub. Date: Nov. 19, 2009

(65) Prior Publication Data
US 2011/0078862 A1 Apr. 7, 2011

(30) Foreign Application Priority Data
May 16, 2008 (JP) .................. 2008-129427

(51) Int. Cl.
| | | |
|---|---|---|
| C14C 3/06 | (2006.01) |
| C14C 9/00 | (2006.01) |
| C14C 13/02 | (2006.01) |
| C14C 11/00 | (2006.01) |
| C09D 175/04 | (2006.01) |
| C14B 7/02 | (2006.01) |
| C14C 1/06 | (2006.01) |
| C14C 3/20 | (2006.01) |
| C14C 3/22 | (2006.01) |
| C14C 3/28 | (2006.01) |
| C14C 9/02 | (2006.01) |
| D06P 1/02 | (2006.01) |
| D06P 1/52 | (2006.01) |
| D06P 3/32 | (2006.01) |
| C08G 18/70 | (2006.01) |

(52) U.S. Cl.
CPC ............ *C14C 11/006* (2013.01); *C08G 18/706* (2013.01); *C09D 175/04* (2013.01); *C14B 7/02* (2013.01); *C14C 1/065* (2013.01); *C14C 3/20* (2013.01); *C14C 3/22* (2013.01); *C14C 3/28* (2013.01); *C14C 9/02* (2013.01); *D06P 1/02* (2013.01); *D06P 1/5285* (2013.01); *D06P 3/3206* (2013.01); *D06P 3/3286* (2013.01)

(58) Field of Classification Search
CPC .......... C14C 3/06; C14C 9/00; C14C 11/003; C14C 13/02; C14C 3/16
USPC ........... 8/94.1 R, 94.15, 94.19 R, 94.2, 94.24, 8/94.25, 94.33, 94.19 C
See application file for complete search history.

(56) References Cited

U.S. PATENT DOCUMENTS

| 4,390,340 | A | * | 6/1983 | Lach ............................... 8/94.24 |
| 6,177,198 | B1 | | 1/2001 | Schaefer |
| 2004/0074009 | A1 | * | 4/2004 | Kittmer et al. .................. 8/94.15 |
| 2004/0221395 | A1 | * | 11/2004 | Biver et al. ..................... 8/94.15 |
| 2005/0222368 | A1 | * | 10/2005 | Reiners et al. .................. 528/73 |
| 2006/0101584 | A1 | | 5/2006 | Hueffer et al. |
| 2008/0299406 | A1 | * | 12/2008 | Lee ............................... 428/540 |

FOREIGN PATENT DOCUMENTS

| GB | 1337259 | * 11/1973 |
| JP | 0278278 A | 1/1988 |
| JP | 63-199800 A | 8/1988 |
| JP | H04-233983 A | 8/1992 |
| JP | H08-67900 A | 3/1996 |
| JP | H09-003321 A | 1/1997 |
| JP | H09-025407 A | 1/1997 |
| JP | H09-208820 A | 8/1997 |
| JP | 2707169 B2 | 1/1998 |
| JP | H10-296939 A | 11/1998 |
| JP | H11-58534 A | 3/1999 |
| JP | 2002-67239 A | 3/2002 |

(Continued)

OTHER PUBLICATIONS

JP2009007480 translation, Oct. 30, 2013.*

(Continued)

*Primary Examiner* — Amina Khan
(74) *Attorney, Agent, or Firm* — Hamre, Schumann, Mueller & Larson, P.C.

(57) ABSTRACT

Provided is a natural leather having a novel coating layer which feels leathery. The coating film retains material properties such as strength and wearing resistance. When the user directly touches the natural leather, the coating layer present on the surface of the natural leather gives slick characteristics of natural leathers and smoothness. The natural leather has a coating film formed on a surface thereof, the coating film including: a color coat layer formed from a mixture of a hard component (10% modulus is more than 2.3 but no more than 3.0) and a soft component (10% modulus is more than 0.0 but no more than 1.0) of a two-component polyurethane resin; and a topcoat layer formed from a mixture of a medium component (resin having a 10% modulus of more than 1.0 but no more than 2.3) and a soft component (resin having a 10% modulus of more than 0.0 but no more than 1.0) of a two-component polyurethane resin.

7 Claims, 16 Drawing Sheets

(56) References Cited

FOREIGN PATENT DOCUMENTS

| | | |
|---|---|---|
| JP | 2002-075933 A | 3/2002 |
| JP | 2002-533488 A | 10/2002 |
| JP | 3419593 B2 | 6/2003 |
| JP | 2004-18779 A | 1/2004 |
| JP | 3630820 B2 | 3/2005 |
| JP | 2005-330358 A | 12/2005 |
| JP | 3725569 B2 | 12/2005 |
| JP | 3788729 B2 | 6/2006 |
| JP | 2006-307397 A | 11/2006 |
| JP | 2007-277323 A | 10/2007 |
| JP | 2007-298662 A | 11/2007 |
| JP | 2007-314919 A | 12/2007 |
| JP | 2007-321031 A | 12/2007 |
| JP | 2008-031467 A | 2/2008 |
| JP | 2009007480 * | 1/2009 |
| MX | 2010000059 | 4/2010 |
| WO | WO 00/37521 A | 6/2000 |

OTHER PUBLICATIONS

Section of "Classification by Type of S-S Curve" on p. 102 of "Plastic Data Book" edited by Asahi Kasei Amidas Corporation, et al. and issued by Kogyo Chosakai Publishing, Inc., Dec. 1, 1999.

* cited by examiner

TOPCOAT

This application is the U.S. National Phase under 35 U.S.C. §371 of International Application PCT/JP2009/002167, filed May 15, 2009, which claims priority to Japanese Patent Application No. 2008-129427, filed May 16, 2008. The International Application was published under PCT Article 21(2) in a language other than English.

TECHNICAL FIELD

The present invention relates to a natural leather constituted by a tanned natural leather with a coating film formed on it.

PRIOR ART

Natural leather is a popular option as a material for automobile interior parts. This popularity is due to excellent characteristics of natural leather. Also as consumers demanded higher grade features on automobiles, new properties suitable for these higher grade features were also added to natural leathers. To be specific, car seats, which are used in the interior of automobiles, have demanded natural leathers offering comfortable touch, strength and wear resistance. More recently, natural leathers that feel soft when contacted by the occupant, while maintaining sufficient strength are in demand.

Currently, one natural leather characteristic required in this industry where even higher-grade features are demanded is something not heretofore offered by conventional natural leathers—i.e., unique touch—although strength, wear resistance and other material characteristics of conventional natural leathers are still required. In other words, a new natural leather offering unique touch is required.

The meaning of unique touch can be expressed based on technical performance. To be specific, such new natural leather shall have a coating film layer formed on it, whose characteristics are such that the strength, wear resistance and other physical properties of the coating film are the same as those of current natural leathers, but when a person makes direct contact with this natural leather, the person feels distinctive leather characteristics such as slickness and smoothness unique to natural leather.

A coating film layer offering these characteristics is currently required. As far as the inventors of the present invention are aware, however, no such natural leather is available.

The following discusses what kinds of engineering ingenuities have been proposed to achieve the coating film layer characteristics of conventional natural leathers.

Traditional requirements for car seats made of natural leather have been the touch of natural leather, strength and wear resistance. These requirements have been met by forming a coating film layer using a synthetic resin. When forming a coating film, aniline finish associated with high transparency of the finished coating film has been used to form a grain surface pattern inherent in leather. Modified versions of aniline finish include aniline-like finish, semi-aniline finish and covering finish. Instead of these treatments, the current trend is to form a coating film with a polymer, polymer emulsion or water-based polymer emulsion, and polyurethane is a popular choice as a polymer. In other words, nowadays coating film layers are formed with polymers, polymer emulsions and water-based polymer emulsions.

Polyurethane resins used to form a coating film include those containing a moisture-hardening one-component lacquer, those requiring an additive to be added to a water-based dispersant of blocked isocyanate polymer, and those that require use of a leather tanning agent aimed at generating a polyurethane containing terminal aromatic amino acid groups through reaction with a chain terminator. It is said that a two-component polyurethane resin based on mixing of polyol and isocyanate components can be used favorably as a coating film, and in recent years water-based two-component polyurethane resins are adopted in consideration of environmental problems associated with solvents.

So that the coating film would fully demonstrate its designed performance, efforts have been made to develop a coating film layer comprising a two-component polyurethane resin and various additives.

When a coating film is formed, a three-step process is used where under coat, middle coat and top coat are applied, and especially various functional materials are added to the top coat layer formed by a top coat (Patent Literature 1: Japanese Patent No. 3725569, Japanese Patent Laid-open No. Hei 08-67900/Patent Literature 2: Japanese Patent Laid-open No. 2005-330358/Patent Literature 3: Japanese Patent Laid-open No. 2004-18779).

Polymer materials have a unique relationship of stress and elongation (S-S curve) (FIG. 1: Drawing explaining stress vs. strain curves of general resins). When an external force is applied to a polymer material, the material generates stress on the inside according to the external stress, and at the same time the material elongates. The aforementioned curve shows this condition. This stress gradually increases until the yield point (1A) is eventually reached ($\sigma Y$ indicates stress at the yield point, while $\epsilon Y$ represents strain at the yield point). Once this point is passed, the proportional relationship between stress and strain is lost and permanent strain will remain even after the stress is removed. If the stress is applied continuously, the breaking point (1B) is reached ($\sigma B$ indicates stress at the breaking point, while $\epsilon b$ represents strain at the breaking point) and the polymer material will break (Non-patent Literature 1: General S-S curve (section of "Shape of Stress vs. Strain Curve") on P. 102 of "Plastic Data Book" edited by Asahi Kasei Amidas Corporation, et al. and issued by Kogyo Chosakai Publishing, Inc., Dec. 1, 1999). On the other hand, polymer materials can be classified by type according to the shape of their tensile stress vs. strain curve, as shown in the figure explaining resin types based on stress vs. strain curves of resins (FIG. 2) (Non-patent Literature 1: P. 102 (section of "Classification of Plastics by Type of S-S Curve") of "Plastic Data Book" edited by Asahi Kasei Amidas Corporation, et al. and issued by Kogyo Chosakai Publishing, Inc., Dec. 1, 1999). In FIG. 2, stress vs. strain curves are classified into the 2A type (soft and weak (modulus of elongation: small, tensile strength: low, elongation: medium)), 2B type (hard and brittle (modulus of elongation: small, tensile strength: medium to high, elongation: small)), 2C type (hard and strong (modulus of elongation: large, tensile strength: high, elongation: medium)), 2D type (hard and tough (modulus of elongation: small, tensile strength: medium, elongation: large; or modulus of elongation: medium, tensile strength: medium to high, elongation: large)) or 2E type (hard and tough (modulus of elongation: large, tensile strength: high, elongation: large)). These relationships are used to select polymer materials having desired characteristics. It is also possible to focus on individual materials (such as polyurethane materials) and study how the characteristics of individual materials change when their stress vs. strain curve is changed by changing its components, in order to select a material offering desired characteristics.

A specific example of solving problems often encountered by selecting a stress vs. strain curve associated with good wear resistance and soft characteristics is explained below.

An invention has been developed with the object of providing a leather material that ensures wear resistance and maintains softness, while also offering improved touch, wherein such invention is characterized as follows: "A leather material constituted by a natural leather or synthetic leather with a polymer material layer formed on it, wherein the aforementioned polymer material layer contains a silicone copolymer and generates not more than 2.4 MPa of stress when strained by 20% or 3.5 MPa or more of stress when strained by 100%" (Patent Literature 4: Japanese Patent Laid-open No. 2007-277323). The specification of the above invention includes this statement regarding the silicone copolymer, "If the stress at a 20% strain exceeds 2.4 MPa, touch worsens, and if the stress at a 100% strain is less than 3.5 MPa, wear resistance drops" (0015). This problem was resolved by specifying an appropriate silicone copolymer to obtain softness and wear resistance characteristics.

Another example is explained below regarding an attempt to select a specific polymer and then add specific components to the polymer to achieve desired effects.

An invention has been developed, which is a "leather surface finish agent constituted by a water-based resin composition that contains 100 parts by mass of two-component polyurethane resin (A), 40 to 100 parts by mass of polyisocyanate cross-linking agent (B), 5 to 25 parts by mass of silicone compound (C), and 5 to 120 parts by mass of filler (D), wherein the aforementioned silicone compound (C) is a polyether modified silicone" (Patent Literature 5: Japanese Patent Laid-open No. 2007-314919).

The aforementioned invention relates to a leather surface finish agent constituted by a water-based resin composition that contains virtually no organic solvent, offers excellent coatability and is able to add high wear resistance to leather, as well as a leather made with such leather surface finish agent, wherein a water-based polyurethane resin is mixed with an excess amount of polyisocyanate cross-linking agent and silicone compound, to which an organic or inorganic filler is added, in order to achieve excellent coatability and add high wear resistance to leather by using virtually no organic solvent.

Next, an example of specifying a urethane polymer and adding silicone and fine powder as binders is explained.

A cover material used to form a coating film layer must ensure wear resistance and also maintain softness to provide favorable touch, and the invention in question is a top coat layer developed with the object of achieving wear resistance and favorable touch at the same time, wherein such top coat layer is characterized by its hardness of normally 2.0 to 5.0 μm in the standard condition, and a binder such as urethane or silicone is mixed with a solvent such as toluene or MEK and also with fine powder, etc., and this mixture is applied onto a base material to achieve a top coat layer containing fine powder and whose surface roughness Ra is within a specified range in the standard condition (Patent Literature 6: Japanese Patent Laid-open No. 2006-307397).

As is evident from the foregoing, it has been possible to solve the problem of offering a given characteristic required of conventional natural leathers, by selecting one type of polymer material suitable for the characteristic and then specifying the additive components required by this material.

As for the coating film layer, which is the area of interest of the inventors of the present invention, the quest starts from defining what "unique touch" is. Specifically, "unique touch" refers to a characteristic having the slickness specific to natural leather as well as smoothness (distinctive leather characteristics), provided by the coating film layer present on the surface of natural leather and felt when the user touches the natural leather directly, while such coating film layer maintains the strength, wear resistance and other physical properties of conventional coating films. The challenge of obtaining such new coating film has already been mentioned above.

Although such distinctive leather characteristics comprise slickness and smoothness, they are two different characteristics and, from the stress vs. strain curves of conventional single components; obtaining these two different characteristics at the same time is obviously difficult.

To achieve two new heterogeneous characteristics, attempts have been made to mix polymer materials of different characteristics, such as in the combinations described below, to achieve the new, desired characteristics.

An invention has been made wherein a two-component polyurethane dispersant made of a composition that contains a first component based on water-dispersed polyurethane, a second component based on water-dispersed polyisocyanate, and polyol of the first and second components is used, to achieve a film offering levels of hardness, flexibility and solvent resistance not heretofore achievable (Patent Literature 7: Japanese Patent No. 2707169, Japanese Patent Laid-open No. Hei 4-233983).

There is another invention wherein a polyurethane composition is achieved by mixing a low-hardness thermoplastic polyurethane with a high-hardness thermoplastic polyurethane, where the obtained polyurethane composition provides excellent flexibility, elasticity restorability, dynamic strength, etc. (Patent Literature 8: Japanese Patent No. 3419593, Japanese Patent Laid-open No. Hei 9-3321). Similarly, an invention relating to a composition containing an aromatic vinyl compound conjugated diene block copolymer is available (Patent Literature 9: Japanese Patent Laid-open No. Hei 9-25407). In addition, there is an invention relating to a thermoplastic resin composition constituted by a specific thermoplastic polyurethane of JIS A hardness 55 to 85 and an olefin elastomer of JIS A hardness 40 to 80, wherein such composition offers excellent thermoplastic polyurethane characteristics, or specifically excellent film stability, ease of removal from die and blocking resistance, while maintaining other dynamic characteristics such as elasticity restorability, strong elongation and flexibility, and can be used to make films, sheets, etc. (Patent Literature 10: Japanese Patent No. 3630820, Japanese Patent Laid-open No. Hei 9-208820). Another related invention is one wherein a fiber-reinforced high-density urethane resin foaming layer and a low-density urethane resin foaming layer are formed in a single process despite the high expansion ratio (contrast) to achieve a molding offering a good balance of heat resistance, bending strength and rigidity (Patent Literature 11: Japanese Patent Laid-open No. Hei 11-58534/Patent Literature 12: Japanese Patent Laid-open No. Hei 10-296939). Other inventions include a product having a water-based two-component polyurethane film offering improved impact resistance, high stability and excellent optical characteristics (Patent Literature 13: Published Japanese Translation of PCT International Patent Application No. 2002-533488), a product constituted by a base and a coating film layer formed on top, wherein such coating film layer contains a chromogenic composite fiber that reflects visible light and develops color and is formed by applying two types of polymer compound materials of different light refractive indexes alternately (Patent Literature 14: Japanese Patent Laid-open No. 2002-67239), and a planar panel integrated with two or more types of polyurethane layers 2, 3 having different characteristics and formed on the same plane, in order to provide a thin but hard polyurethane foam offering high strength, high rigidity and high heat resistance (Patent Literature 15: Japanese Patent Laid-open No. 2007-321031). Furthermore, a urethane resin has been invented by cross-linking a lactone modified polyol with at least two types of polyisocyanates including isophorone diisocyanate, wherein, despite the unique tendency of such low-hardness urethane resin material to generate greater compression set, both hardness and compression set are balanced at sufficiently low levels and consequently compression set can be suppressed (Patent Literature 16: Japanese Patent Laid-open No. 2007-298662). Another invention is a semiconductor wafer polishing pad of a layered structure, constituted by a polyurethane foam layer, a resin layer of a higher modulus of elasticity than the polyurethane foam layer (second layer), and a layer of a lower modulus of elasticity than the aforementioned second layer provided on the opposite side of the second polyurethane foam layer (third layer) (Patent Literature 17: Japanese Patent No. 3788729, Japanese Patent Laid-open No. 2002-75933).

These specific examples do not suggest that a characteristic having slickness and smoothness unique to natural leather can be achieved by, for example, mixing two different types of polymer materials such as polyurethane resins.

Before working on the present invention, the inventors examined the tanning step and re-tanning step in the manufacture of natural leather, and completed a natural leather having "flexibility, softness characterized by elasticity of more than what is normally expected from leather, no more than a normal level of elongation of leather, as well as restorability" (Japanese Patent Application No. 2007-170359).

It is expected that, as a result of the present invention, a natural leather can be formed that has softness characterized by elasticity of more than what is normally expected from leather, no more than a normal level of elongation of leather, as well as restorability, wherein the coating film layer present on the surface of such natural leather maintains the strength, wear resistance and other physical properties of conventional coating films and has slickness and smoothness unique to natural leather when the user directly touches the natural leather.

Patent Literature 1: Japanese Patent No. 3725569, Japanese Patent Laid-open No. Hei 08-67900
Patent Literature 2: Japanese Patent Laid-open No. 2005-330358
Patent Literature 3: Japanese Patent Laid-open No. 2004-18779
Patent Literature 4: Japanese Patent Laid-open No. 2007-277323
Patent Literature 5: Japanese Patent Laid-open No. 2007-314919
Patent Literature 6: Japanese Patent Laid-open No. 2006-307397
Patent Literature 7: Japanese Patent No. 2707169, Japanese Patent Laid-open No. Hei 4-233983
Patent Literature 8: Japanese Patent No. 3419593, Japanese Patent Laid-open No. Hei 9-3321
Patent Literature 9: Japanese Patent Laid-open No. Hei 9-25407
Patent Literature 10: Japanese Patent No. 3630820, Japanese Patent Laid-open No. Hei 9-208820
Patent Literature 11: Japanese Patent Laid-open No. Hei 11-58534
Patent Literature 12: Japanese Patent Laid-open No. Hei 10-296939
Patent Literature 13: Published Japanese Translation of PCT International Patent Application No. 2002-533488
Patent Literature 14: Japanese Patent Laid-open No. 2002-67239
Patent Literature 15: Japanese Patent Laid-open No. 2007-321031
Patent Literature 16: Japanese Patent Laid-open No. 2007-298662
Patent Literature 17: Japanese Patent No. 3788729, Japanese Patent Laid-open No. Hei 2000-75933
Non-patent Literature 1: Section of "Classification of Plastics by Type of S-S Curve" on P. 102 of "Plastic Data Book" edited by Asahi Kasei Amidas Corporation, et al. and issued by Kogyo Chosakai Publishing, Inc., Dec. 1, 1999

SUMMARY OF THE INVENTION

Problems to be Solved by the Invention

It is an object of the present invention to provide a natural leather having a new coating film layer, wherein such coating film layer present on the surface of natural leather maintains the physical properties of coating films such as strength and wear resistance, while also exhibiting distinctive leather characteristics such as slickness and smoothness unique to natural leather when the user directly touches the natural leather. It is another object of the present invention to provide a natural leather having a new coating film layer, wherein such coating film layer present on the surface of natural leather maintains the physical properties of coating films such as strength and wear resistance, while also exhibiting distinctive leather characteristics such as slickness and smoothness unique to natural leather when the user directly touches the natural leather, and also wherein the natural leather being the base of the coating film layer does not elongate more than what is normally expected from natural leather and also has restorability.

Means for Solving the Problems (1) (A) The inventors of the present invention strove to achieve a coating film layer maintaining the physical properties of conventional coating films such as strength and wear resistance, while also exhibiting slickness and smoothness unique to natural leather when the user directly touches the natural leather.

(B) To objectively evaluate and make judgment on the results obtained through the development of a natural leather having the aforementioned characteristics, it is necessary to perform measurements using measurement means capable of expressing the desired characteristics as directly as possible, and then determine whether or not the coating film layer has both slickness and smoothness unique to natural leather based on the measured results.

(C) The following items regarding the newly formed coating film are measured numerically (according to the measurement methods as illustrated in FIG. 13, which is a figure explaining the measurement of slickness using KES, and FIG. 14, which is a figure explaining the measurement of smoothness using KES), and if the resulting values meet target values determined in advance, the coating film is judged favorable.

(a) Measurement of Slickness (FIG. 13)

Slickness is measured in the form of surface friction.

(i) Measurement of Mean Coefficient of Surface Friction (MIU)

The friction force probe 13A (shown in 13*a*) is attached to the friction force probe holder 13G on the friction force measuring system 13D (13b) to measure the surface friction μo and calculate the mean coefficient of surface friction μm (MIU) (13c). The mean coefficient of surface friction μm (MIU) is an indicator of surface slipperiness.

(ii) Measurement of Mean Deviation of Coefficient of Surface Friction (MMD)

Similarly, calculate the mean deviation (also called "variation in the coefficient of surface friction" or MMD) from the surface friction μo. The mean deviation MMD is an indicator of surface roughness (13c).

(iii) Calculation Method for Slickness Unique to Natural Leather

This can be calculated by calculating the aforementioned mean coefficient of surface friction (MIU) (i) and mean deviation of coefficient of surface friction (MMD) (ii) (mean coefficient of surface friction (MIU)/mean deviation of coefficient of surface friction (MMD)).

(iv) When "mean coefficient of surface friction (MIU)/mean deviation of coefficient of surface friction (MMD)" is used as an indicator of slickness, it means that the greater the calculated value, the better the surface touch. For practical applications, the calculated value must be 25 or more.

(b) Whether or not the coating film has smoothness is determined by measuring the surface roughness and obtaining its mean deviation (FIG. 14). FIG. 14 consists of 14a (illustrating the structure of the surface roughness probe), 14b (system for measuring friction force using the surface roughness probe) and 14c (illustration of mean deviation SMD based on measurement of surface roughness using the surface roughness probe).

(i) Calculation of SMD (Mean Deviation of Surface Roughness)

As for surface roughness, move the surface roughness probe (14A, also referred to as "U-shaped sensor") on the coated surface formed on the surface of leather and thereby measure the change in vertical thickness using the surface roughness probe, in order to measure the surface roughness and calculate the mean deviation of surface roughness (SMD). The mean deviation of surface roughness (SMD) is an indicator of flatness of surface.

(ii) The SMD (mean deviation of surface roughness) is deemed acceptable if the value is of 2.5 μm or less.

(D) Whether the physical properties of the coating film such as wear resistance are maintained or not is checked by measuring the following evaluation items:

(a) Wear Resistance (i) The wear resistance tester (FIG. 15) shall conform to the figure showing the friction wheel (60 mm wide, 25 mm thick) (15a) as well as the Gakushin friction fastness tester (15B) on which this friction wheel is installed (15b shows the entire view of the tester, model AB301 manufactured by Tester Sangyo). Install a test piece (15C) on the friction wheel (15A) of the friction tester as shown in 15a, connect the friction wheel to the load (15F), and fix a piece of No. 6 cotton canvas (15D) on the Gakushin friction fastness tester (15B). Apply friction until the coating film peels off while observing the condition of the coating film with the naked eye. Record the number of times the wheel has been moved back and forth after which the coating film starts to peel, and calculate an average of the counts taken with two test pieces to obtain the Gakushin wear resistance.

(ii) The coating film was deemed to have desired properties such as strength and wear resistance when the result of this wear resistance test (measurement using the Gakushin friction fastness tester) was 4,000 times or more.

(E) Strength of the formed coating film layer is measured by measuring the strain of the resin constituting the coating film layer with respect to the stress applied on the resin (i.e., by creating a stress vs. strain curve). The measurement method shall conform to the dumbbell method.

(a) Preparation of Test Piece (FIG. 16)

Pour resin into a silicone mold and leave it for at least 3 days at room temperature (20±5° C.) until dry, in order to prepare a resin film of approx. 0.4 to 0.8 mm in thickness.

Use a stamping template to stamp a test piece of dumbbell shape (FIG. 16) from the resin film. Add marks at the center of the test piece at a distance of 30 mm.

Test piece width W (mm)=20

Initial distance between marks on test piece Lo (mm)=30

(b) Test Method

Measure the thickness of the test piece at 3 points of C, L and R as shown in FIG. 16, and average the values measured at the three points to obtain the thickness of test piece T (mm).

Creation of Load Vs. Elongation Curve

Use a Tensilon tensile tester (AG-1 AUTO GRAPH manufactured by Shimadzu) to pull the test piece at a speed of 100±20 mm/min until it breaks, in order to obtain a curve illustrating the relationship of the applied load and elongation between marks.

Creation of Stress Vs. Strain Curve

Divide the load by the cross-section area according to the formula below to obtain an equivalent stress:

$$S=P/(W \times T)$$

S: Stress (MPa)
P: Load (N)
W: Test piece width (mm)
T: Test piece thickness (mm)

Apply the following formula to the elongation between marks to obtain an equivalent strain (elongation ratio):

$$s=\Delta L/Lo \times 100$$

s: Strain (%)
ΔL: Elongation between marks (mm)
Lo: Initial distance between marks (mm)

10% modulus

The stress corresponding to a 10% strain is defined as the 10% modulus (unit: MPa).

(2) The inventors of the present invention thought, from their past experience, that when forming a coating film with polyurethane resin, use of the forming method specified below would result in a coating film offering the aforementioned characteristics and decided to form a coating film accordingly.

The specific method is to form a coating film on the surface of a natural leather (base) obtained by a tanning step and steps for re-tanning, dyeing and greasing (natural leather before a coating film is formed is hereinafter referred to as "base," while natural leather after a coating film has been formed is referred to as "natural leather," to distinguish between the two). A pre-coat layer is formed first, followed by a base coat layer.

The main role of the pre-coat layer is to prevent the base coat material from permeating into the base, which is particularly important when semi-aniline finish is applied by keeping the thickness of base coat small. The pre-coat layer also reinforces the adhesion between the base and base coat, and is particularly important when the grain layer on the base surface is not shaved off but retained. The pre-coat material almost entirely permeates into the base. The base coat layer is used to smooth the otherwise uneven surface of natural leather to form a stable coating film surface, and it becomes the foundation for the coating film layer to be formed on it. The base coat layer also has the role of ensuring better adhesion with the color coat layer to be formed on it, thereby securing the color coat layer and preventing it from peeling. These layers play important roles in the formation of a layered structure. The inventors knew, through their experience, that these layers do not have a direct impact on the touch and feel of the coating film and that the coating film formed on these layers would primarily have direct bearing on touch and feel. Accordingly, the inventors thought that a key was to align the properties of the layer formed on top of these layers, with the desired properties mentioned earlier.

(3) Traditionally, a coating film on a car seat, etc., is formed in three layers, where only the top layer has enough strength characteristics as a coating film and is formed with a two-component polyurethane resin offering wear resistance and strength. The inventors thought that by forming a coating film in consideration of the characteristics obtained from this two-component polyurethane resin based on its stress vs. strain curve, a film offering the target polyurethane characteristics would be formed.

(4) In fact, it was found effective to mix multiple two-component polyurethane resins identified from the stress vs. strain curve of a specific shape, and form the color coat layer and top coat layer, respectively, as explained below.

It should be noted that the 10% modulus mentioned in the explanation below refers to the degree of tensile force (stress) resulting in a 10% elongation. The actual combinations are specified below.

(A) A natural leather is made by mixing a hard component (a resin whose 10% modulus is over 2.3 but not more than 3.0) of a resin containing two-component polyurethane resin and polyurethane resin with a soft component (a resin whose 10% modulus is over 0.0 but not more than 1.0) of a resin containing two-component polyurethane resin and polyurethane resin to form a color coat layer, after which a medium component (a resin whose 10% modulus is over 1.0 but not more than 2.3) of a resin containing two-component polyurethane resin and polyurethane resin is mixed with a soft component (a resin whose 10% modulus is over 0.0 but not more than 1.0) of a resin containing two-component polyurethane resin and polyurethane resin to form a top coat layer.

(B) The foregoing can be elaborated as follows when the mixing ratios of the aforementioned components are considered:

A natural leather is characterized in that the aforementioned color coat layer is formed by mixing 48 to 90 percent by weight of a hard component (a resin whose 10% modulus is over 2.3 but not more than 3.0) of a resin containing two-component polyurethane resin and polyurethane resin with 52 to 10 percent by weight of a soft component (a resin whose 10% modulus is over 0.0 but not more than 1.0) of a resin containing two-component polyurethane resin and polyurethane resin, while the aforementioned top coat layer is formed by mixing 15.0 to 35.0 percent by weight of a medium component (a resin whose 10% modulus is over 1.0 but not more than 2.3) of a resin containing two-component polyurethane resin and polyurethane resin and 65.0 to 85.0 percent by weight of a soft component (a resin whose 10% modulus is over 0.0 but not more than 1.0) of a resin containing two-component polyurethane resin and polyurethane resin.

(5) When working on the present invention, the inventors used a base natural leather provided in an existing invention (Japanese Patent Application No. 2007-170359, which is a leather explained specifically in a set of test examples included in this Specification). These test examples are collectively referred to as Example 1. Examples 2 to 10 are examples where coating films were formed on the surface of the base (BLC50) obtained in Test 6 of Example 1.

Among them, Examples 2 to 6 are specific examples of mixing soft and hard components for the color coat layer, and mixing medium and hard components for the top coat layer, when forming the color coat layer and top coat layer of the coating film to be formed on the surface of the base described in Example 1. On the other hand, Examples 7 to 10 describe examples of examination as to what happens when the blending ratios of soft and hard components constituting the color coat layer are changed while keeping the blending ratios of medium and hard components constituting the top coat layer the same.

Example 11 is a specific example showing that favorable results were obtained when the base obtained in Example 1 (BLC50) was shaved by buffing and a coating film was formed on the resulting base leather.

Example 12 is a specific example showing that favorable results were obtained when a coating film was formed on the surface of a chrome-tanned leather.

The aforementioned coating film was formed on this base.

(6) The aforementioned evaluations were performed on each base on which a coating film was formed.

(7) The evaluation results are shown in Table 4.

(a) According to the measured results of natural leathers with a coating film formed on it, using the KES-SE-SR-U roughness friction tester (manufactured by Kato Tech), smoothness (SMD) was 1.8 µm or less, while slickness (MIU/MMD) was 25 or more. As for smoothness (SMD), all measured values were between 0.70 µm and 1.50 µm, which led to a conclusion that the criterion of 2.5 µm or less was met.

As for slickness (MIU/MMD), all measured values were between 26.3 and 34.3, indicating that the criterion for slickness (MIU/MMD) of 25 or more was met.

(b) As for the wear resistance test using the Gakushin friction fastness tester, all measured values were between 5,000 and 10,000 times, indicating that the criterion of 4,000 times or more was met.

(c) All bases on which the aforementioned coating film was formed met the criteria specified in (a) and (b) above and therefore represent the type of leather actually desired under the present invention.

Effects of the Invention

According to the present invention, a natural leather having a new coating film layer can be achieved, wherein such coating film layer present on the surface of natural leather maintains the physical properties of conventional coating films such as strength and wear resistance, while also exhibiting slickness and smoothness unique to natural leather, which are characteristics not provided by conventional natural leathers, when the user directly touches the natural leather, by forming a pre-coat followed by a base coat on the surface of a natural leather obtained through a tanning step and steps for re-tanning, dyeing and greasing, and then forming a color coat and a top coat, both constituted by specific components, on the surface of the natural leather.

By using the natural leather described in Japanese Patent Application No. 2007-170359 as the base, or by buffing the aforementioned natural leather and using shaved leather as the base, or by using a leather obtained by chromium tanning as the base, and then forming on the surface of any of such base the coating film specified under the present invention, a new natural leather having the desired touch, which is a characteristic not provided by conventional natural leathers, can be obtained.

A natural leather conforming to the present invention is useful as a material for automobile interior parts such as steering wheels, seats, doors, instrument panels, and assist grips and other grips.

DESCRIPTION OF THE SYMBOLS

Figure 1:
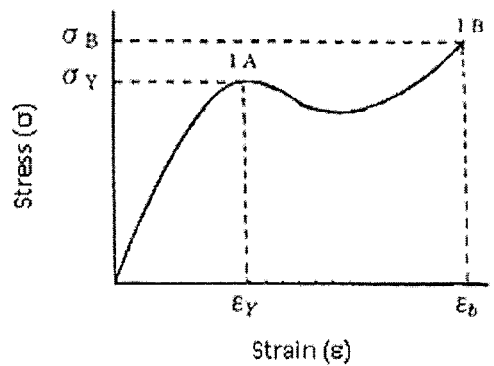
FIG. 1: A drawing explaining stress vs. strain curves of general resins
Figure 2:
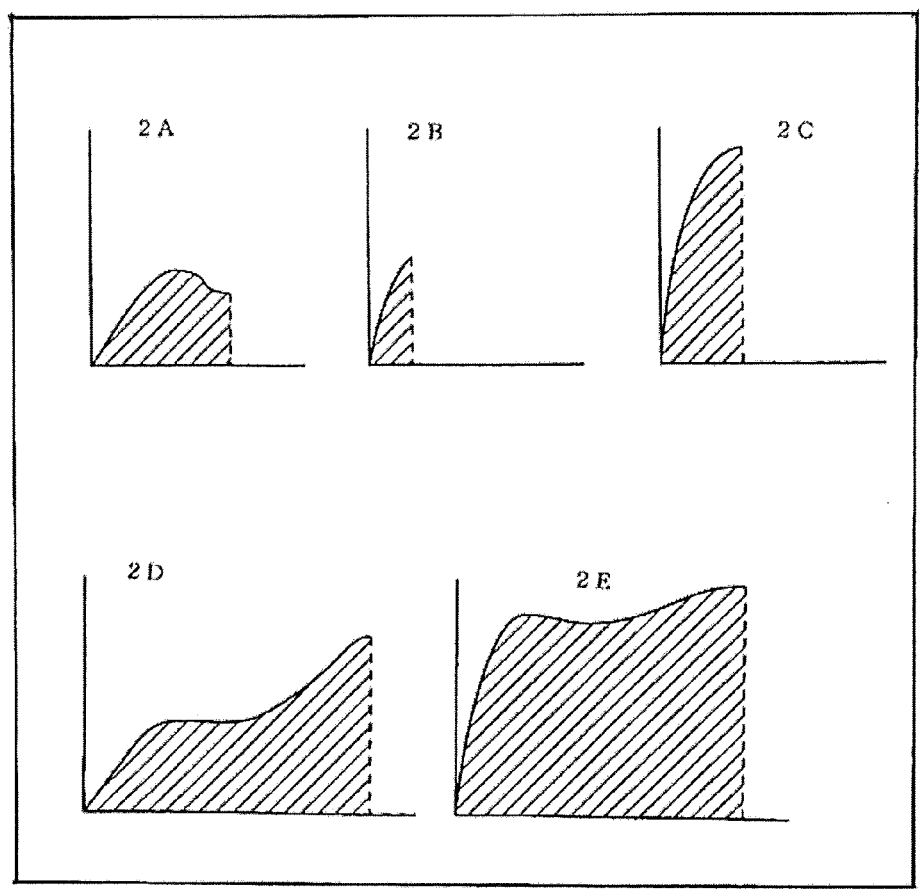
FIG. 2: A drawing explaining the types of resin from stress vs. strain curves of resins

1A Yield point
1B Breaking point
$\sigma_Y$ Stress at yield point
$\epsilon_Y$ Strain at yield point
$\sigma_B$ Stress at breaking point
$\epsilon b$ Strain at breaking point
2A Stress vs. strain curve of soft and weak type (modulus of elongation: small, tensile strength: low, elongation: medium)
2B Stress vs. strain curve of hard and brittle type (modulus of elongation: small, tensile strength: medium to high, elongation: small)
2C Stress vs. strain curve of hard and strong type (modulus of elongation: large, tensile strength: high, elongation: medium)
2D Stress vs. strain curve of hard and tough type (modulus of elongation: small, tensile strength: medium, elongation: large; or modulus of elongation: medium, tensile strength: medium to high, elongation: large)
2E Stress vs. strain curve of hard and tough type (modulus of elongation: large, tensile strength: high, elongation: large)
13$a$ Enlarged view showing the structure of a friction force probe
13$b$ Drawing showing a system for measuring friction force using the friction force probe
13$c$ Illustration of mean deviation MMD based on measurement of surface friction
($\mu$o), as well as illustration of mean coefficient of surface friction (MIU, $\mu$m)
13A Friction force probe
13B Friction force detection end (pulp of finger)
13C Friction force detection part
13D Friction force measuring system
13E Sample
13F Moving direction
13G Friction force probe holder
14$a$ Enlarged view showing the structure of a surface roughness probe
14$b$ Drawing showing a system for measuring friction force using the surface roughness probe
14$c$ Illustration of mean deviation SMD based on measurement of surface roughness using the surface roughness probe
14A Surface roughness probe
14B Surface roughness detection end (tip of finger)
14C Surface roughness detection part
14D Surface roughness measuring system
14E Sample
14F Moving direction
14G Surface roughness probe holder
15$a$ Drawing showing a friction probe
15$b$ Gakushin friction fastness tester equipped with the friction probe
15A Friction probe
15B Gakushin friction fastness tester
15C Test piece
15D Cotton canvas
15E Load arm
15F Load

BEST MODE FOR CARRYING OUT THE INVENTION

The present invention forms a coating film on a base natural leather which is manufactured by a traditionally known operation comprising a leather tanning step followed by steps for neutralization, re-tanning, dyeing and greasing. This natural leather may be a natural leather whose condition is specifically limited to provide desirable characteristics, or a natural leather manufactured according to a conventional manufacturing method.

When a coating film layer conforming to the present invention is provided on a base natural leather manufactured according to a conventional method, a natural leather having a coating film layer that maintains the physical properties of conventional coating films such as strength and wear resistance, while also exhibiting slickness and smoothness unique to natural leather, which are characteristics not provided by conventional natural leathers, when the user directly touches the natural leather, can be obtained.

The inventors invented a natural leather not heretofore available having flexibility, softness characterized by elasticity of more than what is normally expected from leather, no more than a normal level of elongation of leather, as well as restorability, wherein such natural leather can be obtained without using chromium as a tanning agent (Japanese Patent Application No. 2007-170395). The characteristics of this leather are expressed numerically as follows: "Rigidity/softness of 5.0 mm or more and maximum setting rate of 10% or less" and "rigidity/softness of 4.42 mm or more but no more than 4.90 mm and maximum setting rate of 10.7 or more but not more than 13.9." A leather having such characteristic values is not yet known.

This base natural leather is characterized in that it has no more than a normal level of elongation of leather, and has restorability. A coating film layer is present on the surface of this base natural leather, wherein such coating film layer exhibits slickness and smoothness unique to natural leather when the natural leather is touched directly.

Even when the grain side of the aforementioned base natural leather is buffed (with sand paper) and the resulting shaved leather is used as the base, the characteristics of the coating film proposed by the present invention are still available, along with relatively favorable results in other areas because the characteristics of the aforementioned base natural leather still remain.

Also, when conventional chromium tanning is provided, in some cases favorable results can still be obtained as explained above.

The present invention is also characterized by forming a coating film on the surface of natural leather.

The coating film is formed by forming the following four layers in the specified order: Form (1) a pre-coat layer and (2) a base coat layer, and then form on the surface of the base coat layer (3) a color coat layer and (4) a top coat layer.

(1) The pre-coat layer is used to prevent the coating material of the base coat layer from permeating into the base, and also reinforces the adhesion between the base and base coat layer. To form this layer, a composition constituted by resin, pigment, auxiliaries and water is applied on the surface of leather. The ratio of solid contents, or resin, pigment and auxiliaries, should be 40 to 70:20 to 35:10 to 30 (total 100% based on ratio by weight). For the resin, a two-component polyurethane resin is used.

For the pigment, a pigment of desired color is used. For the auxiliaries, examples include surface active agent, thickening agent and adjusting agent, among others.

The ratio of resin, pigment and auxiliaries on one hand, and water on the other, should be 40 to 70:60 to 30 (total 100% based on ratio by weight). The mixture can be applied in a state of aqueous solution using a brush or spray or by curtain coating or roll coating, as deemed appropriate. The application amount is 30 to 50 g/m$^2$, and hot air is blown onto the coated surface to evaporate water. A high percentage of coating material permeates into the base, and the film thickness ends up in a range of 4 to 6 μm.

(2) The base coat layer is formed between the pre-coat layer on the surface of leather and the color coat layer/top coat layer, to flatten the irregularities on the leather surface to create a stable base surface on which to form layers. This layer also affixes and binds the pre-coat and color coat/top coat in a stable manner. This layer is also formed by applying on the surface of leather a composition constituted by resin, pigment, auxiliaries, touch agent, leveling agent and water.

The ratio of solid contents, or resin, pigment and auxiliaries, should be 50 to 75:10 to 20:10 to 20 (total 100% based on ratio by weight). For the resin, a two-component polyurethane resin is used. For the pigment, a pigment of desired color is used. For the auxiliaries, examples include surface active agent, thickening agent, adjusting agent and matting agent, among others. The ratio of resin, pigment, auxiliaries, touch agent and leveling agent on one hand, and water on the other, should be 60 to 70:40 to 30 (total 100% based on ratio by weight). The mixture can be applied in a state of aqueous solution using a brush or spray or by curtain coating or roll coating, as deemed appropriate. The application amount is 35 to 55 g/m$^2$, and hot air is blown onto the coated surface to evaporate water. The film thickness is in a range of 7 to 10 μm.

(3) The color coat layer is where a pigment or dye that adds color to the leather is present, and provided on top of the base coat as viewed from the leather side. This layer is also formed by applying on the surface of leather a composition constituted by resin, pigment, auxiliaries, cross-linking agent, touch agent, leveling agent and water.

The ratios, as solid contents, of resin: pigment: auxiliaries: cross-linking agent: touch agent and leveling agent, are 50 to 75:10 to 20:0 to 10:3 to 10:1 to 4 (total 100% based on ratio by weight). For the resin, a two-component polyurethane resin is used. For the pigment, a pigment of desired color is used. For the auxiliaries, examples include surface active agent, thickening agent and adjusting agent, among others. The ratio of resin, pigment, auxiliaries, touch agent and leveling agent on one hand, and water on the other, should be 70 to 80:30 to 20 (total 100% based on ratio by weight). The mixture can be applied in a state of aqueous solution using a brush or spray or by curtain coating or roll coating, as deemed appropriate. The application amount is 30 to 45 g/m$^2$, and hot air is blown onto the coated surface to evaporate water. The film thickness is in a range of 7 to 10 μm.

(4) The top coat layer is formed on the surface of color coat layer and used to reinforce and harden the coating film surface, while suppressing the reflection of light through the effect of an added matting agent or delustering agent to prevent the coating film surface from becoming excessively shiny. When this layer is formed, the ratios, as solid contents, of resin small amount of pigment: cross-inking agent: touch agent and leveling agent, are adjusted to 45 to 55:0.1 to 3.0:30 to 40:8 to 15 (total 100% based on ratio by weight). For the resin, a two-component polyurethane resin is used. For the auxiliaries, examples include surface active agent, thickening agent and adjusting agent, among others. The ratio of resin, pigment, auxiliaries, cross-linking agent, touch agent and leveling agent on one hand, and water on the other, should be 75 to 90:25 to 10 (total 100% based on ratio by weight). The mixture can be applied in a state of aqueous solution using a brush or spray or by curtain coating or roll coating, as deemed appropriate. The application amount is 30 to 45 g/m$^2$, and hot air is blown onto the coated surface to evaporate water. The film thickness is in a range of 10 to 15 μm.

Under the present invention, the pre-coat layer, base coat layer, color coat layer and top coat layer use a resin containing two-component polyurethane resin and polyurethane resin, respectively. To be specific, (1) a two-component aliphatic polyurethane or (2) acrylic polymer-urethane polymer copolymer, a polyurethane delustering agent, etc., similar to the aforementioned polyurethane resin, is used.

(1) Two-Component Aliphatic Polyurethane

A two-component aliphatic polyurethane is water-based and used as a coating material.

When a two-component aliphatic polyurethane is used to form a coating film on natural leather, it is mixed and reacted with a water-based polyol as well as a hardener constituted by a water-based polyaliphatic isocyanate.

Although a two-component aliphatic polyurethane is subject to a limitation in that its processing, such as coating, must be completed within a specified time (pot life), the natural leather process proposed by the present invention takes only two to four hours or so and should not present any problem in terms of practical work. The finished coating film is stable and provides such advantages as non-yellowing.

A water-based polyaliphatic isocyanate is manufactured as follows:

Modify an aliphatic isocyanate such as 1,4-diisocyanate butane, 1,6-diisocyanate hexane, 1,5-diisocyanate-2,2-dimethyl pentane, 2,2,4- or 2,4,4-trimethyl-1,6-diisocyanate hexane, 1,10-diisocyanate decane or other aliphatic isocyanate, to obtain a polyisocyanate containing the uretodione group, isocyanurate group, urethane group, alphanate group, biuret group and/or oxadiazine group, and then cause it to react with a polyalkylene oxide polyether alcohol containing the ethylene oxide unit, to manufacture a polyisocyanate mixture (Japanese Patent No. 2961475).

For the water-based polyol, a diol containing the carboxyl group such as dimethylol butanoic acid, dimethylol pentanoic acid, dimethylol heptanoic acid, dimethylol octanoic acid or dimethylol nonanoic acid can be used. Among others, dimethylol butanoic acid, dimethylol heptanoic acid and dimethylol nonanoic acid are preferred from the viewpoint of industrial production cost, etc., and dimethylol butanoic acid is most preferred. Such diol containing the carboxyl group can be obtained using any known synthesis method, but normally it is obtained through an aldol condensation of alkyl aldehyde with formalin in the presence of a basic catalyst, after which a peroxide is caused to act upon the obtained condensation product to oxidize the aldehyde group (Japanese Patent No. 3493796, Japanese Patent Laid-open No. Hei 8-359884, etc.).

For the cross-linking agent, an aliphatic isocyanate can be used (as described in the aforementioned Japanese Patent No. 2961475, etc.).

By using the OH group constituted by the aforementioned dimethylol alkanoic acid and polytetramethylene ether glycol, a water-based polyurethane resin coating material with a number-average molecular weight (water-based polyurethane resin) of 18000 to 35000 or so is obtained (Japanese Patent No. 3493796, Japanese Patent Laid-open No. Hei 8-359884).

As for the number-average molecular weight of the aforementioned polyurethane resin, normally a water-based polyurethane resin with a number-average molecular weight of 12000 to 20000, or even 35000 or 70000 or so, is obtained. Here, "number-average molecular weight" refers to an equivalent number-average molecular weight of polystyrene based on GPC (gel permeation chromatograph) measurement of a tetrahydrofuran solution in which 1 percent by weight of polyurethane resin is dissolved.

All measurements of molecular weight mentioned hereinafter were measured by this method.

The molecular weights of polyaliphatic isocyanate and polyol used in the reaction are adjusted according to the final target molecular weight of polyurethane.

A water-based two-component aliphatic polyurethane with a number-average molecular weight of 10000 or less can also be manufactured in the following manner:

Use the following two types of compositions, or specifically (A) a composition constituted by (a) and (b) and (B) another constituted by (c) and (d), along with (C) (e) amine and (D) water. (C) and (D) act as chain terminators.

First, components (a) and (b), (c) and (d) are mixed and reacted against one another to obtain a NCO pre-polymer, which is then mixed with component (e) and water to cause reaction to obtain a polyurethane having 2 to 6 OH functionality.

The reaction is implemented at a temperature of approx. 70° C.

(A) Use a composition constituted by (a) at least one type of polyol with a number-average molecular weight of 1500 to 3000 g/mol, and (b) at least one type of diol with a molecular weight of 61 to 499 g/mol.

To be specific, at least one type of polyol with a number-average molecular weight of 1500 to 3000 g/mol as specified in (a) is a reaction product of bivalent alcohol and dibasic carboxylic acid. The dibasic carboxylic acid may be succinic acid, adipic acid, suberic acid, azelaic acid or sebacic acid, among others.

The bivalent alcohol may be ethylene glycol, 1,2- or 1,3-propylene glycol, 1,4-, 1,3- or 2,3-butylene glycol, 1,6-hexane diol, 1,8-octane diol, neopentyl glycol, 2-methyl-1,3-propane diol, diethylene glycol, triethylene glycol, tetraethylene glycol, polyethylene glycol, dipropylene glycol, polypropylene glycol, dibutylene glycol or polybutylene glycol, among others.

Also regarding at least one type of diol with a molecular weight of 61 to 499 g/mol as specified in (b), specifically ethylene glycol, 1,4-butane diol, 1,6-hexane diol, neopentyl glycol, trimethyl pentane diol, propylene glycol, 1,3-propane diol, 1,4-cyclohexane dimethanol or any mixture thereof, but preferably 1,4-butane diol, is used.

(B) Use a composition constituted by (c) an aliphatic diisocyanate with a molecular weight of 168 to 262 g/mol and (d) at least one type of diol having at least one carboxyl or carboxylate group and molecular weight of less than 450 g/mol.

The aliphatic isocyanate in (c) is hexamethylene diisocyanate, butane diisocyanate or other isocyanate.

As for the diol having at least one carboxyl or carboxylate group in (d), dimethylol acetic acid, 2,2-dimethylol propionic acid, 2,2-dimethylol butyric acid, 2,2-dimethylol pentanoic acid, dihydroxy succinic acid or other 2,2-bis (hydroxy methyl) alkane carboxylic acid is appropriate.

(C) (e) An amine introduces a terminal hydroxyl group, while an isocyanate primarily reacts with the amino group in the manufacturing method explained below where a polyurethane dispersant conforming to the present invention is involved. For the compound in (e), ethanol amine, propanol amine, N-methyl ethanol amine, diethanol amine or N,N,N'-tris-2-hydroxy ethyl-ethylene diamine, but preferably ethanol amine or diethanol amine, is used, for example.

(D) (f) Water further increases the mol mass of dispersant after dispersion. A NH2 group is formed through reaction with the NCO group, and reacts further with the NCO group to undergo urea bond and consequently increases the mol mass.

(E) The mol ratio of the polyol of component (a) and sum of polyols (b) and (d) is 1:2 to 1:3, while the mol ratio of the sum of polyols (a), (b) and (d) and isocyanate (c) is 1:1.2 to 1:1.7, and the polyurethane has 2 to 40H functionality.

(F) The number-average molecular weight of the obtained polyurethane should preferably be 2500 to 10000 g/mol (the foregoing is disclosed in Japanese Patent Laid-open No. 2000-119511).

(2) Two-Component Aliphatic Polyurethane-Acrylic Emulsion

Here, the two-component aliphatic polyurethane is water-based.

When a two-component aliphatic polyurethane-acrylic emulsion is used to form a coating film on natural leather, it is mixed and reacted with a water-based polyol as well as a hardener constituted by a water-based polyaliphatic isocyanate.

Although a two-component aliphatic polyurethane-acrylic emulsion has a pot life and must be processed within a specified time, the process should be completed in six hours or so and the finished coating film is stable and provides such advantages as non-yellowing.

A water-based polyaliphatic isocyanate is manufactured as follows:

Modify an aliphatic isocyanate such as 1,4-diisocyanate butane, 1,6-diisocyanate hexane, 1,5-diisocyanate-2,2-dimethyl pentane, 2,2,4- or 2,4,4-trimethyl-1,6-diisocyanate hexane, 1,10-diisocyanate decane or other aliphatic isocyanate, to obtain a polyisocyanate containing the uretodione group, isocyanurate group, urethane group, alphanate group, biuret group and/or oxadiazine group, and then cause it to react with a polyalkylene oxide polyether alcohol containing the ethylene oxide unit, to manufacture a polyisocyanate mixture.

For the hydroxyl-group containing compound to be reacted against the aforementioned water-based polyaliphatic isocyanate, a hydroxyl-group containing polyacrylate is used in a state dissolved or dispersed in water. This hydroxyl-group containing polyacrylate, as well as a polyester resin containing a product of polyester or alkyd resin to which alkylene oxide has been added, are used.

As a rule, any aqueous solution or water-based dispersoid of a binder containing an isocyanate reactive group is suitable. If used for this purpose, the polyisocyanate mixture proposed by the present invention is used in an amount corresponding to the equivalent ratio of isocyanate group vs. isocyanate reactive group, especially alcoholic hydroxyl group, of generally 0.5:1 to 2:1. The polyisocyanate mixture proposed by the present invention can also be mixed with additives to improve various characteristics, such as a small amount of monofunctional water-based lacquer binder to improve adhesive strength.

(3) Utilization of Polyurethane Delustering Agent

A polyurethane delustering agent is a covering agent used to cover a material in a manner maintaining slight gloss or slight relustering property. Polyurethane delustering agents are manufactured by unique methods involving a polyurethane mixture constituted by isocyanate and hydroxy compound. Accordingly, these polyurethane delustering agents can be used as polyurethanes. For details, refer to Published Japanese Translation of PCT International Patent Application No. 2005-530868.

monomer I (monomer I whose organic base structure contains no side alkyl group, selected from a group that includes aliphatic diisocyanate hexamethylene diisocyanate and 4,4'-diisocyanate-dicyclohexyl methane);

monomer II (monomer II whose organic base structure contains at least one side alkyl group, selected from a group that includes monoisocyanate, diisocyanate, polyisocyanate and any mixture thereof);

monomer III (bivalent polyester polyol or polyether polyol);

monomer IV (bivalent alcohol);

monomer V (hydroxy carboxylic acid);

monomer VI (polyamine);

monomer VII (amino alcohol); and monomer VIII (monovalent polyether alcohol alkoxylated by alkylene oxide or monovalent polyether alcohol);

wherein the amounts of introduced monomers I to VIII are such that:

the (—OH+>N—H)/NCO equivalent ratio of monomer III/monomers I+II is 0.1 to 0.75;

the (—OH+>N—H)/NCO equivalent ratio of monomer IV/monomers I+II is 0.2 to 0.8;

the (—OH+>N—H)/NCO equivalent ratio of monomer V/monomers I+II is 0.05 to 0.5;

the (—OH+>N—H)/NCO equivalent ratio of monomer VI/monomers I+II is 0 to 0.4;

the (—OH+>N—H)/NCO equivalent ratio of monomer VII/monomers I+II is 0 to 0.4;

the (—OH+>N—H)/NCO equivalent ratio of monomer VIII/monomers I+II is 0 to 0.2; and the (—OH+>N—H)/NCO equivalent ratio of total sum of monomers III to VIII/monomers I+II is 0.80 to 1.25;

wherein the total amount of monomer I and monomer II is 50 to 100 percent by mol relative to monomer I, while 50 to 2000 mMol of carboxyl groups in monomer V introduced per 1 kg of polyurethane A in the water-based preparation exists in the form of anions (Published Japanese Translation of PCT International Patent Application No. 2005-530868).

This polyurethane preparation contains insoluble grains in the polyurethane matrix, where the average diameter of these grains should be 1 to 20 μm, or preferably 2 to 15 μm, or more preferably 3 to 10 μm, or most preferably 3 to 7 μm (paragraph 0042 in the aforementioned Japanese patent publication). The polyurethane dispersant may contain commercial auxiliaries and additives, such as foaming agent, defoaming agent, emulsifier, consistency adjusting agent, wetting agent or thixotrope agent, and coloring agent such as dye or pigment.

Such water-based polyurethane preparation should preferably be used on leathers, as it further reduces gloss and adds wear resistance, water stability, elasticity, slight relustering property, dark color, and pleasant, warm and soft touch.

(4) For the cross-linking agent to cure these polyurethanes, various polyisocyanates, especially diisocyanates, can be used, where it is preferable to use at least one or more of tolylene diisocyanate, hexamethylene diisocyanate and methylene diisocyanate. In particular, these cross-linking agents should be used in the form of cross-linking agents that have been modified to contain multiple hydroxyl groups such as trimethylol propane, or as cross-linking agents of isocyanurate type in which three diisocyanate compound molecules are bonded. These cross-linking agents bond with function groups, etc., contained in the aforementioned binder to cross-link resins. The content of cross-linking agents should ideally be 10 to 30 parts by weight relative to 100 parts by weight of binder. When curing a thermoplastic resin or resins, a general rule of thumb is to let the resin mixture sit for 12 hours at room temperature.

Under the present invention, the below-mentioned coating film is formed on the base natural leather.

To be specific, the color coat layer and top coat layer are formed using different resin components selected according to the shape of the stress vs. strain curve, and these different resin components are combined to form each layer.

When forming the color coat layer, a hard component (a resin whose 10% modulus is over 2.3 but not more than 3.0) of a resin containing two-component polyurethane resin and polyurethane resin is mixed with a soft component (a resin whose 10% modulus is over 0.0 but not more than 1.0) of a resin containing two-component polyurethane resin and polyurethane resin.

Then, the top coat layer on top of the color coat layer is formed by mixing a medium component (a resin whose 10% modulus is over 1.0 but not more than 2.3) of a resin containing two-component polyurethane resin and polyurethane resin and a soft component (a resin whose 10% modulus is over 0.0 but not more than 1.0) of a resin containing two-component polyurethane resin and polyurethane resin.

It should also be noted that each layer is formed as follows by considering the amount of each component.

The aforementioned color coat layer is formed by mixing 48 to 90 percent by weight of a hard component (a resin whose 10% modulus is over 2.3 but not more than 3.0) of a resin containing two-component polyurethane resin and polyurethane resin and 52 to 10 percent by weight of a soft component (a resin whose 10% modulus is over 0.0 but not more than 1.0) of a resin containing two-component polyurethane resin and polyurethane resin; while the aforementioned top coat layer is formed by mixing 15.0 to 35.0 percent by weight of a medium component (a resin whose 10% modulus is over 1.0 but not more than 2.3) of a resin containing two-component polyurethane resin and polyurethane resin and 65.0 to 85.0 percent by weight of a soft component (a resin whose 10% modulus is over 0.0 but not more than 1.0) of a resin containing two-component polyurethane resin and polyurethane resin.

Under the present invention, the color coat layer is formed by mixing a hard component (a resin whose 10% modulus is over 2.3 but not more than 3.0) of a resin containing two-component polyurethane resin and polyurethane resin and a soft component (a resin whose 10% modulus is over 0.0 but not more than 1.0) of a resin containing two-component polyurethane resin and polyurethane resin.

On top of the color coat layer, the top coat layer is formed by mixing a medium component (a resin whose 10% modulus is over 1.0 but not more than 2.3) of a resin containing two-component polyurethane resin and polyurethane resin and a soft component (a resin whose 10% modulus is over 0.0 but not more than 1.0) of a resin containing two-component polyurethane resin and polyurethane resin.

As explained above, the aforementioned resins are classified into three components of hard component, medium component and soft component, of which hard and soft components are combined (color coat layer), while medium and soft components are also combined (top coat layer), to form new laminated layers, thereby creating a layered structure having new characteristics different from those of conventional layered structures. This is different from coating films whose characteristics are limited to those explained by conventional stress vs. strain curves.

What is important is the need to select appropriate resins according to the aforementioned components, and the results of classifying applicable resins from this viewpoint are shown below. You only need to select and utilize desirable resins from among these candidates as deemed appropriate.

Among resins containing two-component polyurethane resin and polyurethane resin, specific products corresponding to the hard component of a resin containing two-component polyurethane resin and polyurethane resin are listed below:

ASTACIN MATTING MA, ASTACIN FINISH PF, ASTACIN FINISH PE, ASTACIN FINISH PFM, ASTACIN TOP LH (all manufactured by BASF), AQUALEN TOP 2006. B (manufactured by CLARIANT), FINISH BB, BAYDERM FINISH 61UD, AQUADERM FINISH HAT, BAYDERM FINISH DLH, BAYDERM FINISH 71UD, BAYDERM FINISH 80UD, BAYDERM FINISH 95UD (all manufactured by LANXESS), WT-7370, WT-2511 (both manufactured by STAHL), HUX-561M1 (manufactured by ADEKA).

Among resins containing two-component polyurethane resin and polyurethane resin, specific products corresponding to the medium component of a resin containing two-component polyurethane resin and polyurethane resin are listed below:

ASTACIN FINISH PUMN (manufactured by BASF), AQUALEN TOP DP-2055, AQUALEN TOP 2002. A, MELIO PROMUL 68. A, MELIO PROMUL 66. A, AQUALEN TOP D-2017 (all manufactured by CLARIANT), LCC BINDER-UB-1770 (manufactured by DIC), BAYDERM RM FINISH 85UD, BAYDERM FINISH 65UD, HYDRHOLAC CR-5 EMULSION, HYDRHOLAC UD-2 DISPERSION (all manufactured by LANXESS), WT-13-492, WT-13-485, RU-13045, RU-6125, WT-2586 (all manufactured by STAHL).

Among resins containing two-component polyurethane resin and polyurethane resin, specific products corresponding to the soft component of a resin containing two-component polyurethane resin and polyurethane resin are listed below:

ASTACIN FINISH PUM, ASTACIN FINISH SUSI, NOVOMATT GG (all manufactured by BASF), AQUALEN TOP 2003. A, AQUALEN TOP 2007. A, AQUALEN TOP D-2012. B, AQUALEN TOP D-2019, PROMUL 95. A (all manufactured by CLARIANT), LCC BINDER-UB-1450, UB-1650F (both manufactured by DIC), BAYDERM FINISH 60UD, BAYDERM BOTTOM 51UD, BAYDERM BOTTOM DLV, BAYDERM FINISH 50UD, BOTTOM CTR, HYDRHOLAC 3089, HYDRHOLAC HW-G, HYDRHOLAC TS (all manufactured by LANXESS), RH-6663, RH-6677, RU-3906, WT-13-486, WT-2524 (all manufactured by STAHL).

Each component is explained below by showing a corresponding specific stress vs. strain curve.

Shapes of stress vs. strain curves can be classified by the value of 10% modulus. The 10% modulus represents the stress needed to generate a 10% strain, or degree of tensile force resulting in a 10% elongation.

If the 10% modulus of a given resin is greater than that of another resin, it means that the first resin must be pulled with a greater force, and elongates less, compared to the second resin. Resins can be grouped according to their resistance to elongation.

When resins containing two-component polyurethane resin and polyurethane resin are classified into different components, whether to use a single component or multiple components of resin containing two-component polyurethane resin and polyurethane resin can be determined arbitrarily. While increasing the number of components will likely permit finer adjustments, it is difficult to expect all components to change in the same manner and therefore blindly increasing components is not advisable. Instead, it is necessary to consider the types of components and their appropriate contents.

The color coat layer is formed by mixing a hard two-component polyurethane resin component (a resin whose 10% modulus is over 2.3 but not more than 3.0) and a soft two-component polyurethane resin component (a resin whose 10% modulus is over 0.0 but not more than 1.0).

Combination of resins corresponding to hard and soft components is explained below.

Clearly when components are combined, the total amount of constituent resins is more important than the number of components.

If a two-component aliphatic polyurethane resin (whose 10% modulus is 2.88; see FIG. 3) is used alone as the aforementioned matting agent, its content should be adjusted to 78 percent by weight (in the case of Example 11).

Figure 3:
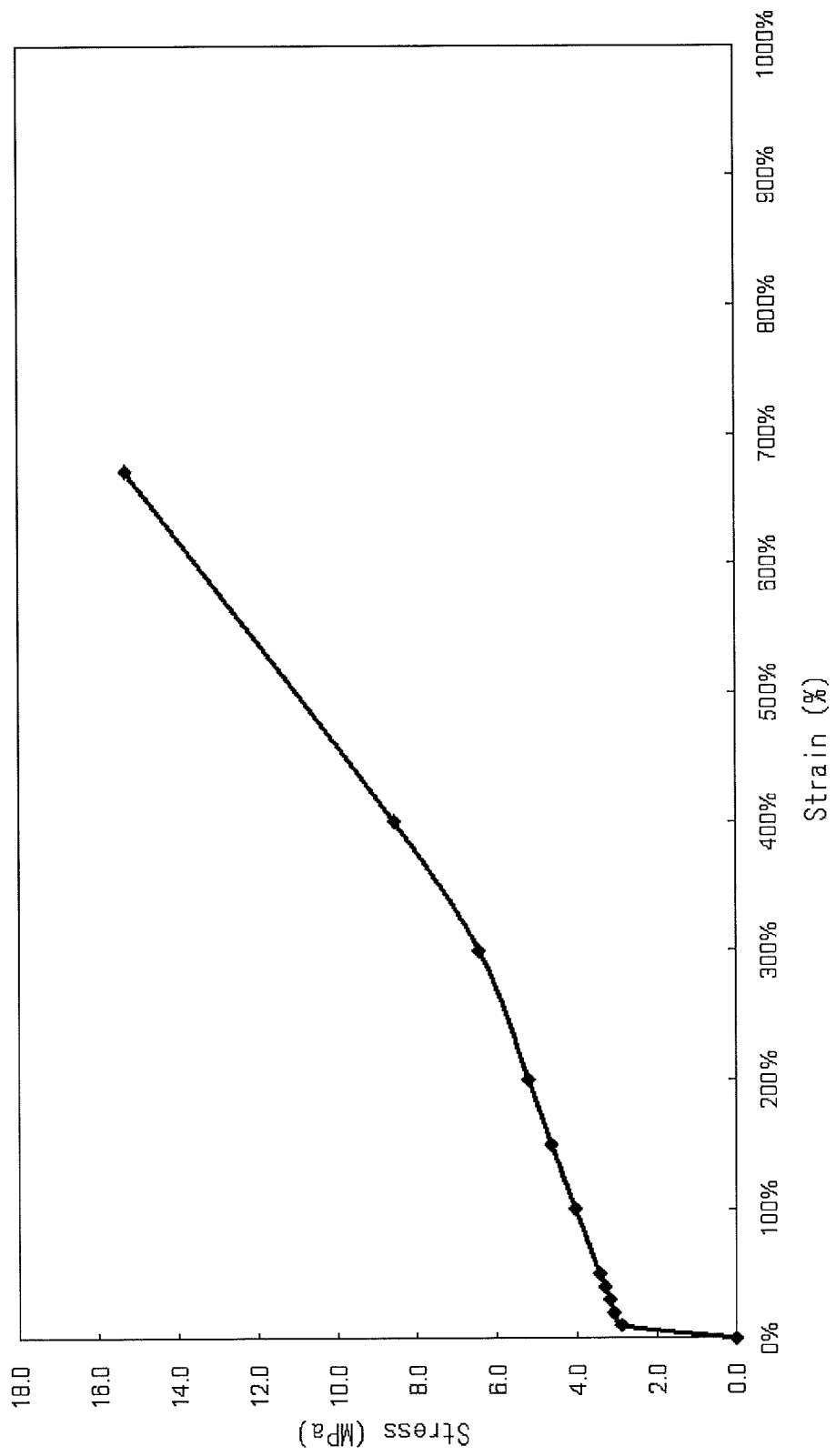
FIG. 3: A drawing showing a stress vs. strain curve of a two-component aliphatic polyurethane (whose 10% modulus is 2.88) used as a matting agent
Figure 4:
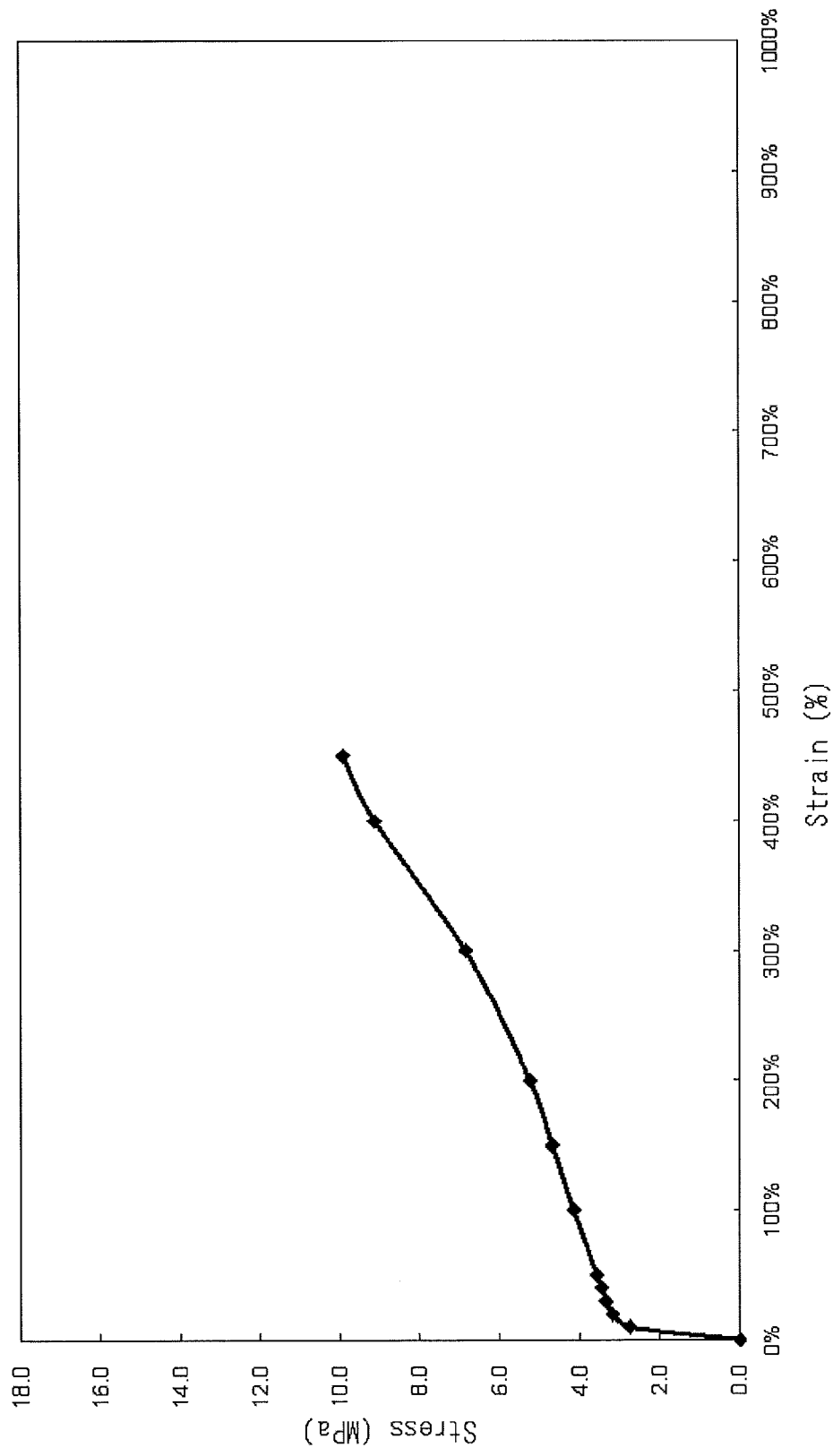
FIG. 4: A drawing showing a stress vs. strain curve of a two-component aliphatic polyurethane (whose 10% modulus is 2.77)

The hard component (a resin whose 10% modulus is over 2.3 but not more than 3.0) of a resin containing two-component polyurethane resin and polyurethane resin, which is used to form the color coat layer, is formed by mixing a two-component aliphatic polyurethane resin (whose 10% modulus is 2.88; see FIG. 3) being the matting agent and another two-component aliphatic polyurethane resin (whose 10% modulus is 2.77; see FIG. 4).

When a two-component aliphatic polyurethane resin (whose 10% modulus is 2.88; see FIG. 3) used as a matting agent is combined with another two-component aliphatic polyurethane resin (whose 10% modulus is 2.77; see FIG. 4), the total amount of both resins should be adjusted to 70 percent by weight (in the case of Examples 2 to 6).

Figure 5:
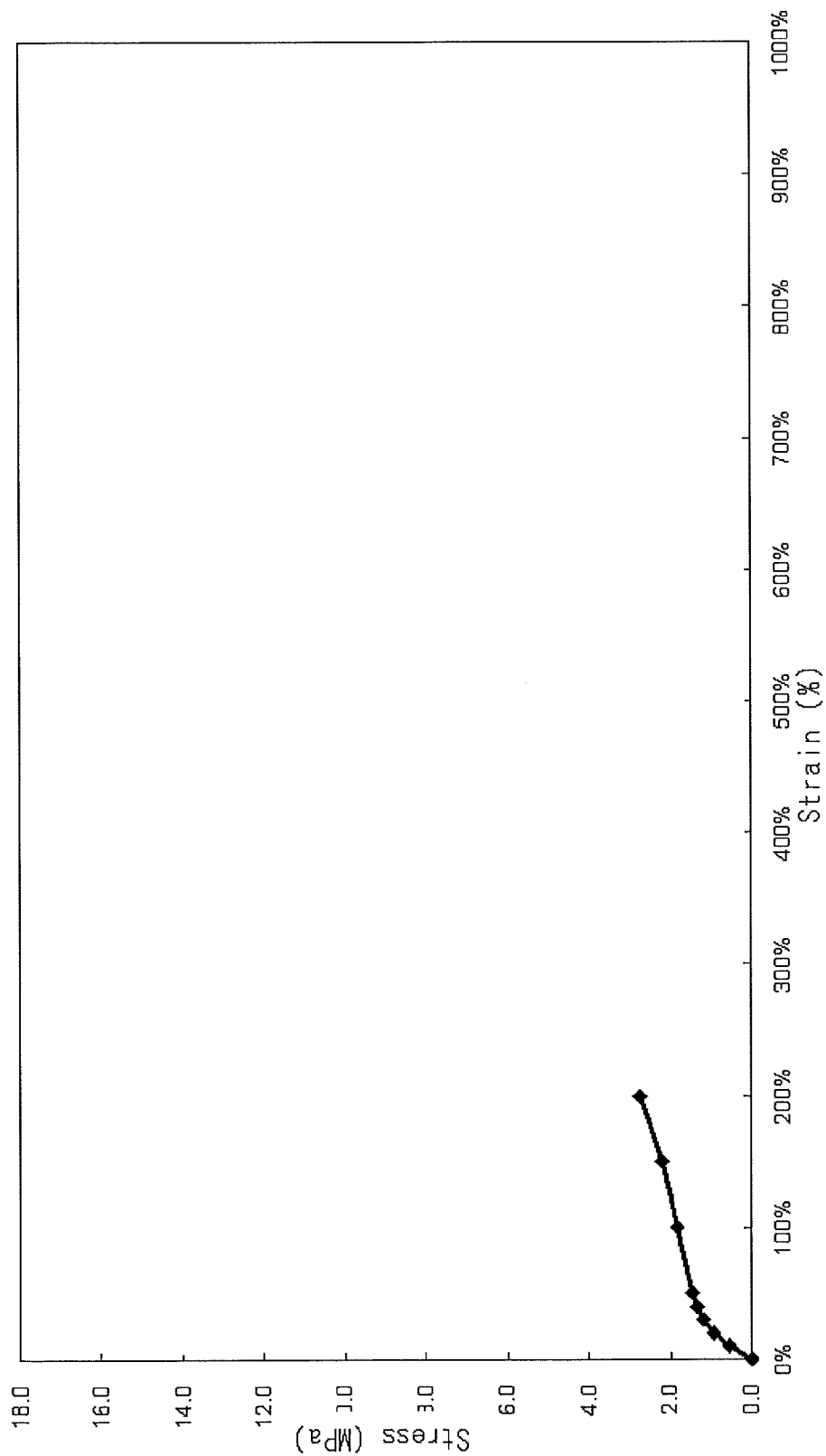
FIG. 5: A drawing showing a stress vs. strain curve of a two-component aliphatic polyurethane (whose 10% modulus is 0.54)
Figure 6:
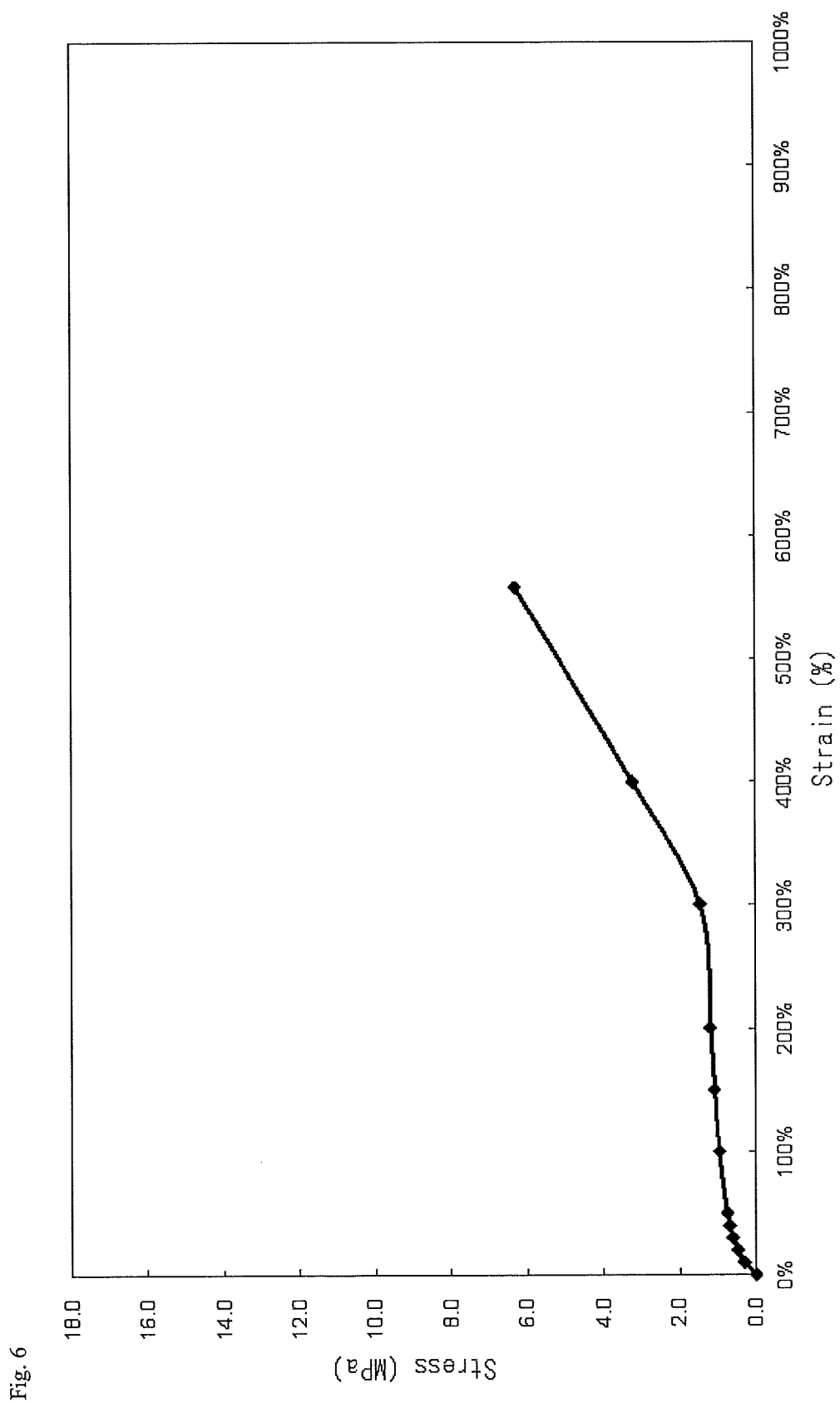
FIG. 6: A drawing showing a stress vs. strain curve of a two-component aliphatic polyurethane (whose 10% modulus is 0.30)
Figure 7:
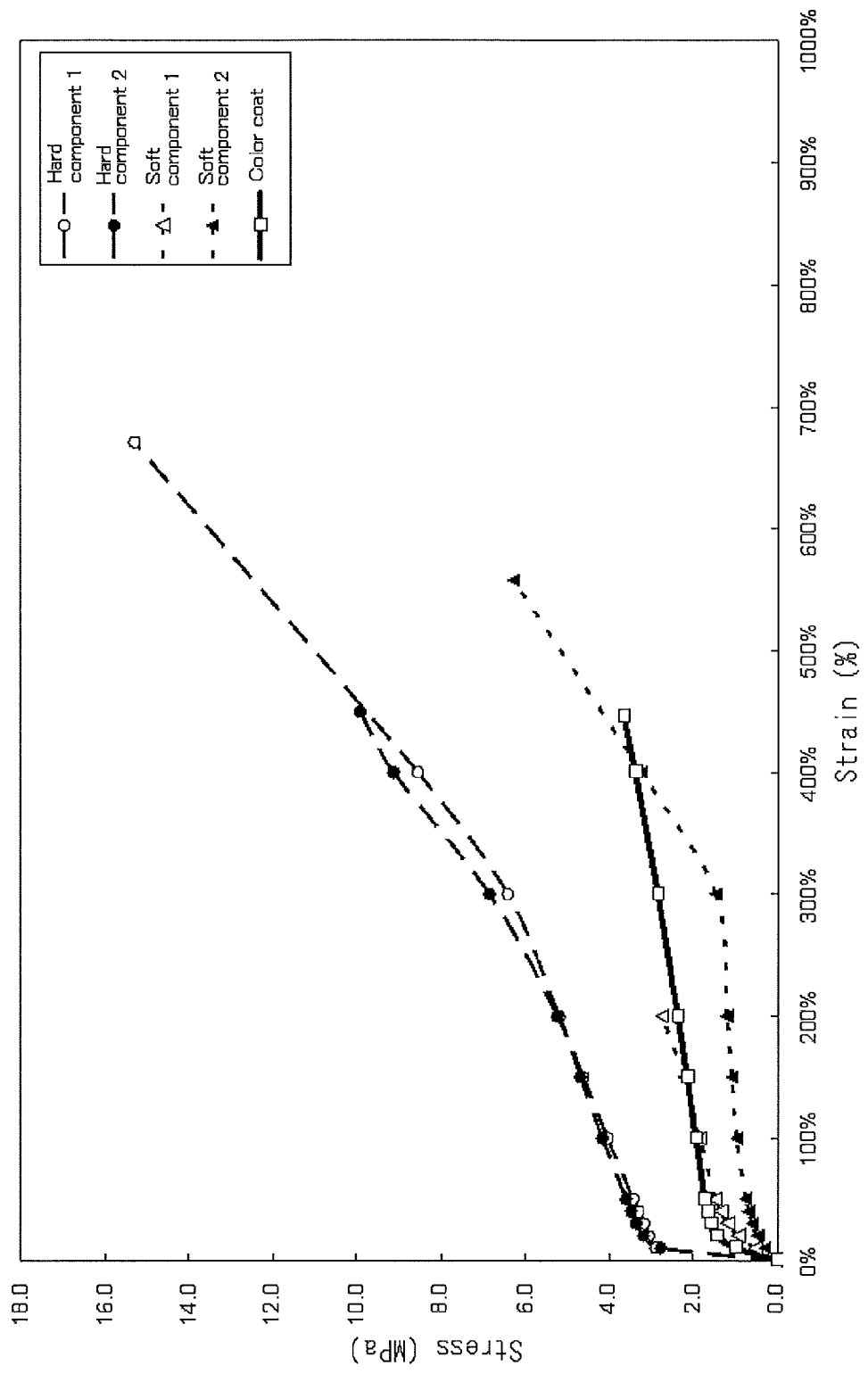
FIG. 7: A drawing showing a stress vs. strain curve of a color coat layer resin obtained by mixing the resins whose stress vs. strain curves are shown in FIGS. 3, 4, 5 and 6 above

The soft component of a resin containing two-component polyurethane resin and polyurethane resin, which is used to form the color coat layer, is formed by mixing an aliphatic polyurethane (whose 10% modulus is 0.54; see FIG. 5) and a two-component aliphatic polyurethane (whose 10% modulus is 0.30; see FIG. 6). In Examples 2 to 6, the total of both resins was adjusted to 30 percent by weight.

In Examples 7 to 10, the components of the top coat layer are fixed and the percentages of hard component of a resins and soft component of a resins constituting the color coat layer were changed. By calculating values this way, the ranges of changing color coat layer components can be made clearer.

In Example 7, the hard component is contained by 90 percent by weight, while the soft component is contained by 10 percent by weight;

In Example 8, the hard component is contained by 80 percent by weight, while the soft component is contained by 20 percent by weight;

In Example 9, the hard component is contained by 70 percent by weight, while the soft component is contained by 30 percent by weight; and In Example 10, the hard component is contained by 60 percent by weight, while the soft component is contained by 40 percent by weight.

The color coat layer contains 48 to 90 percent by weight of a hard component (a resin whose 10% modulus is over 2.3 but not more than 3.0) of a resin containing two-component polyurethane resin and polyurethane resin and 52 to 10 percent by weight of a soft component (a resin whose 10% modulus is over 0.0 but not more than 1.0) of a resin containing two-component polyurethane resin and polyurethane resin, where all mixing results were within the aforementioned ranges.

To form the top coat layer, a medium component (a resin whose 10% modulus is over 1.0 but not more than 2.3) of a resin containing two-component polyurethane resin and polyurethane resin, or a medium component of a resin (resin whose 10% modulus of two-component polyurethane resin is over 1.0 but not more than 2.3), is mixed with a soft two-component polyurethane resin component (whose 10% modulus is over 0.0 but not more than 1.0).

Figure 8:
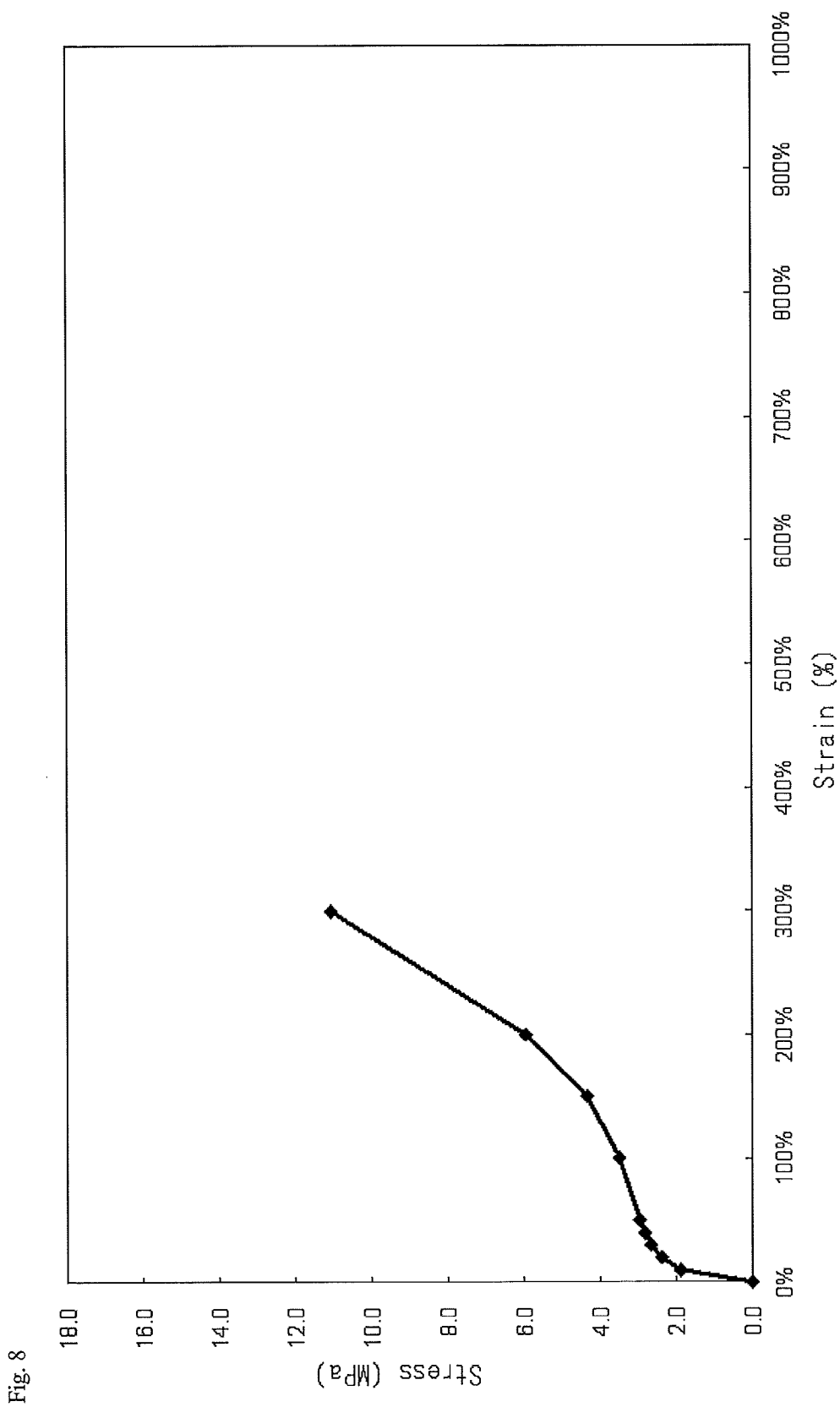
FIG. 8: A drawing showing a stress vs. strain curve of a two-component aliphatic polyurethane resin (whose 10% modulus is 1.89)

For the medium component (a resin whose 10% modulus is over 1.0 but not more than 2.3) of a resin containing two-component polyurethane resin and polyurethane resin, a two-component aliphatic polyurethane resin (whose 10% modulus is 1.89; see FIG. 8) is used. In Examples 2 to 6, the content changes from 7.5 to 15, 25, 30 and 37.5 percent by weight. In Examples 7 to 10, the medium component of the top coat layer was adjusted to 25 percent by weight.

In all cases, the medium component of a resin containing two-component polyurethane resin and polyurethane resin, which constitutes the top coat layer, was within a range of 15.0 to 35.0 percent by weight.

Figure 9:
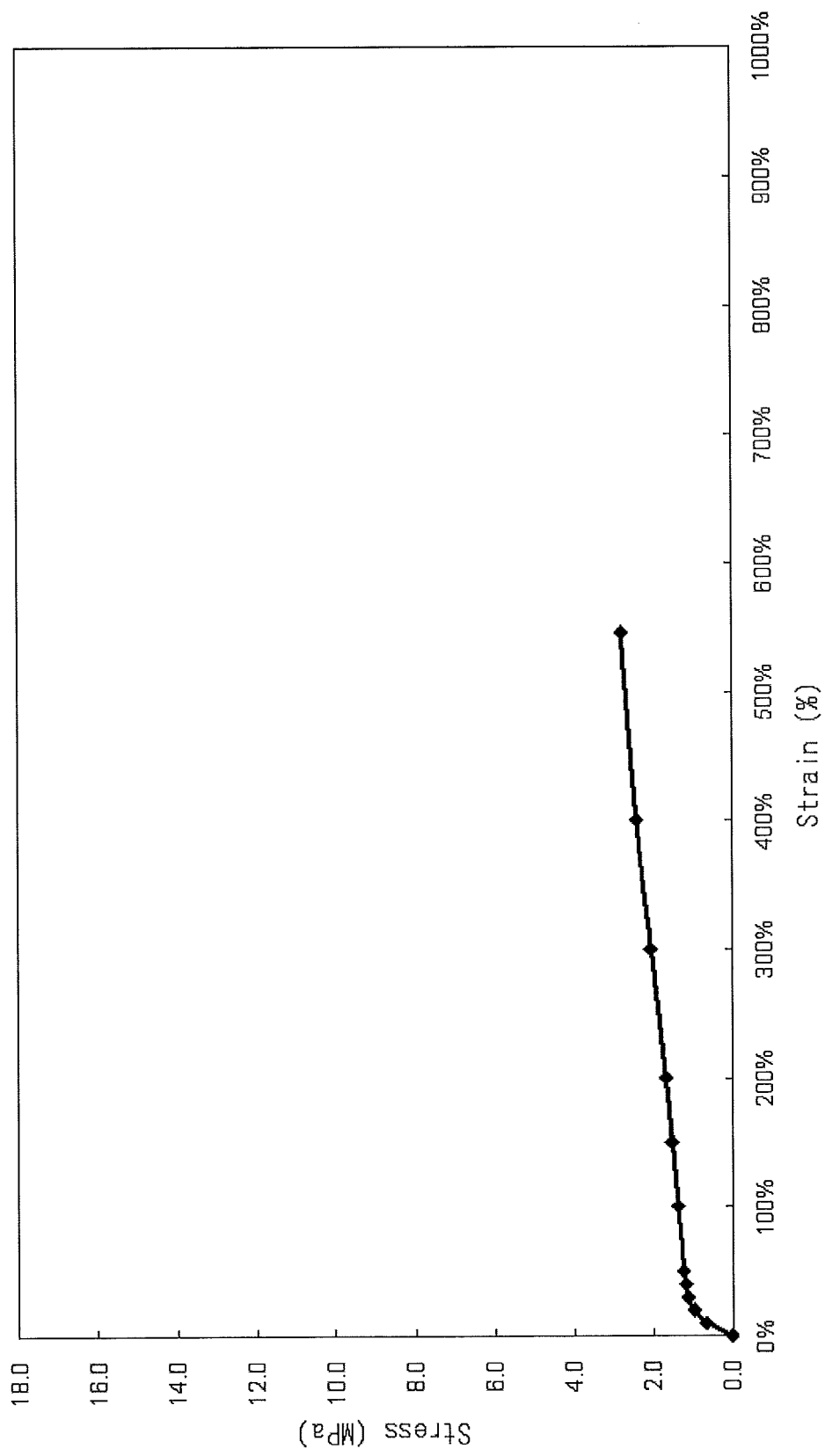
FIG. 9: A drawing showing a stress vs. strain curve of a two-component aliphatic polyurethane (resin mat) (whose 10% modulus is 0.67)
Figure 10:
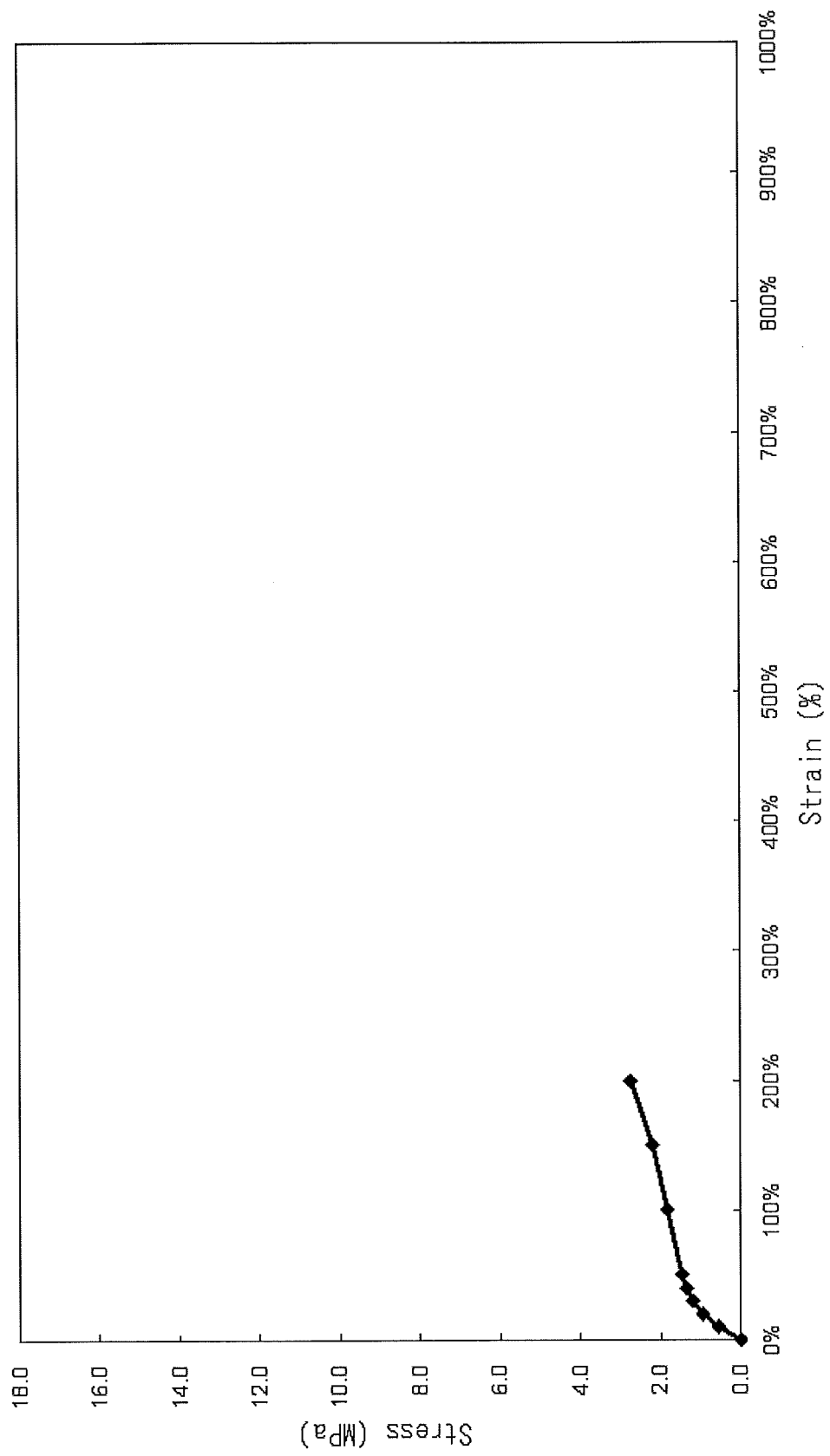
FIG. 10: A drawing showing a stress vs. strain curve of a two-component aliphatic polyurethane resin (whose 10% modulus is 0.54)
Figure 11:
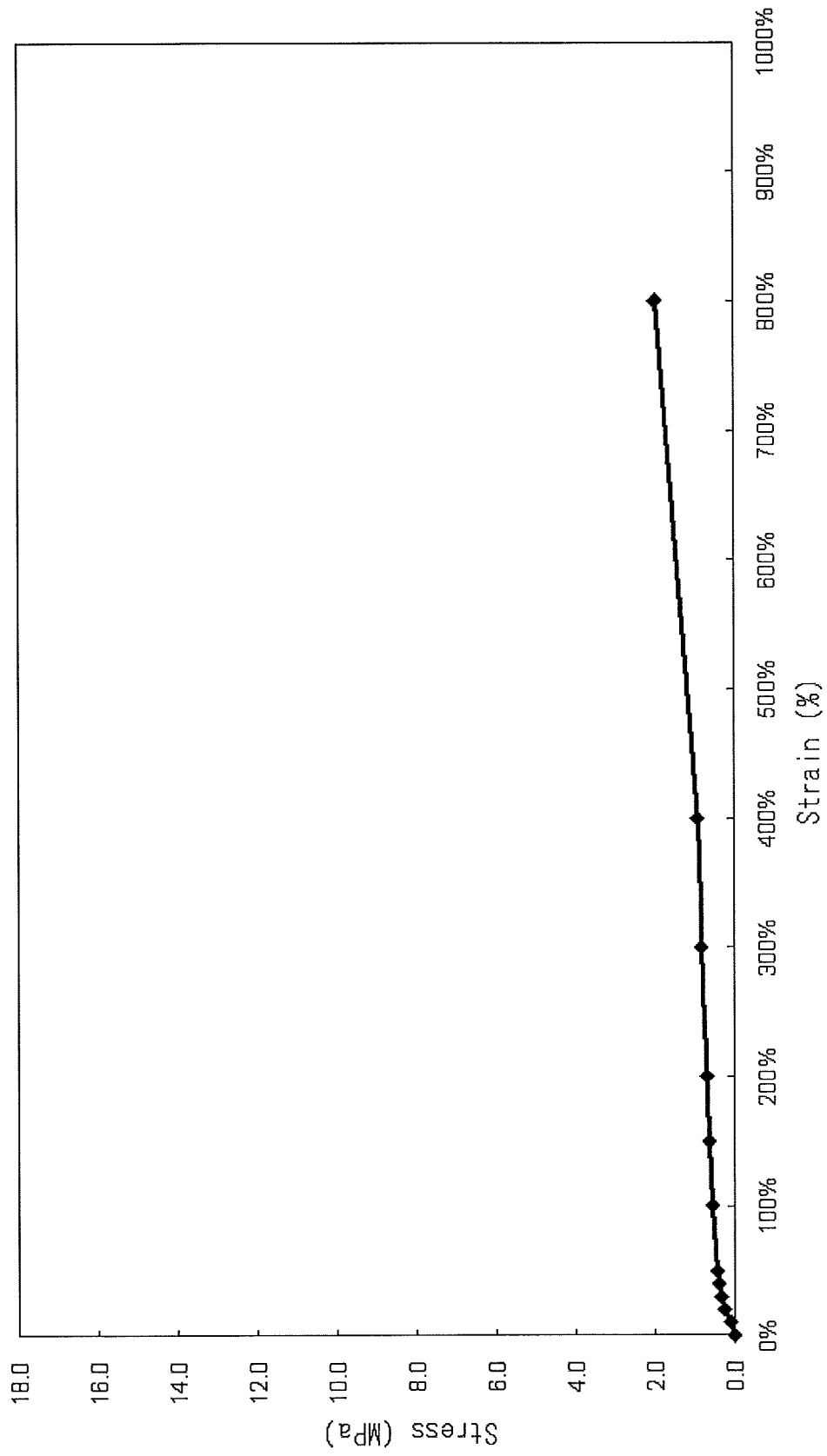
FIG. 11: A drawing showing a stress vs. strain curve of an acrylic polymer-urethane polymer copolymer (whose 10% modulus is 0.11)
Figure 12:
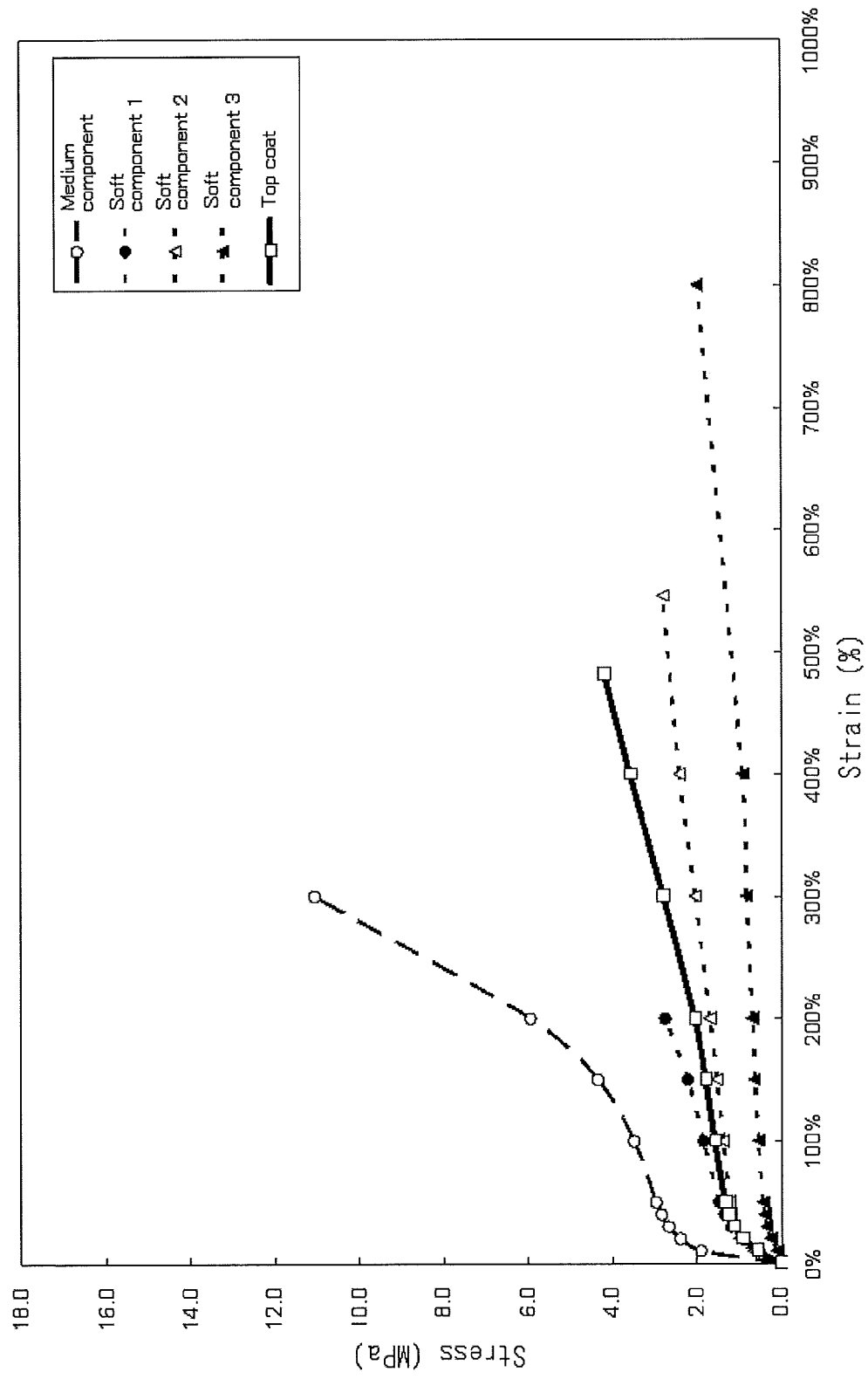
FIG. 12: A drawing showing a stress vs. strain curve of a top coat layer resin obtained by mixing the resins whose stress vs. strain curves are shown in FIGS. 8, 9, 10 and 11 above

The soft component (a resin whose 10% modulus is over 0.0 but not more than 1.0) of a resin containing two-component polyurethane resin and polyurethane resin, which is used to form the top coat layer, is formed by mixing a two-component aliphatic polyurethane resin (resin mat) (whose 10% modulus is 0.67; see FIG. 9), another two-component aliphatic polyurethane resin (whose 10% modulus is 0.54; see FIG. 10), and acrylic polymer-urethane polymer copolymer (whose 10% modulus is 0.11; see FIG. 11).

In Example 2, the total content is 85 percent by weight;
in Example 3, the total content is 70 percent by weight;
in Example 4, the total content is 75 percent by weight;
in Example 5, the total content is 70 percent by weight;
in Example 6, the total content is 62.5 percent by weight;
in Examples 7 to 10, the total content is 75 percent by weight; and
in Example 11, the content of each medium component is 25 percent by weight, with the total of three components amounting to 75 percent by weight.

In all cases, the total content of soft two-component polyurethane resin components each containing polyurethane resin (resin whose 10% modulus is over 0.0 but not more than 1.0) was within a range of 65.0 to 85.0 percent by weight.

As for the percentage of each component constituting the color coat layer and top coat layer, favorable results were obtained when the percentage was within each applicable range as mentioned above.

Once the percentages deviate from these ranges, a desirable top coat layer cannot be obtained.

Once a coating film has been formed, maturation, drum milling, vibration, pressing, etc., are performed as deemed necessary, after which the leather is forwarded to the inspection step and inspected.

The foregoing has explained the steps through which a coating film is formed on a base.

The base is explained below. To be specific, the leather manufacturing process proposed by the inventors of the present invention is explained, wherein a natural leather offering excellent characteristics not achievable before is manufactured through a leather tanning step as well as steps for neutralization, re-tanning, dyeing and greasing. The leather proposed by the inventors of the present invention, offering excellent characteristics not achievable before and manufactured through a leather tanning step as well as steps for neutralization, re-tanning, dyeing and greasing, is explained below (as described in Japanese Patent Application No. 2007-170359). Under the present invention, the most favorable results can be obtained by forming a coating film on a leather obtained as above. The following explanation mainly discusses the steps through which to obtain a base leather, which is a precondition for such most favorable results. Under the invention mentioned above, the following two inventions provide favorable leathers. Invention 1 explained below gives the most desirable natural leather for use under the present invention. Invention 2 also provides a good leather. Needless to say, it includes the type of good leather on which the present invention is premised.

The leather proposed by the inventors of the present invention, offering excellent characteristics not achievable before and manufactured through a leather tanning step as well as steps for neutralization, re-tanning, dyeing and greasing, is explained below (as described in Japanese Patent Application No. 2007-170359).

Invention 1 is explained below:

A natural leather obtained through:

(1) a pre-treatment step before leather tanning;

(2) a tanning step using glutaraldehyde as a tanning agent;

(3) a step where the leather is re-tanned using a re-tanning agent constituted by synthetic tannin, resin and aluminum compound, where the synthetic tannin is constituted by (A) condensation product of aromatic sulfonic acid and formaldehyde, or aromatic sulfonic acid and condensation product of aromatic sulfonic acid and formaldehyde, (B) methylene cyclocondensation product of aromatic sulfonic acid and hydroxy aromatic compound, or aromatic sulfonic acid and methylene cyclocondensation product of aromatic sulfonic acid and hydroxy aromatic compound, and (C) glyoxal, while the resin is constituted by (A) an acrylic acid, methacrylic acid, acrylic acid ester or methacrylic acid ester polymer or mixture, or copolymer of any combination of the foregoing or mixture of such copolymers, and (B) polycondensation product of melamine and formaldehyde, where the leather is re-tanned using a re-tanning agent of the aforementioned constitution, after which it is dyed, and then greased using a greasing agent constituted by (A) synthetic oil and natural oil, or (B) mixed oil containing synthetic oil and natural component; and (4) a post-treatment step after re-tanning Invention 2 is explained below:

A natural leather obtained through:

(1) a pre-treatment step before leather tanning;

(2) a tanning step using glutaraldehyde as a tanning agent;

(3) a step where the leather is re-tanned using a re-tanning agent constituted by synthetic tannin and resin, where the synthetic tannin is constituted by (A) condensation product of aromatic sulfonic acid and formaldehyde, or aromatic sulfonic acid and condensation product of aromatic sulfonic acid and formaldehyde, (B) methylene cyclocondensation product of aromatic sulfonic acid and hydroxy aromatic compound, or aromatic sulfonic acid and methylene cyclocondensation product of aromatic sulfonic acid and hydroxy aromatic compound, and (C) glyoxal, while the resin is constituted by (A) an acrylic acid, methacrylic acid, acrylic acid ester or methacrylic acid ester polymer or mixture, or copolymer of any combination of the foregoing or mixture of such copolymers, and (B) polycondensation product of melamine and formaldehyde, where the leather is re-tanned using a re-tanning agent of the aforementioned constitution, after which it is dyed, and then greased using a greasing agent constituted by (A) synthetic oil and natural oil, or (B) mixed oil containing synthetic oil and natural component; and (4) a post-treatment step after re-tanning.

In Invention 1 as explained above, the aforementioned re-tanning agent is constituted by 20 to 30 percent by weight of synthetic tannin, 13 to 25 percent by weight of resin and 0.7 to 4.0 percent by weight of aluminum, relative to 100 percent by weight of shaved leather, wherein the aforementioned synthetic tannin is constituted by (A) 0.45 to 0.50 of condensation product of aromatic sulfonic acid and formaldehyde, or aromatic sulfonic acid and condensation product of aromatic sulfonic acid and formaldehyde, (B) 0.38 to 0.43 of methylene cyclocondensation product of aromatic sulfonic acid and hydroxy aromatic compound, or aromatic sulfonic acid and methylene cyclocondensation product of aromatic sulfonic acid and hydroxy aromatic compound, and (C) 0.10 to 0.15 of glyoxal (all are ratios by weight, giving a total of 1.00), while the aforementioned resin is constituted by (A) 0.67 to 0.72 of acrylic acid, methacrylic acid, acrylic acid ester or methacrylic acid ester polymer or mixture, or copolymer of any combination of the foregoing or mixture of such copolymers, and (B) 0.28 to 0.33 of polycondensation product of melamine and formaldehyde (both are ratios by weight, giving a total of 1.00), and the greasing agent constituted by (A) synthetic oil and natural oil, or (B) mixed oil containing synthetic oil and natural component accounts for 15 to 19 percent by weight per 100 percent by weight of shaved leather.

Characteristics of Invention 1 explained above include a sample taken from a part of the leather obtained after the post-treatment step after re-tanning where the rigidity/softness is 5.0 mm or more and maximum setting rate is 10% or less.

In Invention 2 as explained above, the aforementioned re-tanning agent is constituted by 20 to 30 percent by weight of synthetic tannin and 13 to 25 percent by weight of resin (both are relative to 100 percent by weight of shaved leather), wherein the aforementioned synthetic tannin is constituted by (A) 0.45 to 0.50 of condensation product of aromatic sulfonic acid and formaldehyde, or aromatic sulfonic acid and condensation product of aromatic sulfonic acid and formaldehyde, (B) 0.38 to 0.43 of methylene cyclocondensation product of aromatic sulfonic acid and hydroxy aromatic compound, or aromatic sulfonic acid and methylene cyclocondensation product of aromatic sulfonic acid and hydroxy aromatic compound, and (C) 0.10 to 0.15 of glyoxal (all are ratios by weight, giving a total of 1.00), while the aforementioned resin is constituted by (A) 0.67 to 0.72 of acrylic acid, methacrylic acid, acrylic acid ester or methacrylic acid ester polymer or mixture, or copolymer of any combination of the foregoing or mixture of such copolymers, and (B) 0.28 to 0.33 of polycondensation product of melamine and formaldehyde (both are ratios by weight, giving a total of 1.00), and the greasing agent constituted by (A) synthetic oil and natural oil, or (B) mixed oil containing synthetic oil and natural component accounts for 15 to 19 percent by weight per 100 percent by weight of shaved leather.

The characteristics of Invention 2 mentioned above include a sample taken from a part of the leather obtained after the post-treatment after re-tanning where the rigidity/softness is 4.42 mm or more but not more than 4.90 mm and maximum setting rate is 10.7 or more but not more than 13.9.

The aforementioned two inventions are both described in Japanese Patent Application No. 2007-170395 by the inventors of the present invention.

The specific manufacturing method is explained below.

A series of processes were performed to obtain a natural leather through a leather tanning step as well as steps for neutralization, re-tanning, dyeing and greasing.

(1) The pre-treatment before leather tanning is explained below.

A material leather taken from adult cow hide is soaked in water, and then washed with water and taken out, after which gluey substances at the back (such as fat and flesh) are mechanically removed and the obtained leather is soaked in lime solution to dissolve the hairs on the surface of leather, and then smut on the surface of leather is removed and lime is permeated into the leather to loosen the fibers, after which the leather is separated into the grain side (front side of leather) and flesh side (back side of leather) using a band knife. In this step, processes are performed to remove keratin in the epidermal layer and elastin in the lower layer. The obtained leather is in a condition where all parts other than collagen fibers have been removed from its structure. These are traditional processes and processing means that are already known to the public can be adopted as deemed appropriate.

(2) The "tanning" step is explained below.

The grain side and flesh side obtained by the preceding step are delimed by neutralizing and removing the lime that has permeated into the leather in the preceding step (pH-adjusted water is sprayed and other process is performed to promote the action of proteolytic enzyme; water used in this process is adjusted to a temperature of 30 to 35° C. and contains sodium hydrogen sulfite containing 1 to 2% of ammonium chloride, etc.), and then given a bating treatment in the presence of a proteolytic enzyme (a bating agent blended with pancreatin or other enzyme is used) (in this process, water containing an appropriate splitting enzyme is permeated into the leather, using water containing 0.8 to 1.2% of this enzymatic agent and 0.5% of ammonium chloride), after which the collagen tissue is softened and enzyme is removed, followed by tanning using a tanning agent (water containing an appropriate tanning agent is permeated).

For the tanning agent, glutaraldehyde is used. 1 to 10 percent by weight of glutaraldehyde is used relative to the weight of leather. In this process, the tanning agent is used together with water of approx. 30° C., at pH1.8 to 5 and temperature of 20° C. to 30° C., where the processing time is 8 to 12 hours. The heat contraction temperature when glutaraldehyde is used is 65 to 70° C.

The series of processes from deliming to bating and tanning are performed in a single drum over time. After the tanning process is complete, the leather is squeezed and then strained to achieve a leather thickness of desired level, after which the back side is shaved to adjust the thickness (shaving), followed by cutoff of unnecessary parts along the periphery of the leather (trimming).

(3) The "re-tanning" step is explained below.

The leather obtained through the tanning step is re-tanned using a re-tanning agent constituted by synthetic tannin and resin, after which the leather is dyed and then greased by adding a greasing agent. Re-tanning, dyeing and greasing are performed in the same drum, where each process is implemented for a specified time.

The aforementioned re-tanning agent is constituted by 20 to 30 percent by weight of synthetic tannin and 13 to 25 percent by weight of resin, relative to 100 percent by weight of shaved leather.

Whether or not the preceding neutralization has been successful is confirmed before re-tanning. To be specific, a pH indicator solution is dripped onto a cross-section of the leather and the color change layer is observed. As a rough guide, the pH level should be approx. 5 to 6 for the surface layer and approx. 3 to 4 for the inner layer, for top-grain leathers. In the re-tanning step, the synthetic tanning agent or other tanning agent used should be in a state of aqueous solution containing 50 to 200% of such tanning agent relative to the weight of the leather used.

The pH range should be 3.0 to 8.0, or preferably 3.5 to 6.5. The re-tanning step should be continued desirably for 1.5 to 24 hours, or more desirably for 2 to 8 hours.

The aforementioned synthetic tannin is constituted by (A) 0.45 to 0.50 of condensation product of aromatic sulfonic acid and formaldehyde, or aromatic sulfonic acid and condensation product of aromatic sulfonic acid and formaldehyde, (B) 0.38 to 0.43 of methylene cyclocondensation product of aromatic sulfonic acid and hydroxy aromatic compound, or aromatic sulfonic acid and methylene cyclocondensation product of aromatic sulfonic acid and hydroxy aromatic compound, and (C) 0.10 to 0.15 of glyoxal (all are ratios by weight, giving a total of 1.00).

In addition, the aforementioned aromatic sulfonic acid and condensation product of aromatic sulfonic acid and formaldehyde (contained by a ratio of 1.0 by weight) is a mixture containing over 0 but not more than 0.3 (ratio by weight) of aromatic sulfonic acid and less than 1 to 0.7 (ratio by weight) of condensation product of aromatic sulfonic acid and formaldehyde.

Furthermore, the aforementioned aromatic sulfonic acid and methylene cyclocondensation product of aromatic sulfonic acid and hydroxy aromatic compound (contained by a ratio of 1.0 by weight) is a mixture containing over 0 but not more than 0.3 (ratio by weight) of aromatic sulfonic acid and less than 1 to 0.7 (ratio by weight) of methylene cyclocondensation product of aromatic sulfonic acid and hydroxy aromatic compound.

The aforementioned aromatic sulfonic acid is a monosulfone, disulfone or salt thereof obtained via sulfonation of an aromatic compound selected from the group that includes benzene, phenyl benzene, diphenyl ether and naphthalene, among others. Use of such aromatic sulfonic acid as a re-tanning agent is also known (German Patent No. 578578, U.S. Pat. No. 2,315,951, U.S. Pat. No. 3,906,037, Japanese Patent Laid-open No. Sho 56-28300).

Specific examples include naphthalene sulfonic acid, phenol sulfonic acid, sulfonated ditolyl ether, 4,4'-dihydroxy diphenyl sulfone, sulfonated diphenyl methane, sulfonated biphenyl, sulfonated terphenyl or benzene sulfonic acid, naphthalene disulfonic acid, phenol disulfonic acid, disulfonated ditolyl ether, 4,4'-dihydroxy diphenyl disulfone, disulfonated diphenyl methane, disulfonated biphenyl, disulfonated terphenyl or benzene disulfonic acid.

These phenol sulfonic acids and formaldehyde condensation products of these phenol sulfonic acids can be used. To be specific, Synectan PN, Synectan WF (both manufactured by Zeneca), Tanigan LH (manufactured by Bayer) and Forestane DW (manufactured by Forest) can be used, among others.

Also, the aforementioned naphthalene sulfonic acids and formaldehyde condensation products of naphthalene sulfonic acids can be used. To be specific, Synectan ACNN (manufactured by Zeneca) can be used.

Other examples include other mixtures of phenol sulfonic acids and formaldehyde condensation products of these phenol sulfonic acids, or naphthalene sulfonic acids and formaldehyde condensation products of naphthalene sulfonic acids, such as Tanigan 3LN (manufactured by Bayer), Basyntan DLX (manufactured by BASF), Forestane LC (manufactured by Forest) and others, which are tanning agents containing PSA and NSA.

The weight-average molecular weight of the aforementioned naphthalene sulfonic acid or formaldehyde condensation product of naphthalene sulfonic acid, or phenol sulfonic acid or formaldehyde condensation product of phenol sulfonic acid, is 400 to 4000 for the former, and 200 to 2000 for the latter.

The methylene cyclocondensation product of aromatic sulfonic acid and hydroxy aromatic compound is explained below.

The hydroxy aromatic compound is a phenol, cresol or dihydroxy diphenyl methane.

The methylene cyclocondensation product of hydroxy aromatic compound is a condensation product of the aforementioned hydroxy aromatic compound and formaldehyde. It is a condensation product of sulfonated phenol and formaldehyde, condensation product of sulfonated phenol or cresol and formaldehyde, formaldehyde condensation product of 4,4'-dihydroxy diphenyl sulfone and (hydroxy) aryl sulfonic acid, formaldehyde condensation product of sulfone-containing aromatic hydroxy compound and aryl halide, or urea-formaldehyde condensation product of phenol and phenol sulfonic acid (Japanese Patent Laid-open No. Hei 8-232000, Japanese Patent Laid-open No. Hei 10-101757).

Glyoxal is a compound used as a tanning agent conforming to the present invention, as well as a fiber processing agent, paper processing agent, soil hardener, or other intermediate of organic synthesis.

Among the manufacturing methods of glyoxal, one whereby a corresponding alcohol compound, glycol aldehyde, etc., is oxidized is generally known. Among these methods, a method to oxidize and dehydrogenate ethylene glycol in the presence of a silver catalyst is known (Examined Japanese Patent Laid-open No. Sho 61-54011, Japanese Patent Laid-open No. Hei 6-329575). Any known substance manufactured as above can be purchased and used.

The aforementioned resin is constituted by (A) 0.67 to 0.72 of acrylic acid, methacrylic acid, acrylic acid ester or methacrylic acid ester polymer or mixture, or copolymer of any combination of the foregoing or mixture of such copolymers, and (B) 0.28 to 0.33 of polycondensation product of melamine and formaldehyde (both are ratios by weight, giving a total of 1.00).

The acrylic acid, methacrylic acid, acrylic acid ester or methacrylic acid ester polymer is a polymer obtained by polymerizing monomers selected from the group that includes acrylic acid, methacrylic acid, acrylic acid ester and methacrylic acid ester, or mixture of such polymers.

The acrylic acid, methacrylic acid, acrylic acid ester or methacrylic acid ester copolymer is a copolymer constituted by monomers selected from the group that includes acrylic acid, methacrylic acid, acrylic acid ester and methacrylic acid ester, or mixture of such copolymers.

The acrylic acid, methacrylic acid, acrylic acid ester or methacrylic acid ester copolymer also includes a graft polymer obtained by polymerizing monomers selected from the group that includes acrylic acid, methacrylic acid, acrylic acid ester and methacrylic acid ester and then polymerizing the resulting polymerized monomers.

The weight-average molecular weight of such polymer should be 1,000 to 250,000, or more preferably 1,000 to 100,000. Any commercial product can be purchased and used.

These resins are mixed in to add visco-elasticity (rubber property) and also add hardness and elongation-resisting property. These acrylic resins are deemed to be adding elasticity to the leather and contributing significantly to the improvement of its setting rate (ease of restoring the original shape after elongation). However, it is not desirable to use a more-than-necessary amount of acrylic resins in view of their characteristics, because doing so will affect the characteristics of leather too much. Accordingly, it is important to maintain the content of acrylic resins within the aforementioned range.

Use of an acrylic acid or methacrylic acid or mixture thereof, acrylic acid ester or methacrylic acid ester, or polymer based on acrylic acid and/or methacrylic acid, etc., as a tanning agent, is already known to the public through Japanese Patent Laid-open No. Sho 56-59900, Japanese Patent Laid-open No. Sho 56-161500, etc. However, these substances are not always sufficiently stable and it has been pointed out that use of them results in lines, cracks, etc., generating at the surface of leather (Japanese Patent Laid-open No. Hei 4-89900, Japanese Patent Laid-open No. Hei 9-95700), and therefore it is necessary to combine them according to the present invention.

Polycondensation Product of Melamine and Formaldehyde

Use of a resin constituted by a condensation product of melamine and formaldehyde is described in Japanese Patent Laid-open No. Sho 63-89600, Japanese Patent Laid-open No. Sho 63-89599, etc.

An effective ratio of melamine and formaldehyde is 1:1.5 to 1:6 or so.

It is also effective to use a resin mixture or mixed resin constituted by melamine and formaldehyde resins or melamine formaldehyde resins composed by anionic resins.

It is also effective to etherify at least one of melamine and formaldehyde using glycol ether or alkyl glycol ether.

Melamine resins are expected to add such characteristics resulting in suppleness of leather, but the result of combining an acrylic resin with a melamine resin was effective, which led to the favorable outcome of the present invention.

In the dyeing step, the leather is dyed using a dye.

In the dyeing step, an appropriate dye or pigment is used according to the desired color.

The leather obtained through the aforementioned processing method is dyed using an acid water-based dye. This acid water-based dye is constituted by several components including water-based medium and dye.

The water-based medium refers to a mixture of water and aqueous solvent constituted by water and alcohol, etc. For the dye, any type of dye that can add color to the leather can be used, such as an acid dye or reactive dye.

In the greasing step, the leather is treated using a greasing agent.

The greasing step is a process that follows the dyeing step after re-tanning, and performed for the purpose of adding the required flexibility to the leather product by treating it with an oil agent called "greasing agent." This greasing agent is formulated to easily penetrate through the interior of the leather.

The leather treated in the greasing step after the dyeing step is in a wet condition and water present between fibers in fiber bundles allows the fibers to remain flexible. Once this water dries up, however, these fibers stick together and both the fibers and tissue will harden. Accordingly, it is effective to pre-treat the leather, before drying, using an oil agent that inhibits the mutual sticking of fibers. There is also a need to add functions such as those for protecting leather fibers (water repellency, water-proofing property), touch, and bulkiness to the leather. The greasing step achieves this purpose using a greasing agent.

The leather is treated with a greasing agent for 1 to 6 hours at a temperature of 25 to 50° C.

The greasing agent is added by 15 to 19 percent by weight relative to 100 percent by weight of shaved leather.

For the greasing agent, synthetic oil, natural oil or mixture of synthetic oil and natural oil components is used (the ratio of the two should be 0.4 to 0.6:0.6 to 0.4 by weight). One example of synthetic oil is sulfonated oil, or specifically alkyl sulfonic acid constituted by polyolefin. Ethylene oxide oil can also be used. Examples of natural oil include an ester sulfuric acid of animal or plant-derived glyceride being sulfated oil, alkyl sulfonic acid of fish oil glyceride being sulfited oil, and monoglyceride oil, among others.

The mixing ratio of synthetic oil, natural oil and mixture of synthetic oil and natural oil components is determined as deemed appropriate.

(4) The post-treatment step after re-tanning, which is part of the leather manufacturing process, is explained below.

In the post-treatment step after re-tanning, the leather is dried and finished (drying/coating). Before wet finishing, and the wet leather that has been dyed and greased is pre-dried, in order to fix the greasing agent and dye more strongly so as to add color fastness, water resistance and flexibility. Then, the leather is flattened to stretch the lines on its surface. One characteristic of the process proposed herein is inclusion of this line stretching step.

The neutralized, re-tanned, dyed and greased leather contains approx. 70 to 80% water, so water is squeezed out to facilitate drying. A setter is used to stretch the leather and make it flat to remove water. The water content is thus reduced to a range of 50 to 60%. Thereafter, the leather is hang-dried at 30 to 50° C. to a water content of 7% or less.

This drying may be implemented by spreading the leather and sticking it on a sheet of glass or by means of vacuum drying. This is followed by conditioning to add some water to the dried leather to adjust the water content to an appropriate level.

Staking is then performed to adjust the softness of the leather. Vibration staking is used for this purpose.

After staking, drum milling is performed for 3.5 to 6.5 hours to loosen the leather fibers and thereby soften the leather.

Next, net drying is performed where the leather is fixed over a net using toggles, and pulled. The leather is dried in this condition for 2 to 3 hours at a temperature of 45 to 65° C. If these operations are performed carefully, conditioning, staking, drum milling and toggled net drying can be repeated.

This is followed by trimming, where the edges that have hardened due to drying, toggled areas showing pinching marks and extremely thin areas are cut off and the leather is shaped. Thereafter, drum milling is performed for 4 to 6 hours.

Under the present invention, the aforementioned leather or leather obtained by chromium-tanning the aforementioned leather is used as the base and the coating film specified under the present invention is formed on the surface of this base, to achieve a new natural leather having the desired unique touch not offered by conventional natural leathers.

The slickness (MIU/MMD) of the natural leather obtained by forming the coating film specified under the present invention is not affected by how the base is tanned, and even when a chrome-tanned base is used, favorable slickness (MIU/MMD) can be achieved just like when a glutaraldehyde-tanned base is used.

However, the flexibility of the base affects the slickness (MIU/MMD) regardless of the tanning method, and if the base is hard, favorable slickness (MIU/MMD) cannot be achieved. This is probably because when the MMD (variation in the coefficient of surface friction) is measured, a soft base absorbs fine surface irregularities of the coating film and the MMD becomes small, thereby causing the slickness (MIU/MMD) to increase, while a hard base cannot absorb fine surface irregularities and the MMD increases, thereby causing the slickness (MIU/MMD) to drop.

Favorable slickness (MIU/MMD) can be achieved with a base having BLC (rigidity/softness) of 3.0 or more.

What happens when a chrome-tanned base is used is described below.

A natural leather is characterized in that the leather is obtained by tanning and re-tanning which are:

(1) a pre-treatment step before leather tanning;
(2) a tanning step using a trivalent chromium complex as a tanning agent;
(3) a step where the leather is re-tanned using a resin tanning agent or synthetic tanning agent containing an acrylic acid, methacrylic acid, acrylic acid ester or methacrylic acid ester polymer or mixture, or copolymer of any combination of the foregoing, where such tanning agent is used by 10 percent by weight relative to the weight of leather, after which the leather is dyed, and then greased using a greasing agent; and
(4) a post-treatment step after re-tanning.

This manufacturing method comprises operations similar to those in the aforementioned method, and as explained above, a resin re-tanning agent or synthetic tanning agent can be used.

(1) The Tanning and Re-Tanning Steps are Explained Below.

(A) The Tanning Step is Explained Below.

The grain side and flesh side obtained by the preceding step are delimed by neutralizing and removing the lime that has permeated into the leather in the preceding step (pH-adjusted water is sprayed and other process is performed to promote the action of proteolytic enzyme; water used in this process is adjusted to a temperature of 30 to 35° C. and contains sodium hydrogen sulfite containing 1 to 2% of ammonium chloride, etc.), and then given a bating treatment in the presence of a proteolytic enzyme (a bating agent blended with pancreatin or other enzyme is used) (in this process, water containing an appropriate splitting enzyme is permeated into the leather, using water containing 0.8 to 1.2% of this enzymatic agent and 0.5% of ammonium chloride), after which the collagen tissue is softened and enzyme is removed.

Next, the leather is soaked for approx. 3 hours in a solution whose pH has been adjusted to a range of 2 to 3 using sulfuric acid and formic acid (pickling). This is because the chromium tanning agent would not dissolve in a non-acid solution.

Next, a commercially available chromium sulfate tanning agent is added by 3.0 percent by weight to the material leather, after which sodium bicarbonate is added gradually to raise the basicity of the chromium tanning agent, in order to let the leather adsorb chromium. The temperature of the tanning bath is adjusted to a range of 30 to 40° C. and final pH at the end of tanning, to 3.6. The tanning time is 5 hours. The pH is gradually raised so that the chromium tanning agent better permeates into the leather. If the pH is raised too quickly, chromium is adsorbed only on the leather surface.

The leather is washed in water and squeezed, and then its thickness is adjusted to a desired level, after which the back side is shaved to adjust the thickness further (shaving), while the defective parts along the periphery of the leather are cut off (trimming).

Next, the leather is treated with sodium formate and the pH of the bath adjusted to a range of 4.0 to 5.0 (neutralization step), and then the leather is re-tanned. Re-tanning is performed at 35° C. for 60 minutes using 5 to 15 percent by weight of synthetic tanning agent (formaldehyde condensation product of naphthalene sulfonic acid or methylene cyclopolycondensation product of aryl sulfonic acid) relative to the weight of leather as well as 3 to 10 percent by weight of polyacrylic resin tanning agent relative to the weight of leather. Partly because a chromium tanning agent exhibits stronger leather tanning action than glutaraldehyde and partly because sufficient heat resistance was achieved in the tanning step, this re-tanning agent can be used in a smaller quantity than any glutaraldehyde tanning agent. The main purpose of the re-tanning step is to deposit the re-tanning agent between leather fibers to improve bulkiness and other properties of touch and suppleness.

(B) The Dyeing/Greasing Step is Explained Below.

An azo acid dye is added by 0.5 to 5 percent by weight relative to the weight of leather (a different dye should be used according to the desired color) and the leather is left in this dyeing solution for 2 hours, after which the pH is lowered to 4.0 using formic acid to fix the dye onto the leather and thereby dye the leather.

Next, a greasing agent (mixed oil containing synthetic oil and natural oil) is added by 3 to 12% relative to the weight of leather and the leather is left in this greasing solution for 1 hour, after which the pH is lowered to 3.5 using formic acid to fix the greasing agent onto the leather.

(2) Formation of Coating Film

A coating film is formed in the same manner as proposed by the present invention.

The test and measurement methods used by the present invention are described below.

Figure 13:
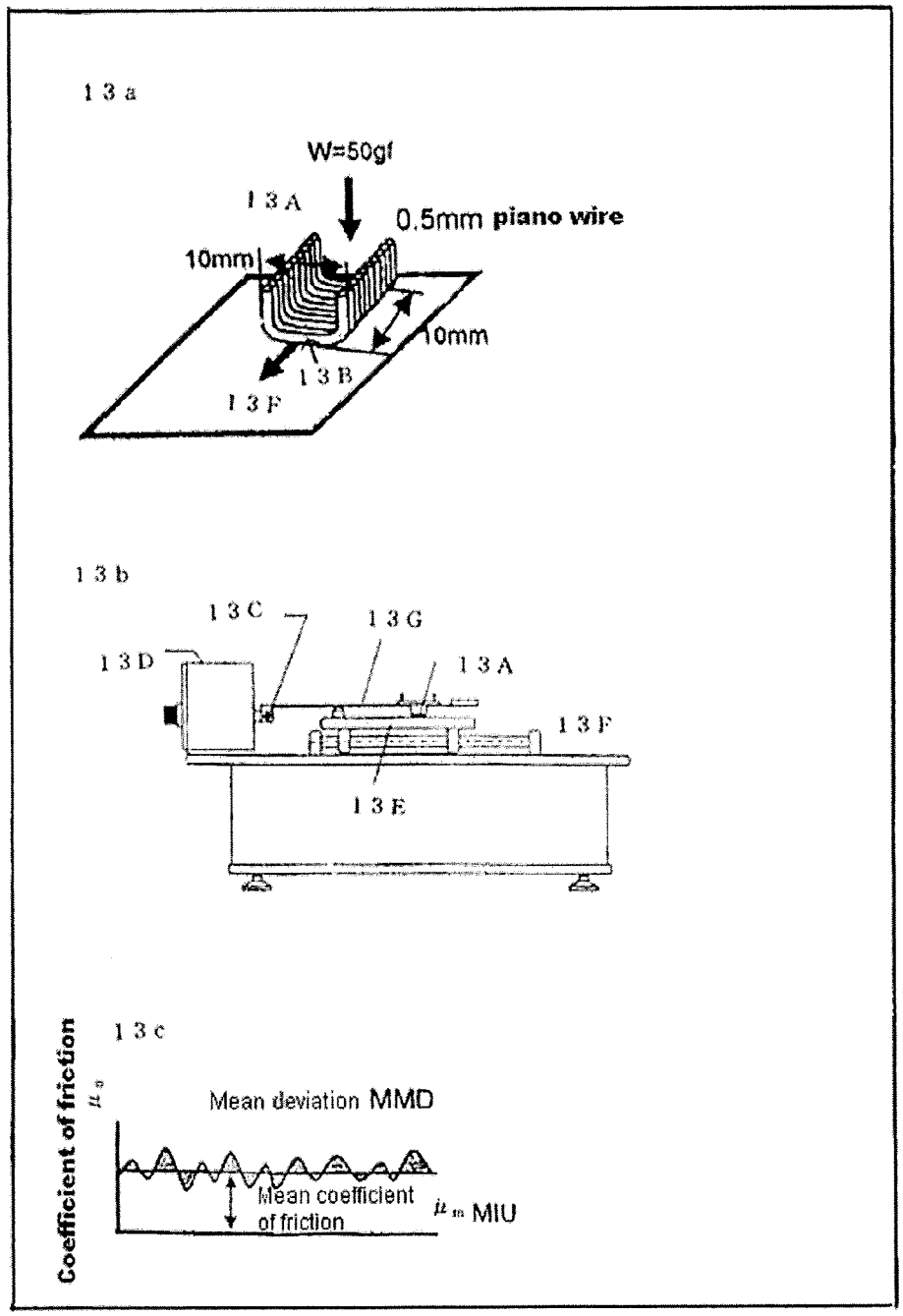
FIG. 13: A drawing explaining measurement of slickness using KES
Figure 14:
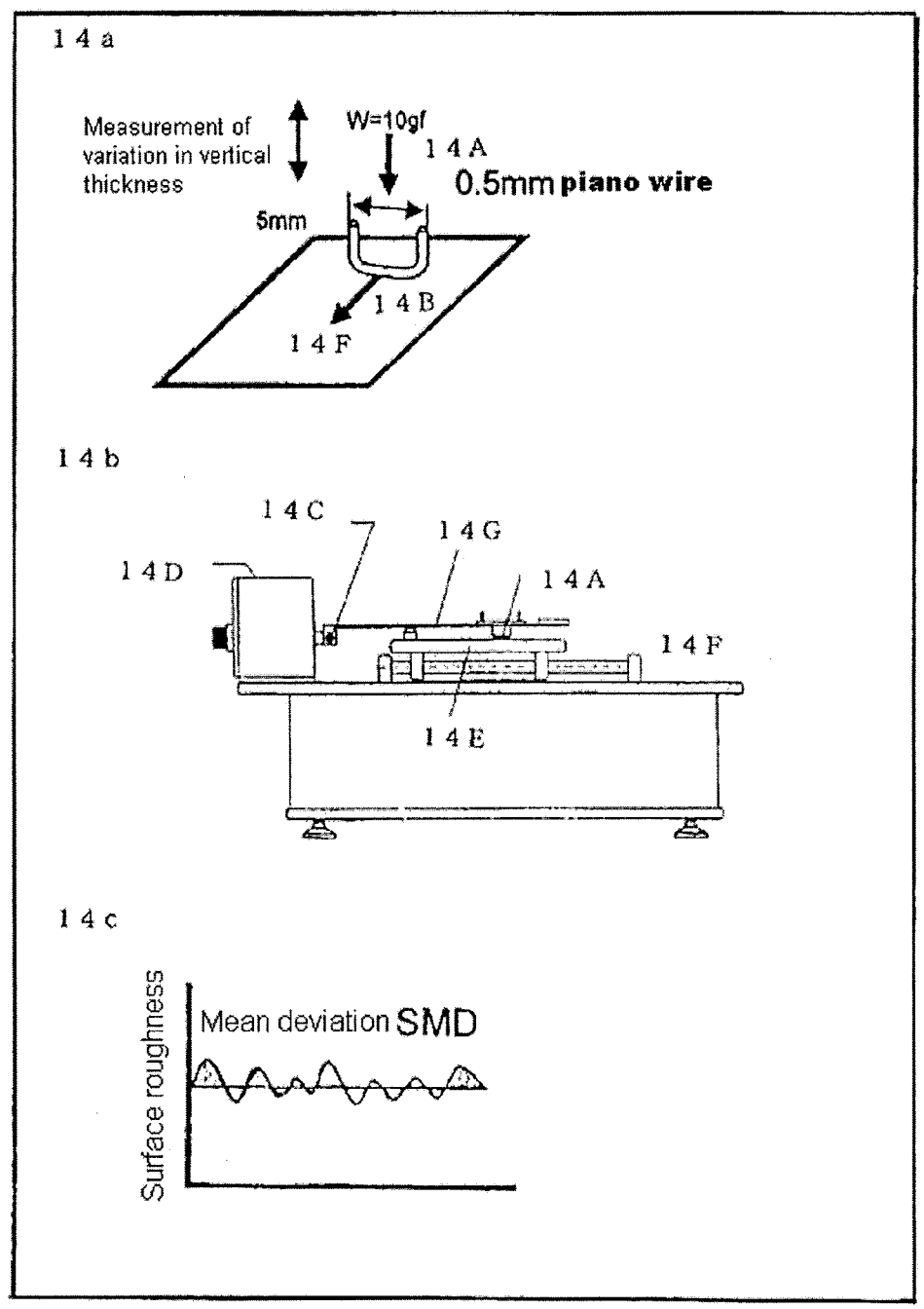
FIG. 14: A drawing explaining measurement of smoothness using KES

Under the present invention, the measurement method and means illustrated in FIGS. 13 and 14 are used to ensure objectivity of evaluation, as explained below.

(1) Measurement of Slickness (FIG. 13)

Slickness is evaluated based on the condition of surface friction.

(A) Measurement of Mean Coefficient of Surface Friction (MIU)

A load of 50 g is applied to the friction force probe (13A shown in 13a, also called "U-shaped sensor" (a U-shaped object of 10 mm in the width of the bottom of U, where 20 piano wires, each 0.5 mm in size, are bundled to 10 mm in total and placed in the aforementioned 10-mm width) (KES-SE-SR-U roughness friction tester manufactured by Kato Tech), and in this condition the friction force probe is moved at a constant friction speed of 1 mm/sec in a specified direction (13F) to measure the surface friction μo (shown in 13c) at the friction force detection end (13B, pulp of finger).

To calculate the surface friction μo, the friction force probe 13A is installed on the friction force probe holder 13G of the friction force measuring system 13D and moved on the surface of the sample 13E in the moving direction (13F). The surface friction μo measured by the friction force probe 13A is transmitted through the friction force detection holder 13G to the friction force detection part (13C), and then to the friction force measuring system (13D), where the detected force is converted to a value and the result is displayed. The mean coefficient of surface friction μm (MIU) is calculated from the surface friction μo.

The mean coefficient of surface friction μm (MIU) is an indicator of slipperiness of surface.

(B) Measurement of Mean Deviation of Coefficient of Surface Friction (MMD)

Similarly, the mean deviation of coefficient of surface friction (also called "variation in the coefficient of surface friction" or MMD) is calculated from the surface friction μo.

The mean deviation of coefficient of surface friction (MMD) is an indicator of roughness of surface.

(C) Calculation Method for Slickness Unique to Natural Leather

This can be calculated by calculating the ratio of (A) mean coefficient of surface friction and (ii) mean deviation of coefficient of surface friction (mean deviation) (mean coefficient of surface friction (MIU)/mean deviation of coefficient of surface friction (MMD)).

(D) "Mean coefficient of surface friction (MIU)/mean deviation of coefficient of surface friction (MMD)" is used as an evaluation indicator of slickness. The greater this value, the better the touch of surface. For practical reasons, an acceptable range is 25 or more.

(2) Smoothness, or lack of thereof, is determined by measuring the surface roughness and obtaining its mean deviation (FIG. 14). FIG. 14 consists of 14a (enlarged view showing the structure of a surface roughness probe), 14b (drawing showing a system for measuring friction force using the surface roughness probe) and 14c (illustration of mean deviation SMD based on measurement of surface roughness using the surface roughness probe).

(A) Calculation of SMD (Mean Deviation of Surface Roughness)

The SMD (mean deviation of surface roughness) is calculated by measuring the surface roughness.

A surface roughness probe (14A, also called "U-shaped sensor") is moved on the surface of the coating film formed on the surface of the obtained leather, to measure the variation in vertical thickness to ultimately measure the surface roughness. The surface roughness probe (14A) has a width of 5 mm at the bottom of U, and a bundle of piano wires, each 0.5 mm in size, is wired in this 5-mm width (KES-SE-SR-U roughness friction tester manufactured by Kato Tech). A load of 10 g is applied to the surface roughness probe (14A), and in this condition the surface roughness probe is moved at a constant friction speed of 1 mm/sec in a specified direction (14F) to measure the variation in vertical thickness at the surface roughness detection end (14B, also called "tip of finger") and thereby obtain the SMD (mean deviation of surface roughness).

To calculate the surface roughness, the surface roughness probe (14A) is installed on the surface roughness measuring system (14D) and moved on the surface of the sample (14E) in the moving direction (14F). The variation in vertical thickness indicating the surface roughness, measured by the friction force probe (14A), is transmitted through the surface roughness detection holder 13G to the surface roughness measuring system (14D), where the mean deviation of surface roughness (SMD) is calculated and displayed graphically (14c).

(B) The SMD (mean deviation of surface roughness) is deemed acceptable if the value is 2.5 μm or less.

(3) Whether the physical properties of the coating film such as wear resistance are maintained or not is checked by measuring the following evaluation items:

(A) Wear Resistance

Figure 15:
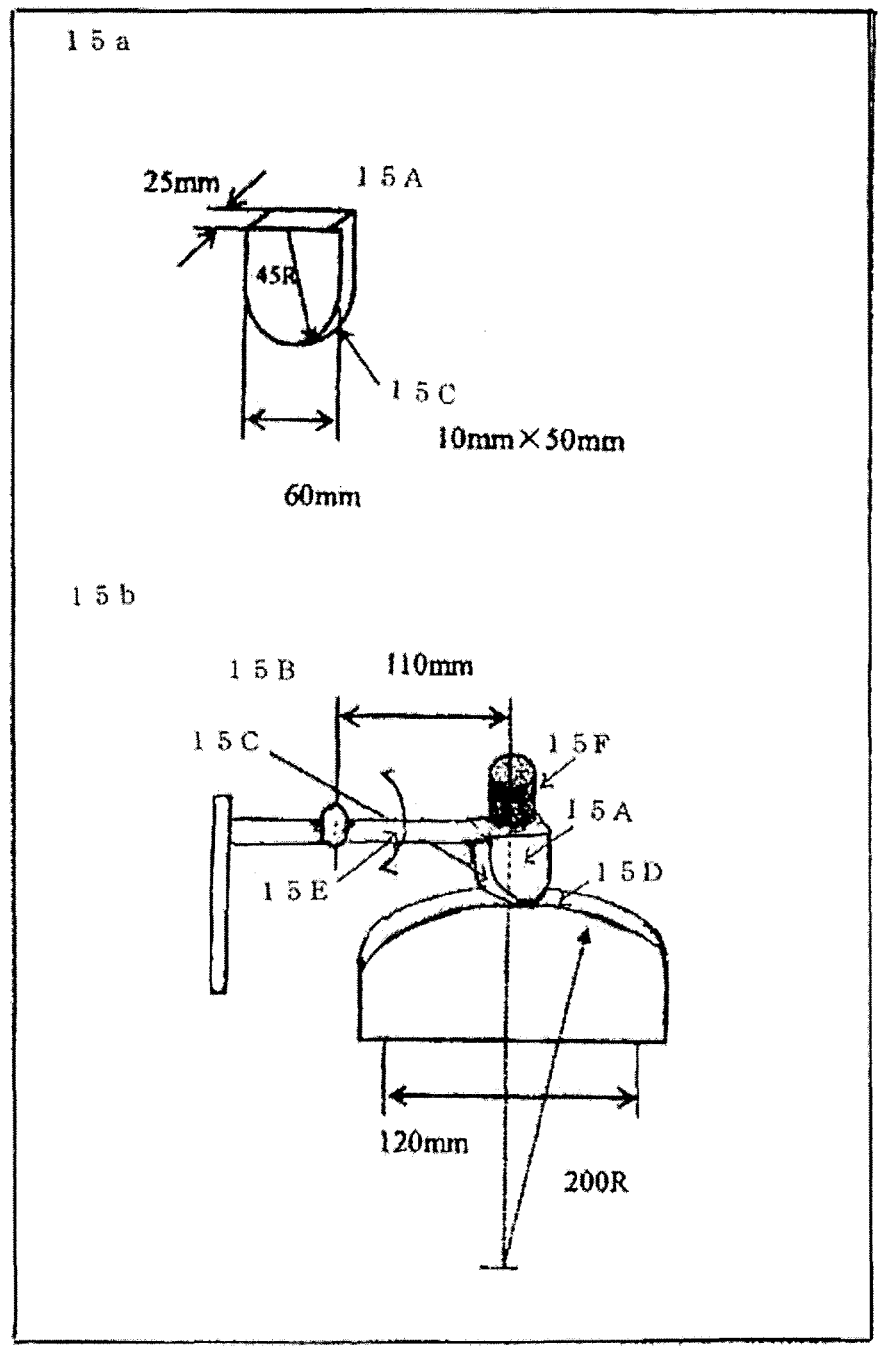
FIG. 15: A drawing explaining a Gakushin friction fastness tester

The wear resistance tester (FIG. 15) is explained using a drawing showing a friction wheel (60 mm in width, 25 mm in thickness) (15a), as well as by referring to a Gakushin friction fastness tester (15B) on which this friction wheel is installed (an overview is shown in 15b; AB301 manufactured by Tester Sangyo).

(B) The test method is explained as follows:

Two test pieces, each of 10 mm×50 mm in size, are taken from the leather. One test piece should have its long side corresponding to the vertical direction (head-tail direction) of the leather, while the other test piece should have its long side corresponding to the lateral direction (back-belly direction). Each test piece (15C) is set on the friction wheel (15A) of the friction tester as shown in 15a, and the friction wheel is connected to the load arm (15E, 110 mm) and load (15F) and then adjusted so that it contacts the testing part of the Gakushin friction fastness tester (15B). A piece of No. 6 cotton canvas (15D) of 30 mm in width and 250 mm in length is cut out. At this time, the weaving direction of the cotton canvas should be vertical to the long side. Next, the piece of cotton canvas is fixed on the testing part of the friction tester in such a way that its long side becomes parallel with the moving direction of the testing part (the testing part is an arc of 120 mm in width and 200 mm in radius).

The machine is then operated under a load of 1.0 kg (15F) at a speed of 30 back-and-forth operations per minute over a distance of 100 mm, while being stopped every 500 to 1,000 back-and-forth operations to observe the condition of the coating film with the naked eye, and friction is applied continuously until the coating film peels off.

The number of back-and-forth operations after which the coating film starts to peel is recorded, and the measured numbers of two test pieces are averaged to obtain the Gakushin wear resistance.

(4) Whether the strength of the coating film is maintained or not is checked by measuring the relationship of stress vs. strain (i.e., creating a stress vs. strain curve) for the coating film formed on the surface of the natural leather. The measurement method shall conform to the dumbbell method.

Figure 16:
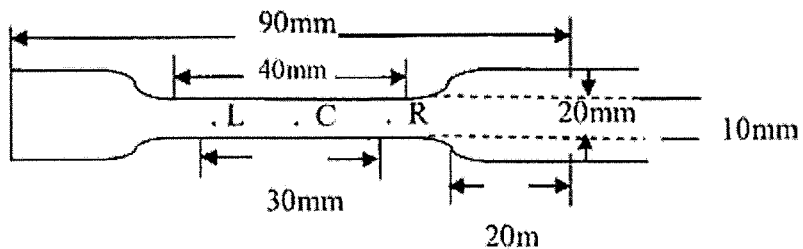
FIG. 16: A drawing explaining a tensile test piece

(A) Preparation of Test Piece (FIG. 16)

Resin is poured into a silicone mold and left at room temperature (20±5° C.) for at least 3 days until dry, to prepare a resin film of approx. 0.4 to 0.8 mm in thickness.

From this resin film, a dumbbell-shaped test piece (FIG. 16) is stamped out using a stamping die. Points are marked at the center of the test piece at a distance of 30 mm in between.

Test piece width W (mm)=20

Initial distance between marks on test piece Lo (mm)=30

(B) Test Method

The thickness of the test piece is measured at the three points of C, L and R as shown in FIG. 16, and the values measured at the three points are averaged to obtain the test piece thickness T (mm).

Creation of Load Vs. Elongation Curve

A Tensilon tensile tester (AG-1 AUTO GRAPH manufactured by Shimadzu Corporation) is used to pull the test piece at a speed of 100±20 mm/min until it breaks, to create a curve representing the relationship between the load and elongation between marks.

Creation of Stress Vs. Strain Curve (a) The load is divided by the cross-section using the formula below to obtain an equivalent stress:

$$S=P/(W \times T)$$

S: Stress (MPa)
P: Load (N)
W: Test piece width (mm)
T: Test piece thickness (mm)

(b) The formula below is applied to the elongation between marks to obtain an equivalent strain (elongation ratio):

$$s=\Delta L/Lo \times 100$$

s: Strain (%)
$\Delta L$: Elongation between marks (mm)
Lo: Initial distance between marks (mm)

(c) 10% Modulus

The stress at a 10% strain is defined as the 10% modulus (unit: MPa).

The present invention is described below using examples.

It should be noted, however, that the present invention is not at all limited to the examples described below.

The examples described below are summarized as follows.

Example 1 is an example pertaining to a leather "having flexibility, softness characterized by elasticity of more than what is normally expected from leather, no more than a normal level of elongation of leather, as well as restorability" (Japanese Patent Application No. 2007-170359), where many specific examples of manufacturing a base are given as test examples. In this Specification, these test examples are collectively referred to as Example 1 and described in (0081) to (0092).

Examples 2 to 10 are examples of forming a coating film on the surface of the base (BLC50) obtained in Test 6 of Example 1 mentioned above. Of these, Examples 2 to 6 show specific examples of blending of soft and hard components for the color coat layer and medium and hard components for the top coat layer when forming the color coat layer and top coat layer of the coating film to be formed on the surface of the base described in Example 1. On the other hand, Examples 7 to 10 are examples of examination of what happens when the blending ratios of soft and hard components constituting the color coat layer are changed while keeping the blending ratios of medium and hard components constituting the top coat layer the same.

Example 11 is a specific example of how forming a coating film on the leather obtained by buffing the base (BLC50) obtained in Example 1 would give favorable results.

Example 12 is a specific example of how forming a coating film on the surface of a chrome-tanned leather would give favorable results.

All results are summarized in Table 4.

It should be reiterated that the present invention is not at all limited to these examples.

Example 1

Example 1 is a specific example of manufacturing a leather "having flexibility, softness characterized by elasticity of more than what is normally expected from leather, no more than a normal level of elongation of leather, as well as restorability" (Japanese Patent Application No. 2007-170359).

A natural leather was obtained by a series of processes including a leather tanning step as well steps for neutralization, re-tanning, dyeing and greasing.

The leather was re-tanned using the tanning agent described below. All treatment conditions other than the tanning agent were the same as the conditions specified above.

Each tanning agent used in the "re-tanning" step is specified below.

TABLE 1

| | Tanning agent | Tannin 1 | Tannin 2 | Tannin 3 | Tannin 4 |
|---|---|---|---|---|---|
| | Vegetable tannin | 30 | 0 | 4 | 0 |
| Synthetic tannin | Condensation product of aromatic sulfonic acid and formaldehyde | — | 22 | 4 | 12 |
| | Methylene cyclocondensation product of aromatic sulfonic acid and aromatic hydroxy compound | — | 0 | 8 | 10 |
| | Glyoxal | | | 3 | 3 |
| | Total of synthetic tannin | 0 | 22 | 15 | 25 |
| Resin | Polyacrylate and acrylic acid copolymer | 0 | 0 | 12 | 12 |

TABLE 1-continued

| | Tanning agent | Tannin 1 | Tannin 2 | Tannin 3 | Tannin 4 |
|---|---|---|---|---|---|
| | Polycondensation product of melamine and formaldehyde | 0 | 8 | 5 | 5 |
| | Total of re-tanning agent | 30 | 30 | 36 | 42 |
| Metal | Aluminum compound and aluminum-containing compound | 0 | 0 | 0 | 0 |

The greasing agent used is specified below.

TABLE 2

| Component | Quantity used (weight percentage of shaved leather weight being 100 percent) |
|---|---|
| Mixed oil containing synthetic oil and natural oil (mixed by a ratio of 1:1 by weight) | 17 percent by weight |

The quantity of greasing agent used is a weight percentage of the weight of leather being 100 percent, determined based on the experience of conventional re-tanning steps where a favorable range is 15 to 19 percent by weight.

Tanning agents 1 to 4 mentioned above were used, where aluminum was added separately to tanning agent 4, to re-tan the leather and the obtained leather was measured for rigidity/softness and setting rate to check the effectiveness of each tanning agent and aluminum. Results are summarized for each obtained leather and the best results are shown.

The treatment conditions for re-tanning, setting rates and BLC values are summarized below.

BLC (rigidity/softness) measures the depth to which the leather is pressed when a load of 500 g per unit area is pressed against the leather, indicating not only the flexibility but also repulsive force of the leather. The unit of BLC is mm. The value of BLC is an indicator of softness.

"Maximum setting rate" refers to the setting rate in the X-axis direction or Y-axis direction of the leather, whichever is greater, where the X-axis and Y-axis are defined as lines crossing perpendicularly over the sample. The setting rate is measured by applying a load of 8 kg to elongate the sample and then removing the load to restore the initial state of the sample, indicated by the percentage by which the marked line has elongated, and is an indicator of restorability. These two measured values are used to determine the condition of the leather, and once the results of both are in satisfactory ranges, the leather is deemed acceptable.

The measured maximum setting rates and BLC values in Test 1 (re-tanning agent 1 constituted by vegetable tannin alone (not containing resin) was used), Test 2 (re-tanning agent 2 constituted by synthetic tannin alone (not containing resin) was used), Test 3 (vegetable tannin, synthetic tannin and resin were all contained) and Test 4 (combination of synthetic tannin with resin) are shown.

In Test 1, the BLC value is low, or 3.67. The maximum setting rate is 7.6, which presents no problem, but the BLC

TABLE 3

| | Re-tanning | | | | | | BLC |
|---|---|---|---|---|---|---|---|
| | Re-tanning agent | | | | | | |
| | Synthetic/vegetable | | | Greasing | Setting rate | | value |
| Test | tanning agent | Resin | Metal | agent | Average | Maximum | (mm) |
| Test 1 | Re-tanning agent 1 | | | 17 | 5.67 | 7.6 | 3.67 |
| | 30 (Vegetable tannin) | 0 | 0 | | | | |
| Test 2 | Re-tanning agent 2 | | | 17 | 8.33 | 10.6 | 4.22 |
| | 30 (Synthetic tannin) | | | | | | |
| Test 3 | Re-tanning agent 3 | | | 17 | 9.75 | 13.9 | 4.47 |
| No. 38 | 15 (Synthetic tannin) | 17 | 0 | | | | |
| | 4 (Vegetable tannin) | | | | | | |
| Test 4 | Re-tanning agent 4 | | | 17 | 9.93 | 11.1 | 4.78 |
| No. 55 | 25 | 17 | 0 | | | | |
| Test 5 | Re-tanning agent 5 | | | 17 | 8.90 | 11.5 | 4.90 |
| No. 56 | 25 | 17 | 0 | | | | |
| Test 8 | Re-tanning agent 4 | | | 17 | 8.18 | 10.7 | 4.70 |
| No. 42 | 25 | 17 | 0 | | | | |
| Test 9 | Re-tanning agent 4 | | | 17 | 8.90 | 12.0 | 4.90 |
| No. 52 | 25 | 17 | 0 | | | | |
| Test 10 | Re-tanning agent 4 | | | 17 | 10.05 | 13.9 | 4.72 |
| No. 57 | 25 | 17 | 0 | | | | |
| Test 11 | Re-tanning agent 4 | | | 17 | 9.23 | 12.4 | 4.42 |
| No. 53 | 25 | 17 | 0 | | | | |
| Test 6 | Re-tanning agent 4 | | | 17 | 6.60 | 8.5 | 5.30 |
| No. 61 | 25 | 17 | 3.0% by weight | | | | |
| Test 7 | Re-tanning agent 5 | | | 17 | 7.90 | 12.4 | 4.77 |
| No. 82 | 25 | 17 | 5.0% by weight | | | | | value is too low. Under the present invention, the results of BLC value and maximum setting rate must both be in favorable ranges.

In Test 2, the BLC value is low, or 4.22. The maximum setting rate is 10.6, which presents no problem, but the BLC value is too low. Under the present invention, the results of BLC value and maximum setting rate must be both in favorable ranges.

Tests 1 and 2 show the results of using conventional re-tanning agents such as vegetable tannin and synthetic tannin, and are therefore considered examples of prior art.

In Test 3, a re-tanning agent containing vegetable tannin, synthetic tannin and resin is used. Since resin was contained in the re-tanning agent, the BLC value in Test 3 is higher than in Test 1 or 2, or specifically 4.47. However, the maximum setting rate is low, being 13.9. Under the present invention, the results of BLC value and maximum setting rate must both be in favorable ranges.

Test 4 (tanning agent 4), Test 5 (tanning agent 4), Test 8 (tanning agent 4), Test 9 (tanning agent 4), Test 10 (tanning agent 4) and Test 11 (tanning agent 4) show the results of using a tanning agent constituted by synthetic tannin and resin. Compared to Tests 1 and 3, these tests present favorable results in both BLC value and maximum setting rate.

In Test 4, the BLC value is 4.78 and the maximum setting rate is 11.1;
in Test 5, the BLC value is 4.90 and the maximum setting rate is 11.5;
in Test 8, the BLC value is 4.70 and the maximum setting rate is 10.7;
in Test 9, the BLC value is 4.90 and the maximum setting rate is 12.0;
in Test 10, the BLC value is 4.72 and the maximum setting rate is 13.9; and
in Test 11, the BLC value is 4.42 and the maximum setting rate is 12.4.

Figure 17:
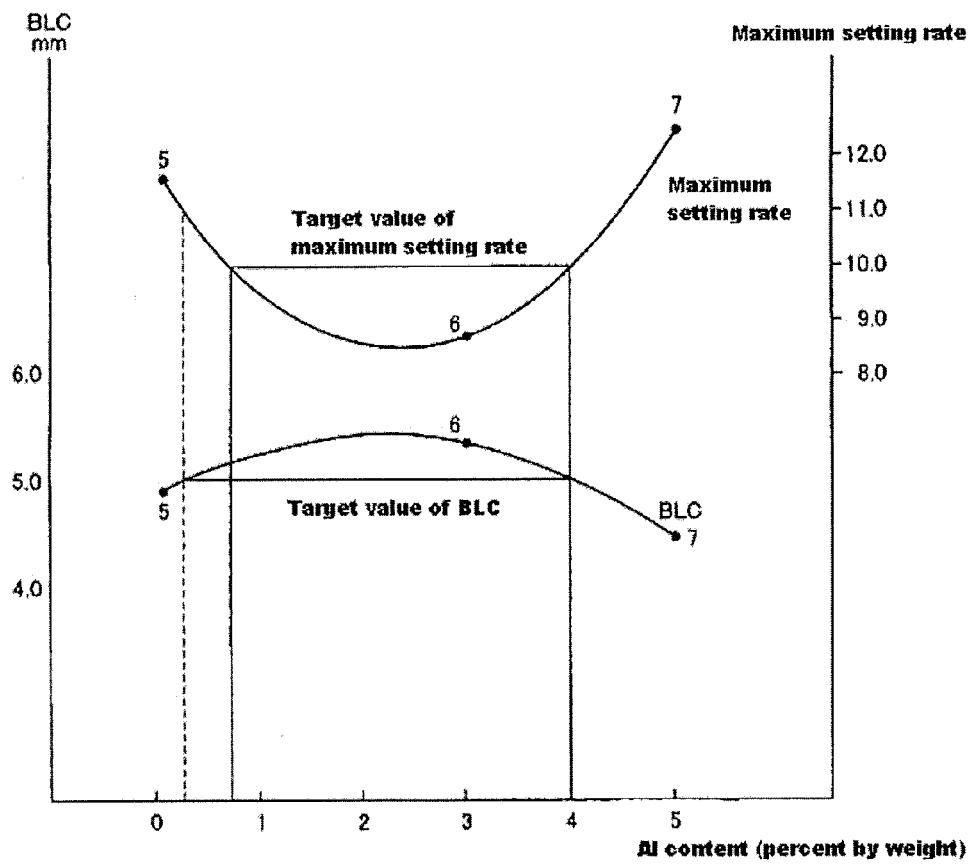
FIG. 17: A drawing specifying a percentage content of a re-tanning agent
Figure 18:
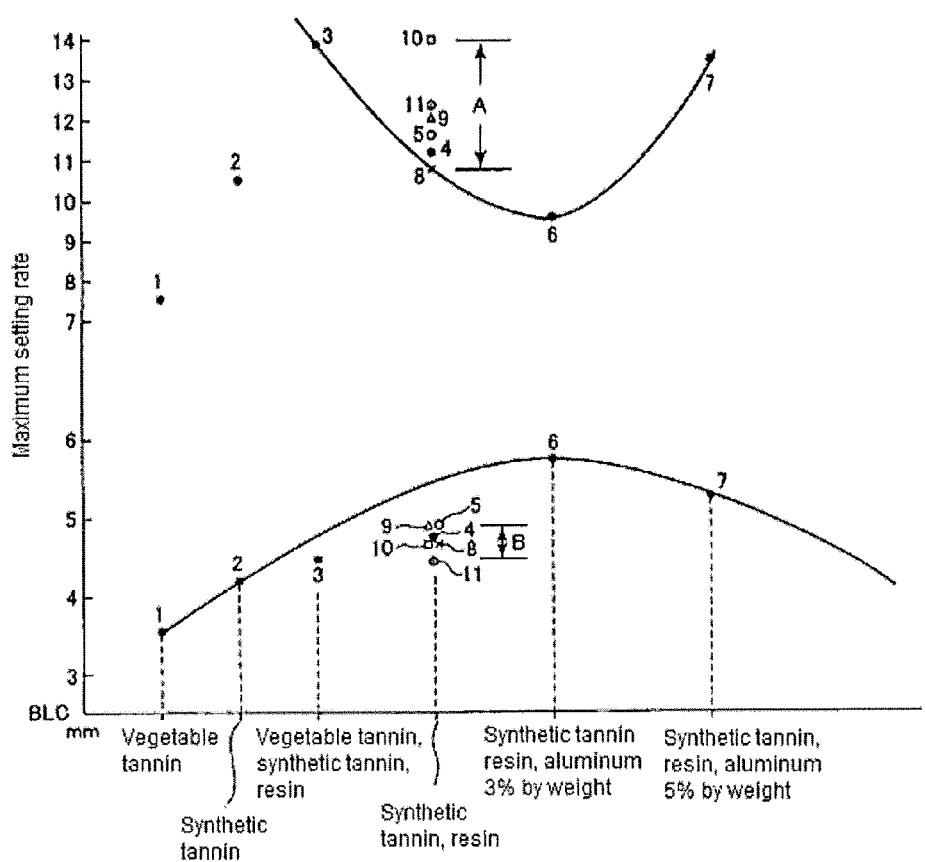
FIG. 18: A drawing specifying a maximum percentage content of Al

FIG. 17 summarizes all results, including the results of Tests 6 and 7 where aluminum was added. When the results of Tests 4, 5, 8, 9, 10 and 11 are compared against the results of Test 3 based on actually obtained values, it can be concluded that the effects of the tanning agent constituted by synthetic tannin and resin conforming to the present invention are evident when the BLC value (rigidity/softness) is 4.42 mm or more but not more than 4.90 mm (indicated by B) and the maximum setting rate is 10.7 or more but not more than 13.9 (indicated by A). (It should be noted that combined use of tanning agent and resin was not known to the public before the completion of the present invention and indicated merely to clearly illustrate the effects of the present invention. In this sense, the values indicated by A and B above represent values purely obtained through the examples of the present invention.)

The results of tests where an aluminum compound was added and the leather was treated in the presence of aluminum are explained below.

The maximum setting rates and BLC values in Test 5 (No. 56) where aluminum was used by 0 percent by weight, Test 6 (No. 61) where aluminum was used by 3.0 percent by weight, and Test 7 (No. 82) where aluminum was used by 5.0 percent by weight, are explained below.

In Test 6 (No. 61), the maximum setting rate is 8.5 and BLC is 5.3, meeting the target values of 10.0 or less (maximum setting rate) and 5.0 or more (BLC). When the maximum setting rates and BLC values measured in Test 5 (No. 56) where the aluminum content was 0 percent by weight (maximum setting rate=11.5, BLC=4.90), Test 7 (No. 82) where the aluminum content was 5 percent by weight (maximum setting rate=12.4, BLC=4.77) and aforementioned Test 6 (No. 61) are linked by curved lines, the graph in FIG. 17 is obtained. When the range of BLC values meeting the target value of 5.0 or more and range of maximum setting rates meeting the target value of 10.0 or less are examined, it is clear that as long as the aluminum content at the maximum setting rate is 0.7 to 4.0, the BLC target is met.

From the above results, it can be concluded that as long as the aluminum content is in a range of 0.7 to 4.0, the maximum setting rate becomes 10.0 or less and BLC also meets the target of 5.0 or more.

Example 2

Examples 2 to 10 are examples of forming a coating film on the surface of the base (BLC50) obtained in Test 6 of Example 1 mentioned above. Of these, Examples 2 to 6 show specific examples of blending of soft and hard components for the color coat layer and medium and hard components for the top coat layer when forming the color coat layer and top coat layer of the coating film to be formed on the surface of the base described in Example 1. On the other hand, Examples 7 to 10 are examples of examination of what happens when the blending ratios of soft and hard components constituting the color coat layer are changed while keeping the blending ratios of medium and hard components constituting the top coat layer the same.

(A) In Example 2 explained below, steps of forming a coating film conforming to the present invention on a base being a natural leather obtained in Test 6 of Example 1 mentioned above are explained.

A pre-coat coating film was formed on the natural leather (coating amount=40 g/m$^2$, film thickness=5 µm), after which a base coat layer was formed (coating amount=45 g/m$^2$, film thickness=9 µm).

On top of the above, the following color coat layer and top coat layer were formed.

The hard component (a resin whose 10% modulus was over 2.3 but not more than 3.0) of a resin containing two-component polyurethane resin and polyurethane resin, which was used to form the color coat layer, accounted for 48 to 90 percent by weight, wherein, specifically, a two-component aliphatic polyurethane being a matting agent (whose 10% modulus was 2.88; see FIG. 3) and another two-component aliphatic polyurethane (whose 10% modulus was 2.77; see FIG. 4) were used, giving a total content by weight of 70%.

The soft component (a resin whose 10% modulus was over 0.0 but not more than 1.0) of a resin containing two-component polyurethane resin and polyurethane resin, which was used to form the color coat layer, accounted for 52 to 10 percent by weight, wherein, specifically, a two-component aliphatic polyurethane (whose 10% modulus was 0.54; see FIG. 5) and another two-component aliphatic polyurethane (whose 10% modulus was 0.30; see FIG. 6) were used, giving a total content by weight of 30% for the soft component.

The medium component (a resin whose 10% modulus was over 1.0 but not more than 2.3) of a resin containing two-component polyurethane resin and polyurethane resin, which was used to form the aforementioned top coat layer, accounted for 15.0 to 35.0 percent by weight, wherein, specifically, the content by weight of a two-component aliphatic polyurethane resin (whose 10% modulus was 1.89; see FIG. 8) was 7.5% for the medium component.

The soft component (a resin whose 10% modulus was over 0.0 but not more than 1.0) of a resin containing two-component polyurethane resin and polyurethane resin, which was used to form the aforementioned top coat layer, accounted for 85.0 to 65.0 percent by weight, wherein, specifically, a two-component aliphatic polyurethane (resin mat) (whose 10% modulus was 0.67; see FIG. 9), another two-component aliphatic polyurethane resin (whose 10% modulus was 0.54; see FIG. 10) and acrylic polymer-urethane polymer copolymer (whose 10% modulus was 0.11; see FIG. 11) were used, giving a total content by weight of 92.5%.

(B) The following two items were evaluated. According to the results of preliminary measurement of natural leathers using the KES-SE-SR-U roughness friction tester (manufactured by Kato Tech), the leathers were deemed acceptable when their (a) smoothness (SMD) was 2.5 μm or less and slickness (MIU/MMD) was 25 or more and (b) wear resistance test result was 4,000 times or more. It is therefore concluded that a leather solves the problems to which the present invention provides a solution when the two evaluation criteria of (a) and (b) are satisfied.

(C) In Example 2, the (a) smoothness (SMD) was 0.86 μm and slickness (MIU/MMD) was 34.3, while the (b) aforementioned evaluation was 5,000 times, per the evaluation in (B), confirming that evaluation criteria (a) and (b) were both satisfied.

Example 3

(A) In Example 3, steps of forming a coating film conforming to the present invention on a base being a natural leather obtained in Test 6 of Example 1 mentioned above were performed.

A pre-coat coating film was formed on the natural leather (coating amount=40 g/m², film thickness=5 μm), after which a base coat layer was formed (coating amount=45 g/m², film thickness=9 μm).

On top of the above, the following color coat layer and top coat layer were formed.

The hard component (a resin whose 10% modulus was over 2.3 but not more than 3.0) of a resin containing two-component polyurethane resin and polyurethane resin, which was used to form the color coat layer, accounted for 48 to 90 percent by weight, wherein, specifically, a two-component aliphatic polyurethane being a matting agent (whose 10% modulus was 2.88; see FIG. 3) and another two-component aliphatic polyurethane (whose 10% modulus was 2.77; see FIG. 4) were used, giving a total content by weight of 70%.

The soft component (a resin whose 10% modulus was over 0.0 but not more than 1.0) of a resin containing two-component polyurethane resin and polyurethane resin, which was used to form the color coat layer, accounted for 52 to 10 percent by weight, wherein, specifically, a two-component aliphatic polyurethane (whose 10% modulus was 0.54; see FIG. 5) and another two-component aliphatic polyurethane (whose 10% modulus was 0.30; see FIG. 6) were used, giving a total content by weight of 30% for the soft component.

The medium component (a resin whose 10% modulus was over 1.0 but not more than 2.3) of a resin containing two-component polyurethane resin and polyurethane resin, which was used to form the aforementioned top coat layer, accounted for 15.0 to 35.0 percent by weight, wherein, specifically, the content by weight of a two-component aliphatic polyurethane resin (whose 10% modulus was 1.89; see FIG. 8) was 15% for the medium component.

The soft component (a resin whose 10% modulus was over 0.0 but not more than 1.0) of a resin containing two-component polyurethane resin and polyurethane resin, which was used to form the aforementioned top coat layer, accounted for 85.0 to 65.0 percent by weight, wherein, specifically, a two-component aliphatic polyurethane (resin mat) (whose 10% modulus was 0.67; see FIG. 9), another two-component aliphatic polyurethane resin (whose 10% modulus was 0.54; see FIG. 10) and 30 percent by weight of acrylic polymer-urethane polymer copolymer (whose 10% modulus was 0.11; see FIG. 11) were used, giving a total content by weight of 85%.

(B) The following two items were evaluated. According to the results of preliminary measurement of natural leathers using the KES-SE-SR-U roughness friction tester (manufactured by Kato Tech), the leathers were deemed acceptable when their (a) smoothness (SMD) was 2.5 μm or less and slickness (MIU/MMD) was 25 or more and (b) wear resistance test result was 4,000 times or more. It is therefore concluded that a leather solves the problems to which the present invention provides a solution when the two evaluation criteria of (a) and (b) are satisfied.

(C) In Example 3, the (a) smoothness (SMD) was 0.89 μm and slickness (MIU/MMD) was 30.1, while the (b) aforementioned evaluation was 7,500 times, per the evaluation in (B), confirming that evaluation criteria (a) and (b) were both satisfied.

Example 4

(A) In Example 4, steps of forming a coating film conforming to the present invention on a base being a natural leather obtained in Test 6 of Example 1 mentioned above were performed.

A pre-coat coating film was formed on the natural leather (coating amount=40 g/m², film thickness=5 μm), after which a base coat layer was formed (coating amount=45 g/m², film thickness=9 μm).

On top of the above, the following color coat layer and top coat layer were formed.

The hard component (a resin whose 10% modulus was over 2.3 but not more than 3.0) of a resin containing two-component polyurethane resin and polyurethane resin, which was used to form the color coat layer, accounted for 48 to 90 percent by weight, wherein, specifically, a two-component aliphatic polyurethane being a matting agent (whose 10% modulus was 2.88; see FIG. 3) and another two-component aliphatic polyurethane (whose 10% modulus was 2.77; see FIG. 4) were used, giving a total content by weight of 70%.

The soft component (a resin whose 10% modulus was over 0.0 but not more than 1.0) of a resin containing two-component polyurethane resin and polyurethane resin, which was used to form the color coat layer, accounted for 52 to 10 percent by weight, wherein, specifically, a two-component aliphatic polyurethane (whose 10% modulus was 0.54; see FIG. 5) and another two-component aliphatic polyurethane (whose 10% modulus was 0.30; see FIG. 6) were used, giving a total content by weight of 30% for the soft component.

The medium component (a resin whose 10% modulus was over 1.0 but not more than 2.3) of a resin containing two-component polyurethane resin and polyurethane resin, which was used to form the aforementioned top coat layer, accounted for 15.0 to 35.0 percent by weight, wherein, specifically, the content by weight of a two-component aliphatic polyurethane resin (whose 10% modulus was 1.89; see FIG. 8) was 25% for the medium component.

The soft component (a resin whose 10% modulus was over 0.0 but not more than 1.0) of a resin containing two-component polyurethane resin and polyurethane resin, which was used to form the aforementioned top coat layer, accounted for 85.0 to 65.0 percent by weight, wherein, specifically, a two-component aliphatic polyurethane (resin mat) (whose 10% modulus was 0.67; see FIG. 9), another two-component aliphatic polyurethane resin (whose 10% modulus was 0.54; see FIG. 10) and acrylic polymer-urethane polymer copolymer (whose 10% modulus was 0.11; see FIG. 11) were used, giving a total content by weight of 75%.

(B) The following two items were evaluated. According to the results of preliminary measurement of natural leathers using the KES-SE-SR-U roughness friction tester (manufactured by Kato Tech), the leathers were deemed acceptable when their (a) smoothness (SMD) was 2.5 μm or less and slickness (MIU/MMD) was 25 or more and (b) wear resistance test result was 4,000 times or more. It is therefore concluded that a leather solves the problems to which the present invention provides a solution when the two evaluation criteria of (a) and (b) are satisfied.

(C) In Example 4, the (a) smoothness (SMD) was 0.74 μm and slickness (MIU/MMD) was 30.4, while the (b) aforementioned evaluation was 9,000 times, per the evaluation in (B), confirming that evaluation criteria (a) and (b) were both satisfied.

Example 5

(A) In Example 5, steps of forming a coating film conforming to the present invention on a base being a natural leather obtained in Test 6 of Example 1 mentioned above were performed.

A pre-coat coating film was formed on the natural leather (coating amount=40 g/m², film thickness=5 μm), after which a base coat layer was formed (coating amount=45 g/m², film thickness=9 μm).

On top of the above, the following color coat layer and top coat layer were formed.

The hard component (a resin whose 10% modulus was over 2.3 but not more than 3.0) of a resin containing two-component polyurethane resin and polyurethane resin, which was used to form the color coat layer, accounted for 48 to 90 percent by weight, wherein, specifically, a two-component aliphatic polyurethane being a matting agent (whose 10% modulus was 2.88; see FIG. 3) and another two-component aliphatic polyurethane (whose 10% modulus was 2.77; see FIG. 4) were used, giving a total content by weight of 70%.

The soft component (a resin whose 10% modulus was over 0.0 but not more than 1.0) of a resin containing two-component polyurethane resin and polyurethane resin, which was used to form the color coat layer, accounted for 52 to 10 percent by weight, wherein, specifically, a two-component aliphatic polyurethane (whose 10% modulus was 0.54; see FIG. 5) and another two-component aliphatic polyurethane (whose 10% modulus was 0.30; see FIG. 6) were used, giving a total content by weight of 30% for the soft component.

The medium component (a resin whose 10% modulus was over 1.0 but not more than 2.3) of a resin containing two-component polyurethane resin and polyurethane resin, which was used to form the aforementioned top coat layer, accounted for 15.0 to 35.0 percent by weight, wherein, specifically, the content by weight of a two-component aliphatic polyurethane resin (whose 10% modulus was 1.89; see FIG. 8) was 30% for the medium component.

The soft component (a resin whose 10% modulus was over 0.0 but not more than 1.0) of a resin containing two-component polyurethane resin and polyurethane resin, which was used to form the aforementioned top coat layer, accounted for 85.0 to 65.0 percent by weight, wherein, specifically, a two-component aliphatic polyurethane (resin mat) (whose 10% modulus was 0.67; see FIG. 9), another two-component aliphatic polyurethane resin (whose 10% modulus was 0.54; see FIG. 10) and acrylic polymer-urethane polymer copolymer (whose 10% modulus was 0.11; see FIG. 11) were used, giving a total content by weight of 70%.

(B) The following two items were evaluated. According to the results of preliminary measurement of natural leathers using the KES-SE-SR-U roughness friction tester (manufactured by Kato Tech), the leathers were deemed acceptable when their (a) smoothness (SMD) was 2.5 μm or less and slickness (MIU/MMD) was 25 or more and (b) wear resistance test result was 4,000 times or more. It is therefore concluded that a leather solves the problems to which the present invention provides a solution when the two evaluation criteria of (a) and (b) are satisfied.

(C) In Example 5, the (a) smoothness (SMD) was 0.68 μm and slickness (MIU/MMD) was 33.6, while the (b) aforementioned evaluation was 7,500 times, per the evaluation in (B), confirming that evaluation criteria (a) and (b) were both satisfied.

Example 6

(A) In Example 6, steps of forming a coating film conforming to the present invention on a base being a natural leather obtained in Test 6 of Example 1 mentioned above were performed.

A pre-coat coating film was formed on the natural leather (coating amount=40 g/m², film thickness=5 μm), after which a base coat layer was formed (coating amount=45 g/m², film thickness=9 μm).

On top of the above, the following color coat layer and top coat layer were formed.

The hard component (a resin whose 10% modulus was over 2.3 but not more than 3.0) of a resin containing two-component polyurethane resin and polyurethane resin, which was used to form the color coat layer, accounted for 48 to 90 percent by weight, wherein, specifically, a two-component aliphatic polyurethane being a matting agent (whose 10% modulus was 2.88; see FIG. 3) and another two-component aliphatic polyurethane (whose 10% modulus was 2.77; see FIG. 4) were used, giving a total content by weight of 70%.

The soft component (a resin whose 10% modulus was over 0.0 but not more than 1.0) of a resin containing two-component polyurethane resin and polyurethane resin, which was used to form the color coat layer, accounted for 52 to 10 percent by weight, wherein, specifically, a two-component aliphatic polyurethane (whose 10% modulus was 0.54; see FIG. 5) and another two-component aliphatic polyurethane (whose 10% modulus was 0.30; see FIG. 6) were used, giving a total content by weight of 30% for the soft component.

The medium component (a resin whose 10% modulus was over 1.0 but not more than 2.3) of a resin containing two-component polyurethane resin and polyurethane resin, which was used to form the aforementioned top coat layer, accounted for 15.0 to 35.0 percent by weight, wherein, specifically, a two-component aliphatic polyurethane resin (whose 10% modulus was 1.89; see FIG. 8) was used at 37.5 percent by weight for the medium component.

The soft component (a resin whose 10% modulus was over 0.0 but not more than 1.0) of a resin containing two-component polyurethane resin and polyurethane resin, which was used to form the aforementioned top coat layer, accounted for 85.0 to 65.0 percent by weight, wherein, specifically, a two-component aliphatic polyurethane (resin mat) (whose 10% modulus was 0.67; see FIG. 9), another two-component aliphatic polyurethane resin (whose 10% modulus was 0.54; see FIG. 10) and acrylic polymer-urethane polymer copolymer (whose 10% modulus was 0.11; see FIG. 11) were used, giving a total content by weight of 62.5%.

(B) The following two items were evaluated. According to the results of preliminary measurement of natural leathers using the KES-SE-SR-U roughness friction tester (manufactured by Kato Tech), the leathers were deemed acceptable when their (a) smoothness (SMD) was 2.5 μm or less and slickness (MIU/MMD) was 25 or more and (b) wear resistance test result was 4,000 times or more. It is therefore concluded that a leather solves the problems to which the present invention provides a solution when the two evaluation criteria of (a) and (b) are satisfied.

(C) In Example 6, the (a) smoothness (SMD) was 0.72 μm and slickness (MIU/MMD) was 32.9, while the (b) aforementioned evaluation was 5,500 times, per the evaluation in (B), confirming that evaluation criteria (a) and (b) were both satisfied.

Example 7

(A) Examples 7 to 10 are examples of examination of what happens when the blending ratios of soft and hard components constituting the color coat layer of the coating film are changed while keeping the blending ratios of medium and hard components constituting the top coat layer of the coating film the same.

A pre-coat coating film was formed on the natural leather (coating amount=40 g/m², film thickness=5 μm), after which a base coat layer was formed (coating amount=45 g/m², film thickness=9 μm).

On top of the above, the following color coat layer and top coat layer were formed.

The hard component (a resin whose 10% modulus was over 2.3 but not more than 3.0) of a resin containing two-component polyurethane resin and polyurethane resin, which was used to form the color coat layer, accounted for 48 to 90 percent by weight, wherein, specifically, a two-component aliphatic polyurethane being a matting agent (whose 10% modulus was 2.88; see FIG. 3) and another two-component aliphatic polyurethane (whose 10% modulus was 2.77; see FIG. 4) were used, giving a total content by weight of 90%.

The soft component (a resin whose 10% modulus was over 0.0 but not more than 1.0) of a resin containing two-component polyurethane resin and polyurethane resin, which was used to form the color coat layer, accounted for 52 to 10 percent by weight, wherein, specifically, a two-component aliphatic polyurethane (whose 10% modulus was 0.54; see FIG. 5) and another two-component aliphatic polyurethane (whose 10% modulus was 0.30; see FIG. 6) were used, giving a total content by weight of 10% for the soft component.

The medium component (a resin whose 10% modulus was over 1.0 but not more than 2.3) of a resin containing two-component polyurethane resin and polyurethane resin, which was used to form the aforementioned top coat layer, accounted for 15.0 to 35.0 percent by weight, wherein, specifically, the content by weight of a two-component aliphatic polyurethane resin (whose 10% modulus was 1.89; see FIG. 8) was 25% for the medium component.

The soft component (a resin whose 10% modulus was over 0.0 but not more than 1.0) of a resin containing two-component polyurethane resin and polyurethane resin, which was used to form the aforementioned top coat layer, accounted for 85.0 to 65.0 percent by weight, wherein, specifically, a two-component aliphatic polyurethane (resin mat) (whose 10% modulus was 0.67; see FIG. 9), another two-component aliphatic polyurethane resin (whose 10% modulus was 0.54; see FIG. 10) and acrylic polymer-urethane polymer copolymer (whose 10% modulus was 0.11; see FIG. 11) were used, giving a total content by weight of 75%.

(B) The following two items were evaluated. According to the results of preliminary measurement of natural leathers using the KES-SE-SR-U roughness friction tester (manufactured by Kato Tech), the leathers were deemed acceptable when their (a) smoothness (SMD) was 2.5 μm or less and slickness (MIU/MMD) was 25 or more and (b) wear resistance test result was 4,000 times or more. It is therefore concluded that a leather solves the problems to which the present invention provides a solution when the two evaluation criteria of (a) and (b) are satisfied.

(C) In Example 7, the (a) smoothness (SMD) was 0.59 μm and slickness (MIU/MMD) was 32.7, while the (b) aforementioned evaluation was 10,000 times, per the evaluation in (B), confirming that evaluation criteria (a) and (b) were both satisfied.

Example 8

Example 8 is an example of examination of what happens when the blending ratios of soft and hard components constituting the color coat layer of the coating film are changed while keeping the blending examples ratios of medium and hard components constituting the top coat layer of the coating film the same.

(A) In Example 8, steps of forming a coating film conforming to the present invention on a base being a natural leather obtained in Test 6 of Example 1 mentioned above were performed.

A pre-coat coating film was formed on the natural leather (coating amount=40 g/m², film thickness=5 μm), after which a base coat layer was formed (coating amount=45 g/m², film thickness=9 μm).

On top of the above, the following color coat layer and top coat layer were formed.

The hard component (a resin whose 10% modulus was over 2.3 but not more than 3.0) of a resin containing two-component polyurethane resin and polyurethane resin, which was used to form the color coat layer, accounted for 48 to 90 percent by weight, wherein, specifically, a two-component aliphatic polyurethane being a matting agent (whose 10% modulus was 2.88; see FIG. 3) and another two-component aliphatic polyurethane (whose 10% modulus was 2.77; see FIG. 4) were used, giving a total content by weight of 80%.

The soft component (a resin whose 10% modulus was over 0.0 but not more than 1.0) of a resin containing two-component polyurethane resin and polyurethane resin, which was used to form the color coat layer, accounted for 52 to 10 percent by weight, wherein, specifically, a two-component aliphatic polyurethane (whose 10% modulus was 0.54; see FIG. 5) and another two-component aliphatic polyurethane (whose 10% modulus was 0.30; see FIG. 6) were used, giving a total content by weight of 20% for the soft component.

The medium component (a resin whose 10% modulus was over 1.0 but not more than 2.3) of a resin containing two-component polyurethane resin and polyurethane resin, which was used to form the aforementioned top coat layer, accounted for 15.0 to 35.0 percent by weight, wherein, specifically, the content by weight of a two-component aliphatic polyurethane resin (whose 10% modulus was 1.89; see FIG. 8) was 25% for the medium component.

The soft component (a resin whose 10% modulus was over 0.0 but not more than 1.0) of a resin containing two-component polyurethane resin and polyurethane resin, which was used to form the aforementioned top coat layer, accounted for 85.0 to 65.0 percent by weight, wherein, specifically, a two-component aliphatic polyurethane (resin mat) (whose 10% modulus was 0.67; see FIG. 9), another two-component aliphatic polyurethane resin (whose 10% modulus was 0.54; see FIG. 10) and acrylic polymer-urethane polymer copolymer (whose 10% modulus was 0.11; see FIG. 11) were used, giving a total content by weight of 75%.

(B) The following two items were evaluated. According to the results of preliminary measurement of natural leathers using the KES-SE-SR-U roughness friction tester (manufactured by Kato Tech), the leathers were deemed acceptable when their (a) smoothness (SMD) was 2.5 μm or less and slickness (MIU/MMD) was 25 or more and (b) wear resistance test result was 4,000 times or more. It is therefore concluded that a leather solves the problems to which the present invention provides a solution when the two evaluation criteria of (a) and (b) are satisfied.

(C) In Example 8, the (a) smoothness (SMD) was 1.02 μm and slickness (MIU/MMD) was 30.6, while the (b) aforementioned evaluation was 8,500 times, per the evaluation in (B), confirming that evaluation criteria (a) and (b) were both satisfied.

Example 9

Example 9 is an example of examination of what happens when the blending ratios of soft and hard components constituting the color coat layer of the coating film are changed while keeping the blending ratios of medium and hard components constituting the top coat layer of the coating film the same.

(A) In Example 9, steps of forming a coating film conforming to the present invention on a base being a natural leather obtained in Test 6 of Example 1 mentioned above were performed.

A pre-coat coating film was formed on the natural leather (coating amount=40 g/m$^2$, film thickness=5 μm), after which a base coat layer was formed (coating amount=45 g/m$^2$, film thickness=9 μm).

On top of the above, the following color coat layer and top coat layer were formed.

The hard component (a resin whose 10% modulus was over 2.3 but not more than 3.0) of a resin containing two-component polyurethane resin and polyurethane resin, which was used to form the color coat layer, accounted for 48 to 90 percent by weight, wherein, specifically, a two-component aliphatic polyurethane being a matting agent (whose 10% modulus was 2.88; see FIG. 3) and another two-component aliphatic polyurethane (whose 10% modulus was 2.77; see FIG. 4) were used, giving a total content by weight of 60%.

The soft component (a resin whose 10% modulus was over 0.0 but not more than 1.0) of a resin containing two-component polyurethane resin and polyurethane resin, which was used to form the color coat layer, accounted for 52 to 10 percent by weight, wherein, specifically, a two-component aliphatic polyurethane (whose 10% modulus was 0.54; see FIG. 5) and another two-component aliphatic polyurethane (whose 10% modulus was 0.30; see FIG. 6) were used, giving a total content by weight of 40% for the soft component.

The medium component (a resin whose 10% modulus was over 1.0 but not more than 2.3) of a resin containing two-component polyurethane resin and polyurethane resin, which was used to form the aforementioned top coat layer, accounted for 15.0 to 35.0 percent by weight, wherein, specifically, the content by weight of a two-component aliphatic polyurethane resin (whose 10% modulus was 1.89; see FIG. 8) was 25% for the medium component.

The soft component (a resin whose 10% modulus was over 0.0 but not more than 1.0) of a resin containing two-component polyurethane resin and polyurethane resin, which was used to form the aforementioned top coat layer, accounted for 85.0 to 65.0 percent by weight, wherein, specifically, a two-component aliphatic polyurethane (resin mat) (whose 10% modulus was 0.67; see FIG. 9), another two-component aliphatic polyurethane resin (whose 10% modulus was 0.54; see FIG. 10) and acrylic polymer-urethane polymer copolymer (whose 10% modulus was 0.11; see FIG. 11) were used, giving a total content by weight of 75%.

(B) The following two items were evaluated. According to the results of preliminary measurement of natural leathers using the KES-SE-SR-U roughness friction tester (manufactured by Kato Tech), the leathers were deemed acceptable when their (a) smoothness (SMD) was 2.5 μm or less and slickness (MIU/MMD) was 25 or more and (b) wear resistance test result was 4,000 times or more. It is therefore concluded that a leather solves the problems to which the present invention provides a solution when the two evaluation criteria of (a) and (b) are satisfied.

(C) In Example 9, the (a) smoothness (SMD) was 0.70 μm and slickness (MIU/MMD) was 34.1, while the (b) aforementioned evaluation was 5,000 times, per the evaluation in (B), confirming that evaluation criteria (a) and (b) were both satisfied.

Example 10

Example 10 is an example of examination of what happens when the blending ratios of soft and hard components constituting the color coat layer of the coating film are changed while keeping the blending ratios of medium and hard components constituting the top coat layer of the coating film the same.

(A) In Example 10, steps of forming a coating film conforming to the present invention on a base being a natural leather obtained in Test 6 of Example 1 mentioned above were performed.

A pre-coat coating film was formed on the natural leather (coating amount=40 g/m$^2$, film thickness=5 μm), after which a base coat layer was formed (coating amount=45 g/m$^2$, film thickness=9 μm).

On top of the above, the following color coat layer and top coat layer were formed.

The hard component (a resin whose 10% modulus was over 2.3 but not more than 3.0) of a resin containing two-component polyurethane resin and polyurethane resin, which was used to form the color coat layer, accounted for 48 to 90 percent by weight, wherein, specifically, a two-component aliphatic polyurethane being a matting agent (whose 10% modulus was 2.88; see FIG. 3) and another two-component aliphatic polyurethane (whose 10% modulus was 2.77; see FIG. 4) were used, giving a total content by weight of 50%.

The soft component (a resin whose 10% modulus was over 0.0 but not more than 1.0) of a resin containing two-component polyurethane resin and polyurethane resin, which was used to form the color coat layer, accounted for 52 to 10 percent by weight, wherein, specifically, a two-component aliphatic polyurethane (whose 10% modulus was 0.54; see FIG. 5) and another two-component aliphatic polyurethane (whose 10% modulus was 0.30; see FIG. 6) were used, giving a total content by weight of 50% for the soft component.

The medium component (a resin whose 10% modulus was over 1.0 but not more than 2.3) of a resin containing two-component polyurethane resin and polyurethane resin, which was used to form the aforementioned top coat layer, accounted for 15.0 to 35.0 percent by weight, wherein, specifically, the content by weight of a two-component aliphatic polyurethane resin (whose 10% modulus was 1.89; see FIG. 8) was 25% for the medium component.

The soft component (a resin whose 10% modulus was over 0.0 but not more than 1.0) of a resin containing two-component polyurethane resin and polyurethane resin, which was used to form the aforementioned top coat layer, accounted for 85.0 to 65.0 percent by weight, wherein, specifically, 25 percent by weight of a two-component aliphatic polyurethane (resin mat) (whose 10% modulus was 0.67; see FIG. 9), 25 percent by weight of another two-component aliphatic polyurethane resin (whose 10% modulus was 0.54; see FIG. 10) and acrylic polymer-urethane polymer copolymer (whose 10% modulus was 0.11; see FIG. 11) were used, giving a total content by weight of 75%.

(B) The following two items were evaluated. According to the results of preliminary measurement of natural leathers using the KES-SE-SR-U roughness friction tester (manufactured by Kato Tech), the leathers were deemed acceptable when their (a) smoothness (SMD) was 2.5 μm or less and slickness (MIU/MMD) was 25 or more and (b) wear resistance test result was 4,000 times or more. It is therefore concluded that a leather solves the problems to which the present invention provides a solution when the two evaluation criteria of (a) and (b) are satisfied.

(C) In Example 10, the (a) smoothness (SMD) was 0.72 μm and slickness (MIU/MMD) was 30.5, while the (b) aforementioned evaluation was 8,500 times, per the evaluation in (B), confirming that evaluation criteria (a) and (b) were both satisfied.

Example 11

Example 11 is a specific example of how forming a coating film on the leather obtained by buffing the base (BLC50) obtained in Test 6 of Example 1 would give favorable results.

(A) The following describes the buffing step and shows how forming a coating film on the buffed surface would give favorable results.

(1) Preparation of Base

The base was prepared as follows.

The aforementioned natural leather was buffed (using sand paper) and shaved to create a base (this base was used as the standard under the present invention).

(2) Formation of Coating Film

The color coat layer was formed by mixing 78 percent by weight of hard component (a resin whose 10% modulus was over 2.3 but not more than 3.0) of a resin containing two-component polyurethane resin and polyurethane resin with 22 percent by weight of soft component (a resin whose 10% modulus was over 0.0 but not more than 1.0) of a resin containing two-component polyurethane resin and polyurethane resin, while the aforementioned top coat layer was formed by mixing 25.0 percent by weight of medium component (a resin whose 10% modulus was over 1.0 but not more than 2.3) of a resin containing two-component polyurethane resin and polyurethane resin with 75.0 percent by weight of soft component (a resin whose 10% modulus was over 0.0 but not more than 1.0) of a resin containing two-component polyurethane resin and polyurethane resin.

(B) The following two items were evaluated. According to the results of preliminary measurement of natural leathers using the KES-SE-SR-U roughness friction tester (manufactured by Kato Tech), the leathers were deemed acceptable when their (a) smoothness (SMD) was 2.5 μm or less and slickness (MIU/MMD) was 25 or more and (b) wear resistance test result was 4,000 times or more. It is therefore concluded that a leather solves the problems to which the present invention provides a solution when the two evaluation criteria of (a) and (b) are satisfied.

(C) In Example 11, the (a) smoothness (SMD) was 2.50 μm and slickness (MIU/MMD) was 26.3, while the (b) aforementioned evaluation was 10,000 times, per the evaluation in (B), confirming that evaluation criteria (a) and (b) were both satisfied.

Example 12

Example 12 is a specific example of how forming a coating film on the surface of a chrome-tanned leather would give favorable results.

(A) It was shown that favorable results would be achieved by applying a coating film on the base (BLC50) obtained in Example 1 above as invented by the inventors of the present invention, and on a base being a leather obtained by buffing such base (Example 11).

The following describes how favorable results can still be achieved without using this base and that a coating film can be formed on such other base.

Formation of base is explained below.

Here, chromium tanning was performed. In the tanning step, a trivalent chromium complex was used as a tanning agent.

(1) Preparation of Base

A natural leather base was obtained through the pre-treatment before leather tanning, leather tanning step, and steps for neutralization, re-tanning, dyeing and greasing.

Pre-Treatment

The pre-treatment before leather tanning is explained below.

A material leather taken from adult cow hide is soaked in water, and then washed with water and taken out, after which gluey substances at the back (such as fat and flesh) are mechanically removed and the obtained leather is soaked in lime solution to dissolve the hairs on the surface of leather, and then smut on the surface of leather is removed and lime is permeated into the leather to loosen the fibers, after which the leather is separated into the grain side (front side of leather) and flesh side (back side of leather) using a band knife. In this step, processes are performed to remove keratin in the epidermal layer and elastin in the lower layer. The obtained leather is in a condition where all parts other than collagen fibers have been removed from its structure. These are traditional processes and processing means that are already known to the public can be adopted as deemed appropriate.

(B) Tanning Step

The grain side and flesh side obtained by the preceding step are delimed by neutralizing and removing the lime that has permeated into the leather in the preceding step (pH-adjusted water is sprayed and other process is performed to promote the action of proteolytic enzyme; water used in this process is adjusted to a temperature of 30 to 35° C. and contains sodium hydrogen sulfite containing 1 to 2% of ammonium chloride, etc.), and then given a bating treatment in the presence of a proteolytic enzyme (a bating agent blended with pancreatin or other enzyme is used) (in this process, water containing an appropriate splitting enzyme is permeated into the leather, using water containing 0.8 to 1.2% of this enzymatic agent and 0.5% of ammonium chloride), after which the collagen tissue is softened and enzyme is removed.

Next, the leather is soaked for approx. 3 hours in a solution whose pH has been adjusted to a range of 2 to 3 using sulfuric acid and formic acid (pickling). This is because the chromium tanning agent would not dissolve in a non-acid solution. Next, a commercially available chromium sulfate tanning agent is added by 3.0 percent by weight to the material leather, after which sodium bicarbonate is added gradually to raise the basicity of the chromium tanning agent, in order to let the leather adsorb chromium. The temperature of the tanning bath is adjusted to a range of 30 to 40° C. and final pH at the end of tanning, to 3.6. The tanning time is 5 hours. The pH is gradually raised so that the chromium tanning agent better permeates into the leather. If the pH is raised too quickly, chromium is adsorbed only on the leather surface.

The leather is washed in water and squeezed, and then its thickness is adjusted to a desired level, after which the back side is shaved to adjust the thickness further (shaving), while the defective parts along the periphery of the leather are cut off (trimming).

Next, the leather is treated with sodium formate and the pH of the bath adjusted to a range of 4.0 to 5.0 (neutralization step), and then the leather is re-tanned. Re-tanning is performed at 35° C. for 60 minutes using 5 to 15 percent by weight of synthetic tanning agent (formaldehyde condensation product of naphthalene sulfonic acid or methylene cyclopolycondensation product of aryl sulfonic acid) relative to the weight of leather as well as 3 to 10 percent by weight of polyacrylic resin tanning agent relative to the weight of leather. Partly because a chromium tanning agent exhibits stronger leather tanning action than glutaraldehyde and partly because sufficient heat resistance was achieved in the tanning step, this re-tanning agent can be used in a smaller quantity than any glutaraldehyde tanning agent. The main purpose of the re-tanning step is to deposit the re-tanning agent between leather fibers to improve bulkiness and other properties of touch and suppleness.

(C) The dyeing/greasing step is explained below.

An azo acid dye is added by 0.5 to 5 percent by weight relative to the weight of leather (a different dye should be used according to the desired color) and the leather is left in this dyeing solution for 2 hours, after which the pH is lowered to 4.0 using formic acid to fix the dye onto the leather and thereby dye the leather.

Next, a greasing agent (mixed oil containing synthetic oil and natural oil) is added by 3 to 12 percent by weight relative to the weight of leather and the leather is left in this greasing solution for 1 hour, after which the pH is lowered to 3.5 using formic acid to fix the greasing agent onto the leather.

(D) The post-treatment step after re-tanning, which is part of the leather manufacturing process, is explained below.

In the post-treatment step after re-tanning, the leather is dried and finished (drying/coating). Before wet finishing, pre-drying is applied to the wet leather that has been dyed and greased, in order to fix the greasing agent and dye more strongly so as to add color fastness, water resistance and flexibility. Then, the leather is flattened to stretch the lines on its surface. One characteristic of the process proposed herein is inclusion of this line stretching step.

The neutralized, re-tanned, dyed and greased leather contains approx. 70 to 80% water, so water is squeezed out to facilitate drying. A setter is used to stretch the leather and make it flat to remove water. The water content is thus reduced to a range of 50 to 60%. Thereafter, the leather is hang-dried at 30 to 50° C. to a water content of 7% or less. This drying may be implemented by spreading the leather and sticking it on a sheet of glass or by means of vacuum drying. This is followed by "conditioning" to add some water to the dried leather to adjust the water content to an appropriate level.

Staking is then performed to adjust the softness of the leather. Vibration staking is used for this purpose.

After staking, drum milling is performed for 3.5 to 6.5 hours to loosen the leather fibers and thereby soften the leather.

Next, net drying is performed where the leather is fixed over a net using toggles, and pulled. The leather is dried in this condition for 2 to 3 hours at a temperature of 45 to 65° C., with an open pitch of 2 graduations. If these operations are performed carefully, conditioning, staking, drum milling and toggled net drying can be repeated.

This is followed by trimming, where the edges that have hardened due to drying, toggled areas showing pinching marks and extremely thin areas are cut off and the leather is shaped. Thereafter, drum milling is performed for 4 to 6 hours.

When the BLC rigidity/softness of the chrome-tanned leather prepared as above was measured, it was 3.2 mm.

(2) Formation of coating film is explained below.

A pre-coat coating film was formed on the base (coating amount=40 g/m$^2$, film thickness=5 µm), after which a base coat was formed (coating amount=45 g/m$^2$, film thickness=9 µm).

On top of the above, the following color coat layer and top coat layer were formed.

(A) The color coat layer was formed by mixing 78 percent by weight of hard component (a resin whose 10% modulus was over 2.3 but not more than 3.0) of a resin containing two-component polyurethane resin and polyurethane resin with 22 percent by weight of soft component (a resin whose 10% modulus was over 0.0 but not more than 1.0) of a resin containing two-component polyurethane resin and polyurethane resin, while the aforementioned top coat layer was formed by mixing 25.0 percent by weight of medium component (a resin whose 10% modulus was over 1.0 but not more than 2.3) of a resin containing two-component polyurethane resin and polyurethane resin with 75.0 percent by weight of soft component (a resin whose 10% modulus was over 0.0 but not more than 1.0) of a resin containing two-component polyurethane resin and polyurethane resin.

(B) The following two items were evaluated. According to the results of preliminary measurement of natural leathers using the KES-SE-SR-U roughness friction tester (manufactured by Kato Tech), the leathers were deemed acceptable when their (a) smoothness (SMD) was 2.5 µm or less and slickness (MIU/MMD) was 25 or more and (b) wear resistance test result was 4,000 times or more. It is therefore concluded that a leather solves the problems to which the present invention provides a solution when the two evaluation criteria of (a) and (b) are satisfied.

(C) In Example 12, the (a) smoothness (SMD) was 1.53 µm and slickness (MIU/MMD) was 26.3, while the (b) aforementioned evaluation was 10,000 times, per the evaluation in (B), confirming that evaluation criteria (a) and (b) were both satisfied.

Comparative Example 6

In Comparative Example 6, a chrome-tanned leather was used as the base as in Example 12 explained above. Example 12 was evaluated with a coating film conforming to the present invention formed.

(A) Comparative Example 6 provided herein is an example showing that if the coating film is formed by a method not strictly conforming to the components and compositions specified under the present invention (such as when the top coat is formed by using the hard component alone without using the medium component, with this hard component mixed with the soft component), the evaluation criteria would not be met, unlike in Example 12 explained above.

Preparation of Base

A leather was obtained via chromium-tanning according to the method specified in Example 12.

Formation of coating film is explained below.

A pre-coat coating film was formed on a chrome-tanned natural leather (coating amount=40 g/m$^2$, film thickness=5 μm), after which a base coat was formed (coating amount=45 g/m$^2$, film thickness=9 μm).

Formation of Layers

On top of the above, the following color coat layer and top coat layer were formed.

The hard component (a resin whose 10% modulus was over 2.3 but not more than 3.0) of a resin containing two-component polyurethane resin and polyurethane resin, which was used to form the color coat layer, accounted for 48 to 90 percent by weight, wherein, specifically, 25 percent by weight of a two-component aliphatic polyurethane being a matting agent (whose 10% modulus was 2.88; see FIG. 3) and 53 percent by weight of another two-component aliphatic polyurethane (whose 10% modulus was 2.77; see FIG. 4) were used, giving a total content by weight of 78%.

The soft component (a resin whose 10% modulus was over 0.0 but not more than 1.0) of a resin containing two-component polyurethane resin and polyurethane resin, which was used to form the color coat layer, accounted for 52 to 10 percent by weight, wherein, specifically, 22 percent by weight of a two-component aliphatic polyurethane (whose 10% modulus was 0.30; see FIG. 6) was used, giving a total content by weight of 22% for the soft component. The color coat layer was within the range of coating film specified under the present invention.

The medium component (a resin whose 10% modulus was over 1.0 but not more than 2.3) of a resin containing two-component polyurethane resin and polyurethane resin, which was used to form the aforementioned top coat layer, was none, while the hard component accounted for 27 percent by weight (compared to the medium component accounting for 15.0 to 35.0 percent by weight under the present invention, which was one difference), and the soft component (a resin whose 10% modulus was over 0.0 but not more than 1.0) of a resin containing two-component polyurethane resin and polyurethane resin, which was used to form the top coat layer, was constituted by 73 percent by weight of an acrylic polymer-urethane polymer copolymer (whose 10% modulus was 0.11; see FIG. 11), giving a total content by weight of 73% for the soft component (no medium component was contained, but a hard component was contained, which was different from the coating film of the present invention).

(B) The following two items were evaluated. According to the results of preliminary measurement of natural leathers using the KES-SE-SR-U roughness friction tester (manufactured by Kato Tech), the leathers were deemed acceptable when their (a) smoothness (SMD) was 2.5 μm or less and slickness (MIU/MMD) was 25 or more and (b) wear resistance test result was 4,000 times or more. It is therefore concluded that a leather solves the problems to which the present invention provides a solution when the two evaluation criteria of (a) and (b) are satisfied.

(C) In Comparative Example 6, the (a) smoothness (SMD) was 2.30 μm and slickness (MIU/MMD) was 19.0, while the (b) aforementioned evaluation was 20,000 times, per the evaluation in (B). The smoothness (SMD) and slickness (MIU/MMD) are outside the evaluation criteria in (a).

Comparative Example 1

(A) Comparative Example 1 shows the results of forming a coating film whose components were outside the coating film formation conditions proposed by the present invention, on a base being a leather obtained by buffing a leather in turn obtained by a general tanning method involving glutaraldehyde as in Example 11. To be specific, a hard component was adopted in the formation of the top coat layer, or more specifically hard and soft components were mixed to form the top coat layer. In this case, favorable results could not be obtained.

(1) The prepared base was a leather obtained by buffing a leather in turn obtained by a general tanning method involving glutaraldehyde as in Example 11.

(2) Formation of coating film layer is explained below.

(A) A pre-coat coating film was formed on the natural leather (coating amount=40 g/m$^2$, film thickness=5 μm), after which a base coat was formed (coating amount=45 g/m$^2$, film thickness=9 μm).

(B) On top of the above, the following color coat layer and top coat layer were formed.

The hard component (a resin whose 10% modulus was over 2.3 but not more than 3.0) of a resin containing two-component polyurethane resin and polyurethane resin, which was used to form the color coat layer, accounted for 48 to 90 percent by weight, wherein, specifically, 78 percent by weight of a two-component aliphatic polyurethane being a matting agent (whose 10% modulus was 2.88; see FIG. 3) was used. This is within the aforementioned range.

The soft component (a resin whose 10% modulus was over 0.0 but not more than 1.0) of a resin containing two-component polyurethane resin and polyurethane resin, which was used to form the color coat layer, accounted for 52 to 10 percent by weight, wherein, specifically, 22 percent by weight of a two-component aliphatic polyurethane (whose 10% modulus was 0.30; see FIG. 6) was used, giving a total content by weight of 22% for the soft component (within the range of coating film of the present invention).

To form the aforementioned top coat layer, the medium component (a resin whose 10% modulus was over 1.0 but not more than 2.3) of a resin containing two-component polyurethane resin and polyurethane resin was none, while the hard component accounted for 27 percent by weight (compared to the medium component accounting for 15.0 to 35.0 percent by weight under the present invention, which was one difference), and the soft component (a resin whose 10% modulus was over 0.0 but not more than 1.0) of a resin containing two-component polyurethane resin and polyurethane resin accounted for a total of 73 percent by weight, including 25 percent by weight of a two-component aliphatic polyurethane (resin mat) (whose 10% modulus was 0.67; see FIG. 9), 25 percent by weight of another two-component aliphatic polyurethane resin (whose 10% modulus was 0.54; see FIG. 10) and 23 percent by weight of acrylic polymer-urethane polymer copolymer (whose 10% modulus was 0.11; see FIG. 11) (within the range of coating film of the present invention).

(B) The following two items were evaluated. According to the results of preliminary measurement of natural leathers using the KES-SE-SR-U roughness friction tester (manufactured by Kato Tech), the leathers were deemed acceptable when their (a) smoothness (SMD) was 2.5 μm or less and slickness (MIU/MMD) was 25 or more and (b) wear resistance test result was 4,000 times or more. It is therefore concluded that a leather solves the problems to which the present invention provides a solution when the two evaluation criteria of (a) and (b) are satisfied.

(C) In Comparative Example 1, the (a) smoothness (SMD) was 2.60 μm and slickness (MIU/MMD) was 17.0, while the (b) aforementioned evaluation was 20,000 times, per the evaluation in (B). The smoothness (SMD) and slickness (MIU/MMD) are outside the evaluation criteria in (a).

Comparative Example 2

(A) In Comparative Example 2, a coating film suitable for furniture, etc., was formed on the same favorable base obtained in Example 2. Leathers used for furniture are known to have soft characteristics.

It was shown that if the film is formed by a method not strictly conforming to the compositions specified under the present invention, the evaluation criteria would not be met.
Preparation of Base The natural leather obtained in Test 6 of Example 1 explained above was used as the base.

Formation of coating film is explained below.

A pre-coat coating film was formed on the natural leather (coating amount=40 g/m$^2$, film thickness=5 μm), after which a base coat layer was formed (coating amount=45 g/m$^2$, film thickness=9 μm).

On top of the above, the following color coat layer and top coat layer were formed.

The hard component (a resin whose 10% modulus was over 2.3 but not more than 3.0) of a resin containing two-component polyurethane resin and polyurethane resin, which was used to form the color coat layer, accounted for 48 to 90 percent by weight, wherein, specifically, 25 percent by weight of a two-component aliphatic polyurethane being a matting agent (whose 10% modulus was 2.77; see FIG. 4) was used, indicating that the hard component is insufficient compared to the coating film of the present invention.

The soft component (a resin whose 10% modulus was over 0.0 but not more than 1.0) of a resin containing two-component polyurethane resin and polyurethane resin, which was used to form the color coat layer, accounted for 52 to 10 percent by weight, wherein, specifically, a two-component aliphatic polyurethane (whose 10% modulus was 0.54; see FIG. 5) and another two-component aliphatic polyurethane (whose 10% modulus was 0.79) were used, giving a total content by weight of 75% for the soft component. (This is outside the range of coating film of the present invention.)

To form the aforementioned top coat layer, the medium component (a resin whose 10% modulus was over 1.0 but not more than 2.3) of a resin containing two-component polyurethane resin and polyurethane resin was none, while the soft component (very soft resin that could not be measured) accounted for 100%. (This is outside the range of coating film of the present invention.)

(B) The following two items were evaluated. According to the results of preliminary measurement of natural leathers using the KES-SE-SR-U roughness friction tester (manufactured by Kato Tech), the leathers were deemed acceptable when their (a) smoothness (SMD) was 2.5 μm or less and slickness (MIU/MMD) was 25 or more and (b) wear resistance test result was 4,000 times or more. It is therefore concluded that a leather solves the problems to which the present invention provides a solution when the two evaluation criteria of (a) and (b) are satisfied.

(C) In Comparative Example 2, the (a) smoothness (SMD) was 1.05 μm and slickness (MIU/MMD) was 42.2, while the (b) aforementioned evaluation was 500 times. Although the smoothness (SMD) and slickness (MIU/MMD) met the evaluation criteria in (a), the evaluation criterion in (b) was off significantly.

Comparative Example 3

(A) In Comparative Example 3, a coating film was formed on the same favorable base obtained in Example 2, by a method not strictly following the components and compositions specified under the present invention, where, specifically, the top coat layer was formed by mixing hard, medium and soft components.

Preparation of Base

The natural leather obtained in Test 6 of Example 1 explained above was used as the base.

Formation of Coating Film

Formation of coating film is explained below.

A pre-coat coating film was formed on the natural leather (coating amount=40 g/m$^2$, film thickness=5 μm), after which a base coat layer was formed (coating amount=45 g/m$^2$, film thickness=9 μm).

On top of the above, the following color coat layer and top coat layer were formed.

The hard component (a resin whose 10% modulus was over 2.3 but not more than 3.0) of a resin containing two-component polyurethane resin and polyurethane resin, which was used to form the color coat layer, accounted for 48 to 90 percent by weight, wherein, specifically, 78 percent by weight of a two-component aliphatic polyurethane being a matting agent (whose 10% modulus was 2.88; see FIG. 3) was used, which is within the range specified under the present invention.

The soft component (a resin whose 10% modulus was over 0.0 but not more than 1.0) of a resin containing two-component polyurethane resin and polyurethane resin, which was used to form the color coat layer, accounted for 52 to 10 percent by weight, wherein, specifically, 22 percent by weight of a two-component aliphatic polyurethane (whose 10% modulus was 0.30; see FIG. 6) was used, which is within the range specified under the present invention.

The medium component (a resin whose 10% modulus was over 1.0 but not more than 2.3) of a resin containing two-component polyurethane resin and polyurethane resin, which was used to form the top coat layer, accounted for 15.0 to 35.0 percent by weight, wherein, specifically, 33 percent by weight of a two-component aliphatic polyurethane resin (whose 10% modulus was 1.92) was used. (This is outside the range of coating film of the present invention.) In addition, a hard component was used by as much as 22 percent by weight, although it is not specified under the present invention. (This is outside the range of coating film of the present invention.)

The soft component of the aforementioned top coat layer was constituted by 45 percent by weight of acrylic polymer-urethane polymer copolymer (whose 10% modulus was 0.11; see FIG. 11). (This is outside the range of coating film of the present invention.)

(B) The following two items were evaluated. According to the results of preliminary measurement of natural leathers using the KES-SE-SR-U roughness friction tester (manufactured by Kato Tech), the leathers were deemed acceptable when their (a) smoothness (SMD) was 2.5 μm or less and slickness (MIU/MMD) was 25 or more and (b) wear resistance test result was 4,000 times or more. It is therefore concluded that a leather solves the problems to which the present invention provides a solution when the two evaluation criteria of (a) and (b) are satisfied.

(C) In Comparative Example 3, the (a) smoothness (SMD) was 1.25 μm and slickness (MIU/MMD) was 16.5, while the (b) aforementioned evaluation was 10,000 times, per the evaluation in (B). In any case, the slickness (MIU/MMD) is outside the evaluation criterion in (a).

Comparative Example 4

(A) In Comparative Example 4, a coating film suitable for furniture, etc., was formed on a favorable base just like in Comparative Example 2. Leathers used for furniture are known to have soft characteristics.

It was shown that if the film is formed by a method not strictly conforming to the compositions specified under the present invention, the evaluation criteria would not be met.

Preparation of Base

The natural leather obtained in Test 6 of Example 1 explained above was used as the base.

Formation of Coating Film

A pre-coat coating film was formed on the natural leather (coating amount=40 g/m$^2$, film thickness=5 μm), after which a base coat layer was formed (coating amount=45 g/m$^2$, film thickness=9 μm).

On top of the above, the following color coat layer and top coat layer were formed.

The hard component (a resin whose 10% modulus was over 2.3 but not more than 3.0) of a resin containing two-component polyurethane resin and polyurethane resin, which was used to form the color coat layer, accounted for 48 to 90 percent by weight, wherein, specifically, 78 percent by weight of a two-component aliphatic polyurethane being a matting agent (whose 10% modulus was 2.88; see FIG. 3) was used.

The soft component (a resin whose 10% modulus was over 0.0 but not more than 1.0) of a resin containing two-component polyurethane resin and polyurethane resin, which was used to form the color coat layer, accounted for 52 to 10 percent by weight, wherein, specifically, 22 percent by weight of a two-component aliphatic polyurethane (whose 10% modulus was 0.30; see FIG. 6) was used alone. (This is within the range of coating film of the present invention.)

To form the aforementioned top coat layer, the medium component (a resin whose 10% modulus was over 1.0 but not more than 2.3) of a resin containing two-component polyurethane resin and polyurethane resin was none, while the soft component was constituted by 33 percent by weight of acrylic polymer-urethane polymer copolymer (whose 10% modulus was 0.11; see FIG. 11) and 67 percent by weight of (very soft resin that could not be measured). (This is outside the range of coating film of the present invention.)

(B) The following two items were evaluated. According to the results of preliminary measurement of natural leathers using the KES-SE-SR-U roughness friction tester (manufactured by Kato Tech), the leathers were deemed acceptable when their (a) smoothness (SMD) was 2.5 μm or less and slickness (MIU/MMD) was 25 or more and (b) wear resistance test result was 4,000 times or more. It is therefore concluded that a leather solves the problems to which the present invention provides a solution when the two evaluation criteria of (a) and (b) are satisfied.

(C) In Comparative Example 4, the (a) smoothness (SMD) was 0.87 μm and slickness (MIU/MMD) was 30.0, while the (b) aforementioned evaluation was 2,000 times. Although the smoothness (SMD) and slickness (MIU/MMD) met the evaluation criteria in (a), the evaluation criterion in (b) was off significantly.

Comparative Example 5

The same base used in Comparative Example 1 explained above was used.

(A) In Comparative Example 5, a leather obtained by buffing a leather in turn obtained by a general tanning method involving glutaraldehyde as in Example 11 was used and a coating film conforming to the components and contents specified under the present invention was formed on this base, in which case favorable results could not be achieved.

Preparation of Base

The prepared base was a leather obtained by buffing a leather in turn obtained by a general tanning method involving glutaraldehyde as in Example 11.

Formation of Coating Film

A pre-coat coating film was formed on the natural leather (coating amount=40 g/m$^2$, film thickness=5 μm), after which a base coat layer was formed (coating amount=45 g/m$^2$, film thickness=9 μm).

On top of the above, the following color coat layer and top coat layer were formed.

The hard component (a resin whose 10% modulus was over 2.3 but not more than 3.0) of a resin containing two-component polyurethane resin and polyurethane resin, which was used to form the color coat layer, accounted for 48 to 90 percent by weight, wherein, specifically, 25 percent by weight of a two-component aliphatic polyurethane being a matting agent (whose 10% modulus was 2.88; see FIG. 3) and 53 percent by weight of another two-component aliphatic polyurethane (whose 10% modulus was 2.77; see FIG. 4) were used, giving a total content by weight of 78%.

The soft component (a resin whose 10% modulus was over 0.0 but not more than 1.0) of a resin containing two-component polyurethane resin and polyurethane resin, which was used to form the color coat layer, accounted for 52 to 10 percent by weight, wherein, specifically, the soft component was constituted by 22 percent by weight of a two-component aliphatic polyurethane (whose 10% modulus was 0.30; see FIG. 6) and the hard component was constituted by 78 percent by weight of a two-component aliphatic polyurethane being a matting agent (whose 10% modulus was 2.88; see FIG. 3). The hard component and soft component of the color coat layer are within the ranges specified under the present invention.

The medium component (a resin whose 10% modulus was over 1.0 but not more than 2.3) of a resin containing two-component polyurethane resin and polyurethane resin, which was used to form the aforementioned top coat layer, accounted for 15.0 to 35.0 percent by weight, wherein, specifically, 25 percent by weight of a two-component aliphatic polyurethane resin (whose 10% modulus was 1.89; see FIG. 8) was used, which is within the range of the present invention.

The soft component (a resin whose 10% modulus was over 0.0 but not more than 1.0) of a resin containing two-component polyurethane resin and polyurethane resin, which was used to form the aforementioned top coat layer, accounted for 85.0 to 65.0 percent by weight, wherein, specifically, 25 percent by weight of a two-component aliphatic polyurethane (resin mat) (whose 10% modulus was 0.67; see FIG. 9), 25 percent by weight of another two-component aliphatic polyurethane resin (whose 10% modulus was 0.54; see FIG. 10) and 25 percent by weight of acrylic polymer-urethane polymer copolymer (whose 10% modulus was 0.11; see FIG. 11) were used, giving a total content by weight of 75%. This is also within the range of the present invention.

(B) The following two items were evaluated. According to the results of preliminary measurement of natural leathers using the KES-SE-SR-U roughness friction tester (manufactured by Kato Tech), the leathers were deemed acceptable when their (a) smoothness (SMD) was 2.5 μm or less and slickness (MIU/MMD) was 25 or more and (b) wear resistance test result was 4,000 times or more. It is therefore concluded that a leather solves the problems to which the present invention provides a solution when the two evaluation criteria of (a) and (b) are satisfied.

(C) As for the evaluation results of Comparative Example 5, the smoothness (SMD) was 2.06 μm, slickness (MIU/MMD) was 19.5, and wear resistance test by the Gakushin friction fastness tester was 10,000 times. The slickness (MIU/MMD) did not meet the criterion.

(D) The results of Comparative Examples 1 and 5 are compared. In Comparative Example 5, the smoothness (SMD) was 2.06 μm and slickness (MIU/MMD) was 19.5. In Comparative Example 1, on the other hand, the smoothness (SMD) was 2.60 μm and slickness (MIU/MMD) was 17.0.

These results suggest that, when a leather obtained by a general tanning method involving glutaraldehyde is used as a base, the condition of Comparative Example 5 conforming to the components and contents of the formation of coating film specified under the present invention would provide more favorable results compared to the condition of Comparative Example 1 whose coating film differed from the coating film under the present invention, in terms of both smoothness (SMD) and slickness (MIU/MMD). This is clearly a basis on which to form an opinion that by forming a coating film conforming to the present invention on a generally known leather, favorable results can be achieved in terms of smoothness (SMD) and slickness (MIU/MMD).

TABLE 4

| | | | | Comparative Examples | | | | Examples | |
|---|---|---|---|---|---|---|---|---|---|
| | | | | 1 | 2 | 3 | 4 | 5 | 6 |
| Leather structure | Coating film | Blending ratio of top coat resin (%) | Hard | 27 | 0 | 22 | 0 | 0 | 27 |
| | | | Medium | 0 | 0 | 33 | 0 | 25 | 0 |
| | | | Soft | 73 | 100 | 45 | 100 | 75 | 73 |
| | | Blending ratio of color coat resin (%) | Hard | 78 | 25 | 78 | 78 | 78 | 78 |
| | | | Soft | 22 | 75 | 22 | 22 | 22 | 22 |
| | Base | Tanning | | GA | GA (Test 6) | GA (Test 6) | GA (Test 6) | GA | Cr |
| | | Buffing (○: Yes/—: No) | | ○ | — | — | — | ○ | — |
| Leather performance | Touch | Smoothness SMD (μm) | Leather (base + coating film) | 2.60 | 1.05 | 1.25 | 0.87 | 2.06 | 2.30 |
| | | | Stainless sheet + coating film | 0.61 | 1.07 | 0.64 | — | 1.13 | — |
| | | Slickness (MIU/MML) | Leather (base + coating film) | 17.0 | 42.2 | 16.5 | 30.0 | 19.6 | 19.0 |
| | | | Stainless sheet + coating film | 20.8 | 10.3 | 9.3 | — | 16.4 | — |
| | Wear resistance | Gakushin wear resistance (times) | | 20,000 | 500 | 10,000 | 2,000 | 10,000 | 20,000 |

| | | | | Examples | | | | | |
|---|---|---|---|---|---|---|---|---|---|
| | | | | 2 | 3 | 4 | 5 | 6 | 7 |
| Leather structure | Coating film | Blending ratio of top coat resin (%) | Hard | 0 | 0 | 0 | 0 | 0 | 0 |
| | | | Medium | 7.5 | 15 | 25 | 30 | 37.5 | 25 |
| | | | Soft | 92.5 | 85 | 72 | 70 | 62.5 | 75 |
| | | Blending ratio of color coat resin (%) | Hard | 70 | 70 | 70 | 70 | 70 | 90 |
| | | | Soft | 30 | 30 | 30 | 30 | 30 | 10 |
| | Base | Tanning | | GA (Test 6) | GA (Test 6) | GA (Test 6) | GA (Test 6) | GA (Test 6) | GA (Test 6) |
| | | Buffing (○: Yes/—: No) | | — | — | — | — | — | — |
| Leather performance | Touch | Smoothness SMD (μm) | Leather (base + coating film) | 0.86 | 0.89 | 0.74 | 0.68 | 0.72 | 0.59 |
| | | | Stainless sheet + coating film | 1.32 | 1.45 | 1.25 | 1.51 | 1.65 | 1.47 |
| | | Slickness (MIU/MML) | Leather (base + coating film) | 34.3 | 30.1 | 30.4 | 33.0 | 32.9 | 32.7 |
| | | | Stainless sheet + coating film | 6.2 | 7 | 11 | 6.3 | 8.9 | 9.46 |
| | Wear resistance | Gakushin wear resistance (times) | | 5,000 | 7,500 | 9,000 | 7,500 | 5,500 | 10,000 |

| | | | | Examples | | | | |
|---|---|---|---|---|---|---|---|---|
| | | | | 8 | 9 | 10 | 11 | 12 |
| Leather structure | Coating film | Blending ratio of top coat resin (%) | Hard | 0 | 0 | 0 | 0 | 0 |
| | | | Medium | 25 | 25 | 25 | 25 | 25 |
| | | | Soft | 75 | 75 | 75 | 75 | 75 |

TABLE 4-continued

|  |  |  |  |  |  |  |  |  |
|---|---|---|---|---|---|---|---|---|
|  |  | Blending ratio of color coat resin (%) | Hard | 80 | 60 | 50 | 78 | 70 |
|  |  |  | Soft | 20 | 40 | 50 | 22 | 30 |
|  | Base |  | Tanning | GA (Test 6) | GA (Test 6) | GA (Test 6) | GA (Test 6) | Cr |
|  |  |  | Buffing (○: Yes/—: No) | — | — | — | ○ | — |
| Leather performance | Touch | Smoothness SMD (μm) | Leather (base + coating film) | 1.02 | 0.70 | 0.72 | 2.5 | 1.53 |
|  |  |  | Stainless sheet + coating film | 1.5 | 1.68 | 1.59 | — | — |
|  |  | Slickness (MIU/MML) | Leather (base + coating film) | 30.6 | 34.1 | 30.5 | 28.3 | 32.5 |
|  |  |  | Stainless sheet + coating film | 9.15 | 10.13 | 8.2 | — | — |
|  | Wear resistance |  | Gakushin wear resistance (times) | 8,500 | 5,000 | 8,500 | 10,000 | 8,000 |

INDUSTRIAL FIELD OF APPLICATION

A natural leather conforming to the present invention, obtained by forming a pre-coat, base coat, and then color coat layer and top coat layer formed by specified resins, on the surface of a natural leather obtained through a leather tanning step involving a tanning agent containing chromium or glutaraldehyde as well as steps for re-tanning, dyeing and greasing, exhibits distinctive leather characteristics such as slickness and smoothness unique to natural leather and thus can be used effectively in various fields other than automobile interior parts.

What is claimed is:

1. A coated natural leather that is produced by obtaining a natural leather through a leather tanning step involving a tanning agent containing chromium or glutaraldehyde as well as steps for re-tanning using a re-tanning agent comprising synthetic tannin and a first resin, where the synthetic tannin comprises (A) a condensation product of an aromatic sulfonic acid and formaldehyde, or an aromatic sulfonic acid and a condensation product of an aromatic sulfonic acid and formaldehyde, (B) a methylene cyclocondensation product of an aromatic sulfonic acid and a hydroxyl aromatic compound, or an aromatic sulfonic acid and a methylene cyclocondensation product of an aromatic sulfonic acid and a hydroxy aromatic compound, and (C) glyoxal, while the resin comprises (A) an acrylic acid, methacrylic acid, acrylic acid ester, a methacrylic acid polymer ester or a mixture thereof, and (B) a polycondensation product of melamine and formaldehyde, where the leather is re-tanned using the re-tanning agent, dyeing using a dying agent comprising an acid water-based dye, and greasing using a greasing agent constituted by (A) synthetic oil and a natural oil, or (B) a mixed oil comprising synthetic oil and a natural component, and then forming on the surface of the natural leather, in this order,

- a pre coat that comprises a second resin, a pigment, an auxiliary and water,
- a base coat that comprises a third resin, a pigment an auxiliary, a touch agent, a leveling agent and water,
- a color coat layer comprising a mixture of (1) 48 to 90 percent by weight of a hard component of a resin containing at least two-component polyurethane resin with (2) 52 to 10 percent by weight of a soft component of a resin containing at least two-component polyurethane resin, the hard component of a resin having a 10% modulus that is over 2.3 but not more than 3.0, and the soft component of a resin having a 10% modulus that is over 0.0 but not more than 1.0, and
- a top coat layer comprising a mixture of (1) 15 to 35 percent by weight of a medium component of a resin containing at least two-component polyurethane resin with (2) 65 to 85 percent of a soft component of a resin containing at least two-component polyurethane resin, the medium component of a resin having a 10% modulus that is over 1.0 but not more than 2.3, and the soft component of a resin having a 10% modulus that is over 0.0 but not more than 1.0,
- wherein when the surface of the coated natural leather is measured using a KES-SE-SR-U roughness friction tester, the smoothness (SMD) is 2.5 μm or less, slickness (MIU/MMD) is 25 or more, and wear resistance test result using a Gakushin friction fastness tester is 4,000 times or more.

2. A coated natural leather according to claim 1, obtained by the process according to claim 1, wherein the process further comprises a pre-treatment step before leather tanning and a post-treatment step after re-tanning and wherein the tanning agent is glutaraldehyde.

3. A coated natural leather according to claim 1, obtained by the process according to claim 1, wherein the process further comprises a pre-treatment step before leather tanning and a post-treatment step after re-tanning and wherein the tanning agent is glutaraldehyde and the re-tanning agent further comprises an aluminum compound.

4. An automobile interior material comprising the coated natural leather according to claim 1.

5. A coated natural leather that is produced by obtaining a natural leather through a leather tanning step involving a tanning agent containing chromium or glutaraldehyde as well as steps for re-tanning using a re-tanning agent comprising synthetic tannin, a first resin and an aluminum compound, where the synthetic tannin comprises (A) a condensation product of an aromatic sulfonic acid and formaldehyde, or an aromatic sulfonic acid and a condensation product of an aromatic sulfonic acid and formaldehyde, (B) a methylene cyclocondensation product of an aromatic sulfonic acid and a hydroxyl aromatic compound, or an aromatic sulfonic acid and a methylene cyclocondensation product of an aromatic sulfonic acid and a hydroxy aromatic compound, and (C) glyoxal, while the resin comprises (A) an acrylic acid, methacrylic acid, acrylic acid ester, a methacrylic acid polymer ester or a mixture thereof, and (B) a polycondensation product of melamine and formaldehyde, where the leather is re-tanned using the re-tanning agent, dyeing using a dying agent comprising an acid water-based dye, and greasing using a greasing agent constituted by (A) synthetic oil and a natural oil, or (B) a mixed oil comprising synthetic oil and a natural component, and then forming on the surface of the natural leather, in this order, a pre coat that comprises a second resin, a pigment, an auxiliary and water, a base coat that comprises a third resin, a pigment an auxiliary, a touch agent, a leveling agent and water, a color coat layer comprising a mixture of (1) 48 to 90 percent by weight of a hard component of a resin containing at least two-component polyurethane resin with (2) 52 to 10 percent by weight of a soft component of a resin containing at least two-component polyurethane resin, the hard component of a resin having a 10% modulus that is over 2.3 but not more than 3.0, and the soft component of a resin having a 10% modulus that is over 0.0 but not more than 1.0, and a top coat layer comprising a mixture of (1) 15 to 35 percent by weight of a medium component of a resin containing at least two-component polyurethane resin with (2) 65 to 85 percent of a soft component of a resin containing at least two-component polyurethane resin, the medium component of a resin having a 10% modulus that is over 1.0 but not more than 2.3, and the soft component of a resin having a 10% modulus that is over 0.0 but not more than 1.0, wherein when the surface of the coated natural leather is measured using a KES-SE-SR-U roughness friction tester, the smoothness (SMD) is 2.5 µm or less, slickness (MIU/MMD) is 25 or more, and wear resistance test result using a Gakushin friction fastness tester is 4,000 times or more.

6. A coated natural leather according to claim 5, obtained by the process according to claim 5, wherein the process further comprises a pre-treatment step before leather tanning and a post-treatment step after re-tanning and wherein the tanning agent is glutaraldehyde and the re-tanning agent further comprises an aluminum compound.

7. An automobile interior material comprising the coated natural leather according to claim 5.

\* \* \* \* \*